United States Patent
Nakagawa et al.

(10) Patent No.: US 10,860,395 B2
(45) Date of Patent: Dec. 8, 2020

(54) EVENT PROCESSING METHOD, NON-TRANSITORY COMPUTER-READABLE STORAGE MEDIUM FOR STORING PROGRAM

(71) Applicant: FUJITSU LIMITED, Kawasaki (JP)

(72) Inventors: Gaku Nakagawa, Ota (JP); Yasuhiko Kanemasa, Kawasaki (JP); Riichiro Take, Setagaya (JP); Hisatoshi Yamaoka, Kawasaki (JP); Miwa Okabayashi, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/260,270

(22) Filed: Jan. 29, 2019

(65) Prior Publication Data

US 2019/0243693 A1  Aug. 8, 2019

(30) Foreign Application Priority Data

Feb. 2, 2018  (JP) ................... 2018-017350

(51) Int. Cl.
*G06F 9/54*  (2006.01)
*G06F 9/445*  (2018.01)
(Continued)

(52) U.S. Cl.
CPC .......... *G06F 9/542* (2013.01); *G06F 9/44526* (2013.01); *G06F 9/4843* (2013.01);
(Continued)

(58) Field of Classification Search
None
See application file for complete search history.

(56) References Cited

U.S. PATENT DOCUMENTS 8,327,349 B2 * 12/2012 Chu .................... G06F 9/44526
717/174
8,381,206 B2 * 2/2013 Balko ................. G06F 9/44526
717/168
(Continued)

FOREIGN PATENT DOCUMENTS

EP  2040210 A1  3/2009
EP  2592506 A2  5/2013
(Continued)

OTHER PUBLICATIONS

Apolinarski, Wolfgang, et al., "Secure interaction with piggybacked key-exchange", Pervasive and Mobile Computing, Elsevier, NL, vol. 10, Nov. 4, 2013, pp. 22-33, XP028819412. Cited in EESR dated Jun. 28, 2019 corresponding to European Patent Application No. 19153933.7.

(Continued)

*Primary Examiner* — Umut Onat
(74) *Attorney, Agent, or Firm* — Fujitsu Patent Center

(57) ABSTRACT

An event processing method includes storing in a storage unit, upon receipt of a control message representing information indicating a type of an event to be an execution condition for a plug-in and information regarding the plug-in, in association with each other, the information indicating the type of the event specified from the received control message and the plug-in, in association with each other. The method also includes executing the plug-in upon receipt of an event message representing the information indicating the type of the event. The plug-in being stored in the storage unit in association with the information indicating the type of the event specified from the received event message.

11 Claims, 67 Drawing Sheets

(51) Int. Cl.
*G06F 11/16* (2006.01)
*G06F 11/14* (2006.01)
*H04L 29/08* (2006.01)
*G06F 9/48* (2006.01)

(52) U.S. Cl.
CPC ...... *G06F 11/1464* (2013.01); *G06F 11/1662* (2013.01); *H04L 67/10* (2013.01)

(56) References Cited

U.S. PATENT DOCUMENTS

| | | | |
|---|---|---|---|
| 8,589,727 | B1 | 11/2013 | Fletcher et al. |
| 9,846,682 | B1* | 12/2017 | Righetto ............... G06F 40/106 |
| 2004/0049481 | A1 | 3/2004 | Blevins |
| 2004/0205772 | A1 | 10/2004 | Uszok et al. |
| 2006/0041928 | A1* | 2/2006 | Masuoka ............ H04L 63/0263 |
| | | | 726/1 |
| 2007/0240168 | A1 | 10/2007 | Guschina et al. |
| 2008/0059479 | A1 | 3/2008 | Lin et al. |
| 2010/0191599 | A1 | 7/2010 | Vaidyanathan et al. |
| 2011/0016184 | A1* | 1/2011 | Wen .................... G06F 9/44526 |
| | | | 709/206 |
| 2013/0238882 | A1 | 9/2013 | Suzuki et al. |
| 2015/0296025 | A1 | 10/2015 | Okabayashi et al. |
| 2016/0070246 | A1 | 3/2016 | Nakagawa et al. |
| 2016/0357583 | A1 | 12/2016 | Decker et al. |

FOREIGN PATENT DOCUMENTS

| | | |
|---|---|---|
| JP | H08-249201 A | 9/1996 |
| JP | 2010-218304 A | 9/2010 |
| JP | 2012-146207 A | 8/2012 |
| WO | 2012/046302 A1 | 4/2012 |

OTHER PUBLICATIONS

Kolberg, M. et al., "Feature interaction in a federated communications-enabled collaboration platform", Computer Networks, Elsevier, Amsterdam, NL, vol. 57, No. 12, Apr. 11, 2013, pp. 2410-2428, XP028682506. Cited in EESR dated Jun. 28, 2019 corresponding to European Patent Application No. 19153933.7.

Chiarusi, Tommaso, "The NEMO trigger and data acquisition system", Nuclear Instruments and Methods in Physics Research. Section A, vol. 725, Dec. 2, 2012, pp. 129-132, XP028686561. Cited in EESR dated Jun. 28, 2019 corresponding to European Patent Application No. 19153933.7.

Serral, Estefania et al., "Towards the Model Driven Development of context-aware pervasive systems", Pervasive and Mobile Computing, Elsevier, NL, vol. 6, No. 2, Apr. 1, 2010, pp. 254-280, XP026989914. Cited in EESR dated Jun. 28, 2019 corresponding to European Patent Application No. 19153933.7.

Mingwei, An et al., "Study of Executable Plug-in Management System in Freeway Monitoring Network Based on B/S/A", Journal of Physical Chemistry C, Jul. 4, 2009, pp. 595-598, XP031506888. Cited in EESR dated Jun. 28, 2019 corresponding to European Patent Application No. 19153933.7.

Malatras, Apostolos et al., "A Programmable Framework for the Deployment of Services and Protocols in Mobile AdHoc Networks", IEEE Transactions on Network and Service Management, vol. 4, No. 3, Dec. 1, 2007, pp. 12-24, XP011381423. Cited in EESR dated Jun. 28, 2019 corresponding to European Patent Application No. 19153933.7.

Wolf, Tilman et al., "Tags for High Performance Active Networks", Open Architectures and Network Programming, 2000, IEEE, Mar. 26, 2000, pp. 37-44, XP010376201. Cited in EESR dated Jun. 28, 2019 corresponding to European Patent Application No. 19153933.7.

Sull, Wonhee, "A Distributed Environment for Enabling Lightweight Flexible Workflows", System Sciences, 1998, IEEE, vol. 4, Jan. 6, 1998, pp. 355-364, XP010263096. Cited in EESR dated Jun. 28, 2019 corresponding to European Patent Application No. 19153933.7.

Extended European Search Report dated Jun. 28, 2019 for corresponding European Patent Application No. 19153933.7, 10 pages.

* cited by examiner

FIG. 53

```
{
  "id": "car0",
  "lat": "43.29954323100655",
  "lon": "168.62391592425027",
  "speed": "10.0",
  "time": "1513207500",
  "type": "event"
}
```
5300

```
{
  "end": "1",
  "id": "car0",
  "plugin_data":
"yv66vgAAADEAUJAoAEAAuCAAvCwAwADEKADJAMwgANAcANQoANga3CgA2ADgKADIAQgA1wgAJQgAOgcAOwoADQA8BwA9BwA+AQAGPGluaXQ+AQADKCWA...
AMAAEAAABZABBAJwACACgAAAAEAAEAKOAgAAAAAAgArAAIALAAAAIALQADaAAACgABABKAPwAaBAE=",
  "start": "1513207600",
  "target_state_name": "lat",
  "time": "1513207506",
  "type": "add_plugin"
}
```

```
{
  "end": "1513208700",
  "id": "car0",
  "plugin_data":
  "yv66vgAAADEAUAoAEAAUCAAVCwAwADEKADIAMwgANAcANQoANga3CgA2ADgKADIA0QgAIwgA3QgA0gcA0woADQA8BwA9BwA+AQAGPGluaXQ+AQADKCIWA…
   AMAAEAAABZAB8AJwACACgAAAAEAAEAKQAgAAAAAAgAFAAAAAAgArAAIAlAAAAAIALQAbAAAACgABABKAPWAaBAE=",
  "target_state_name": "at",
  "time": "1513207700",
  "type": "change_expiration"
}
```

FIG. 56

```
{
  "type":"update_plugin",
  "id":"car0",
  "time":"1513207700",
  "start":"1513208700",
  "end":"1513209700",
  "target_state_name":"lat",
  "old_plugin_data":"yv66vgAAADEAUJAoAEAAuCAAvCwaWADEKADIAMwgANaCaNQoANgA3CgA2ADgKADIAOQgAIw···
  ···AGACYAAAMAEAAABZAB8AJwACACgAAAAAEAAEAKQaQAAAAAgArAAIALAAAAAIALQAbAAAACgABABkAPwAaBAE=",
  "new_plugin_data":"yv66vgY3R4AQBCTG9yZy9hcGFjaGUvZmxpbmsvc3RyZWFtaW5nL2FwaS9mdW5jdGlvbnMvUH···
  ···AAAAgArAAIALAAAAAIALQbAAAAACgABABkAPwAaBAE="
}
```

5600

EVENT PROCESSING METHOD, NON-TRANSITORY COMPUTER-READABLE STORAGE MEDIUM FOR STORING PROGRAM

CROSS-REFERENCE TO RELATED APPLICATION

This application is based upon and claims the benefit of priority of the prior Japanese Patent Application No. 2018-17350, filed on Feb. 2, 2018, the entire contents of which are incorporated herein by reference.

FIELD

The embodiments discussed herein are related to an event processing method, and a non-transitory computer-readable storage medium for storing a program.

BACKGROUND

There has heretofore been a parallel distributed processing system including nodes to process data by implementing a program to process the data in each of the nodes and distributing the data to the nodes. The parallel distributed processing system may be requested to update the program of each node and to add a function to the program of each node.

As a related technique, for example, there is a method including reading control information in response to an event and executing a job based on the control information. There is also a technology to perform processing of notifying data to be synchronized between a currently used system and a stand-by system, for example. There is a technology to update logical configuration information related to a device included in an information processing system, for example, if there is a change in the device. There is a technology to cause another CPU to take over processing while a specific CPU saves status information, for example.

Related techniques are disclosed in, for example, Japanese Laid-open Patent Publication Nos. 8-249201, 2010-218304, and 2012-146207 and International Publication Pamphlet No. WO 2012/046302.

SUMMARY

According to an aspect of the embodiments, an event processing method includes: storing, upon receipt of a control message representing information indicating a type of an event to be an execution condition for a plug-in and information regarding the plug-in, in association with each other, the information indicating the type of the event specified from the received control message and the plug-in, in association with each other, in a storage unit; and executing the plug-in upon receipt of an event message representing the information indicating the type of the event, the plug-in being stored in the storage unit in association with the information indicating the type of the event specified from the received event message.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 53 is an explanatory diagram illustrating a specific example of an event message 5300 in the application example;

FIG. 54 is an explanatory diagram illustrating a specific example of a control message 5400 to add a plug-in in the application example;

FIG. 55 is an explanatory diagram illustrating a specific example of a control message 5500 to change the expiration of the plug-in in the application example;

FIG. 56 is an explanatory diagram illustrating a specific example of a control message 5600 to update the plug-in in the application example.

DESCRIPTION OF EMBODIMENTS

However, in the related techniques, the parallel distributed processing system may be stopped to update a program of each of nodes in the parallel distributed processing system. For example, when a plurality of nodes process data, the parallel distributed processing system is stopped until updating of the programs of all the nodes is completed so as to reduce a state where the nodes with the updated programs and the nodes with programs yet to be updated are mixed.

According to an aspect of the embodiment, it is an object of the embodiment to update a program without stopping a system.

Hereinafter, with reference to the drawings, detailed description is given of a processing program and an event processing method according to an embodiment.

(Example of Event Processing Method According to Embodiment)

Figure 1:
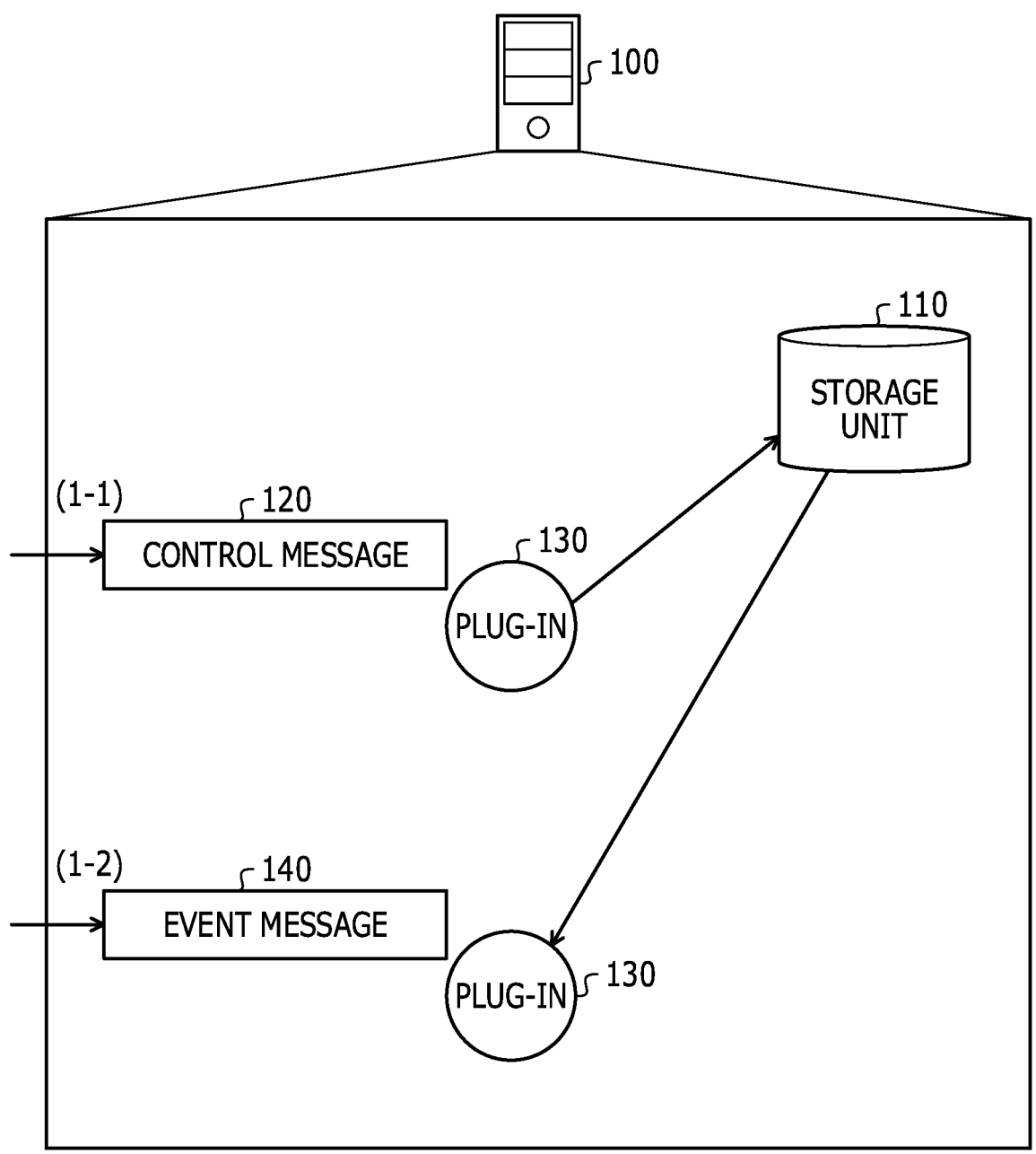
FIG. 1 is an explanatory diagram illustrating an example of an event processing method according to an embodiment.

FIG. 1 is an explanatory diagram illustrating an example of an event processing method according to the embodiment. An information processor 100 is a computer capable of operating as any one of a plurality of nodes included in a parallel distributed processing system. Each of the nodes has a processing program to process processing target data, and processes the processing target data.

Here, in the parallel distributed processing system, it may be required to update the processing program of each node, and to add/delete functions to/from the processing program of each node or to update such functions.

However, in this case, mixing of the nodes with the updated processing programs and the nodes with the processing programs yet to be updated makes it unclear if the processing target data is to be processed with the updated processing program or is to be processed with the processing program yet to be updated. As for the processing target data generated at the same timing, the case where the processing target data is processed with the updated processing program is mixed with the case where the processing target data is processed with the processing program yet to be updated. Such mixing causes inconsistency in processing.

To counter this problem, the following method 1 and method 2 are conceivable as a method of updating the processing program of each node without causing inconsistency in processing.

Method 1 is a method of updating the processing program of each node in a state where transmission of processing target data is suspended by a management node that collects the processing target data and transmits the collected data to each node. For example, method 1 includes suspending the transmission by the management node, saving the storage content of each node, updating the processing program of each node, returning the saved storage content to each node, and then resuming the transmission by the management node.

However, in method 1, the suspension of the transmission by the management node stops the parallel distributed processing system, leading to deterioration in performance of the parallel distributed processing system. The larger the number of nodes included in the parallel distributed processing system, the more likely the time for which the parallel distributed processing system stops is to be increased. Therefore, processing time-out is likely to occur.

Method 2 is a method of apparently updating the processing program of each node by preparing two systems: an old system including a currently operating node and a new system including a node with a new processing program. For example, method 2 includes suspending the transmission by the management node, copying the storage content of the node in the old system to the node in the new system, switching the destination to the node in the new system, and resuming the transmission by the management node.

However, in method 2, again, the suspension of the transmission by the management node stops the parallel distributed processing system, leading to deterioration in performance of the parallel distributed processing system, as in the case of method 1. Therefore, processing time-out is likely to occur. An increase in the number of nodes prepared to realize the parallel distributed processing system leads to increased cost for the parallel distributed processing system.

As described above, both of methods 1 and 2 have a problem that the parallel distributed processing system stops during updating of the processing program of each node, making the processing time-out likely to occur. Therefore, it is desired to enable the processing program of each node to be updated without causing inconsistency in processing and without stopping the parallel distributed processing system.

In this embodiment, description is given of an event processing method of enabling a plug-in corresponding to the type of an event to be added, deleted, or updated in response to a control message, thereby enabling the plug-in corresponding to the type of the event to be executed in response to an event message when the event occurs. According to this embodiment, the event processing method enables the processing program of each node to be updated without causing inconsistency in processing and without stopping the parallel distributed processing system.

In FIG. 1, the information processor 100 has a processing program. The processing program at least includes a main program capable of calling a plug-in 130. The processing program may further include the plug-in 130. The processing program is updated by adding, deleting, or updating the plug-in 130.

(1-1) The information processor 100 receives a control message 120. The control message 120 represents at least information indicating the type of an event that is an execution condition for the plug-in 130 and information regarding the plug-in 130 in association with each other. The control message 120 may further represent information identifying the source of the event. The information regarding the plug-in 130 is, for example, an address of a storage area where the plug-in 130 is stored. The event is, for example, a change in state of a person or object. The state is, for example, a speed.

Upon receipt of the control message 120, the information processor 100 stores the plug-in 130 and information indicating the type of an event specified from the received control message 120 in association with each other in a storage unit 110. The information processor 100 reads the plug-in 130 from a storage area indicated by an address included in the control message 120, for example. Then, the information processor 100 stores the information indicating the type of the event included in the control message 120 and the read plug-in 130 in association with each other in the storage unit 110. The information processor 100 performs, for example, operations as in operation example 1 to be described later with reference to FIGS. 5 to 7.

(1-2) The information processor 100 receives an event message 140. The event message 140 represents information indicating at least the type of an event. The event message 140 may further represent information indicating the content of the event. The information indicating the content of the event is, for example, information indicating a state of a person or object at a timing when there is a change in state of the person or object. The event message 140 may further represent information identifying the source of the event.

Upon receipt of the event message 140, the information processor 100 executes the plug-in 130 stored in the storage unit 110 in association with the information indicating the type of the event specified from the received event message 140. The information processor 100 executes the plug-in 130, for example, to process the information indicating the state of the person or object included in the event message 140. The information processor 100 performs, for example, the operations as in operation example 1 to be described later with reference to FIGS. 5 to 7.

Thus, the information processor 100 may update the processing program by adding a new plug-in 130 to the processing program upon receipt of the control message 120. The information processor 100 may also handle the event message 140 and the control message 120 in order of reception. Therefore, occurrence of inconsistency in processing may be reduced by collectively transmitting the control message 120 to the information processor 100 operating as each of the plurality of nodes included in the parallel distributed processing system.

The information processor 100 may receive the event message 140 also when updating the processing program. Therefore, the information processor 100 may reduce the occurrence of processing time-out by suppressing downtime of the parallel distributed processing system. The information processor 100 may also realize update of the processing program without increasing the number of nodes included in the parallel distributed processing system.

Here, the description is given of the case where the information processor 100 adds the plug-in 130 to the processing program upon receipt of the control message 120 for adding the plug-in 130. However, the embodiment is not limited thereto. For example, there may be a case where a control message 120 for deleting the plug-in 130 is prepared, and the information processor 100 deletes the plug-in 130 included in the processing program upon receipt of the control message 120 for deleting the plug-in 130.

Here, the description is given of the case where the information processor 100 stores the plug-in 130 in the storage unit 110 and activates the plug-in 130 upon receipt of the control message 120. However, the embodiment is not limited thereto. For example, there may be a case where a valid period is set for the plug-in 130 and the information processor 100 activates the plug-in 130 when entering the valid period of the plug-in 130. For example, the information processor 100 may perform operations as in operation example 2 to be described later with reference to FIGS. 15 and 16.

In this case, the information processor 100 may delete the plug-in 130 whose valid period has passed. The information processor 100 may also wait to delete the plug-in 130 until a specific synchronization message is received after the valid period has passed. For example, the information processor 100 may perform operations as in operation example 3 to be described later with reference to FIGS. 21 and 22.

Here, the description is given of the case where the information processor 100 stores the plug-in 130 in the storage unit 110 and activates the plug-in 130 upon receipt of the control message 120. However, the embodiment is not limited thereto. For example, there may be a case where the information processor 100 activates the plug-in 130 upon receipt of a specific synchronization message after receiving the control message 120. For example, the information processor 100 may perform operations as in operation example 4 to be described later with reference to FIGS. 26 and 27.

Here, the description is given of the case where the information processor 100 reads the plug-in 130 from a specific storage area. However, the embodiment is not limited thereto. For example, there may be a case where the information regarding the plug-in 130 is information obtained by encoding the plug-in 130 and the information processor 100 decodes the plug-in 130 from the information obtained by encoding the plug-in 130. For example, the information processor 100 may perform operations as in operation example 5 to be described later with reference to FIGS. 35 to 37 or operations as in operation example 6 to be described later with reference to FIGS. 42 to 44.

(Example of Parallel Distributed Processing System 200)

Figure 2:
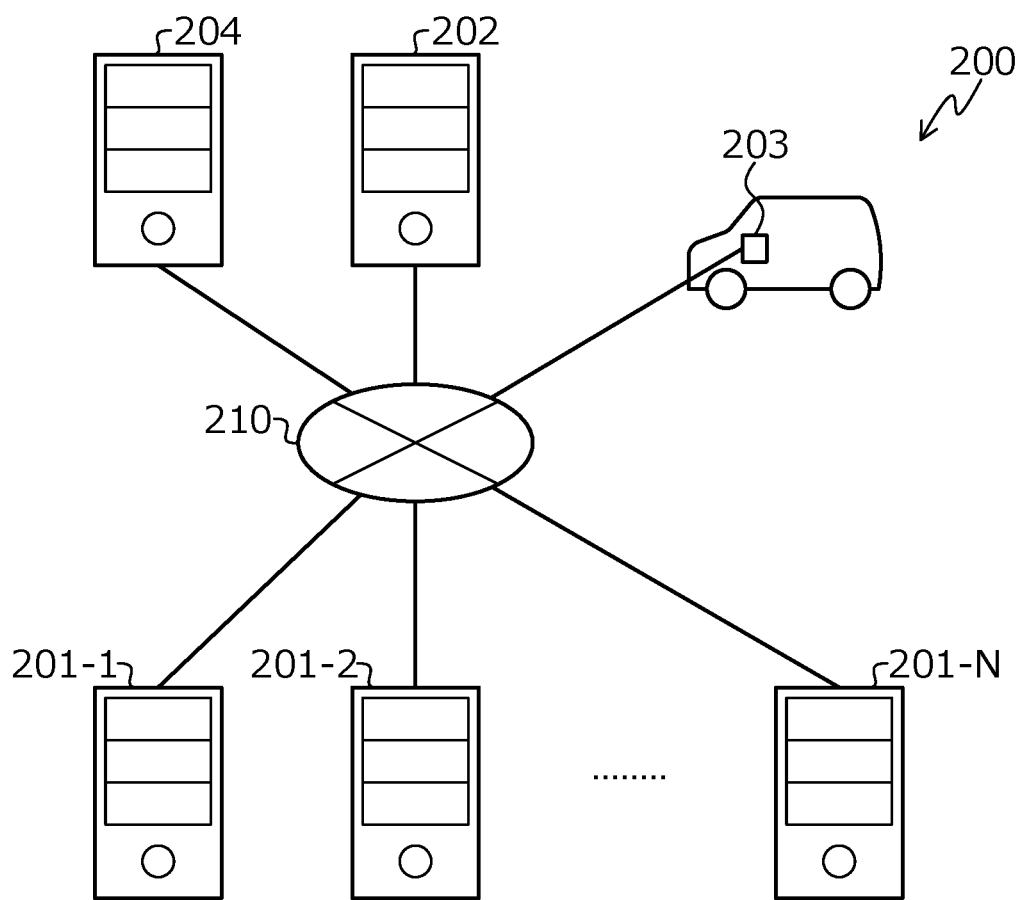
FIG. 2 is an explanatory diagram illustrating an example of a parallel distributed processing system 200.

Next, with reference to FIG. 2, description is given of an example of a parallel distributed processing system 200 to which the information processor 100 illustrated in FIG. 1 is applied.

FIG. 2 is an explanatory diagram illustrating an example of the parallel distributed processing system 200. In FIG. 2, the parallel distributed processing system 200 includes distributed nodes 201-1 to 201-N, a management node 202, a terminal device 203, and a development node 204. In the following description, the distributed nodes 201-1 to 201-N may be simply described as the "distributed nodes 201" without being differentiated from each other.

In the parallel distributed processing system 200, the distributed nodes 201, the management node 202, the terminal device 203, and the development node 204 are connected to each other through a wired or wireless network 210. The network 210 is, for example, a local area network (LAN), a wide area network (WAN), the Internet, or the like.

Each of the distributed nodes 201 is a computer that operates as the information processor 100 illustrated in FIG. 1. Upon receipt of a control message, the distributed node 201 adds, deletes, or updates a plug-in according to the control message. Upon receipt of an event message, the distributed node 201 executes the plug-in according to the event message. The distributed node 201 is, for example, a server, a personal computer (PC), or the like.

The management node 202 is a computer that collects event messages from the terminal device 203 and transmits the event messages to the distributed nodes 201. The management node 202 also transmits control messages to the distributed nodes 201. For example, the management node 202 collects the event messages from the terminal device 203 and stores the collected event messages in an input buffer. The management node 202 generates a control message based on an instruction to generate the control message from the development node 204, for example, and stores the generated control message in the input buffer. Then, the management node 202 transmits the event messages and control messages stored in the input buffer to the distributed nodes 201 in a first-in-first-out (FIFO) manner, for example. The management node 202 is, for example, a server, a PC, or the like.

The terminal device 203 is a computer compatible with things at the source of an event. The terminal device 203 is, for example, a device held by a person. The terminal device 203 is, for example, a device mounted on a mobile object. The mobile object is, for example, a car. The terminal device 203 generates an event message in response to the occurrence of an event, and transmits the event message to the management node 202. The terminal device 203 is, for example, a PC, a tablet terminal, a smartphone, a wearable terminal, or the like.

The development node 204 is a computer that transmits an instruction to generate a control message to the management node 202. The development node 204 transmits the instruction to generate a control message to the management node 202 when adding, deleting, or updating a plug-in for the distributed node 201, for example. The development node 204 is, for example, a server, a PC, or the like.

Although the description is given of the case where the management node 202 is different from the distributed node 201, the embodiment is not limited thereto. For example, the management node 202 may be integrated with any of the distributed nodes 201. Alternatively, the management node 202 may be integrated with the development node 204.

Although the description is given of the case where the distributed node 201, the management node 202, the terminal device 203, and the development node 204 are connected to each other through the network 210, the embodiment is not limited thereto. For example, a network connecting the distributed node 201, the management node 202, and the development node 204 to each other may be different from a network connecting the management node 202 to the terminal device 203.

(Hardware Configuration Example of Distributed Node 201)

Figure 3:
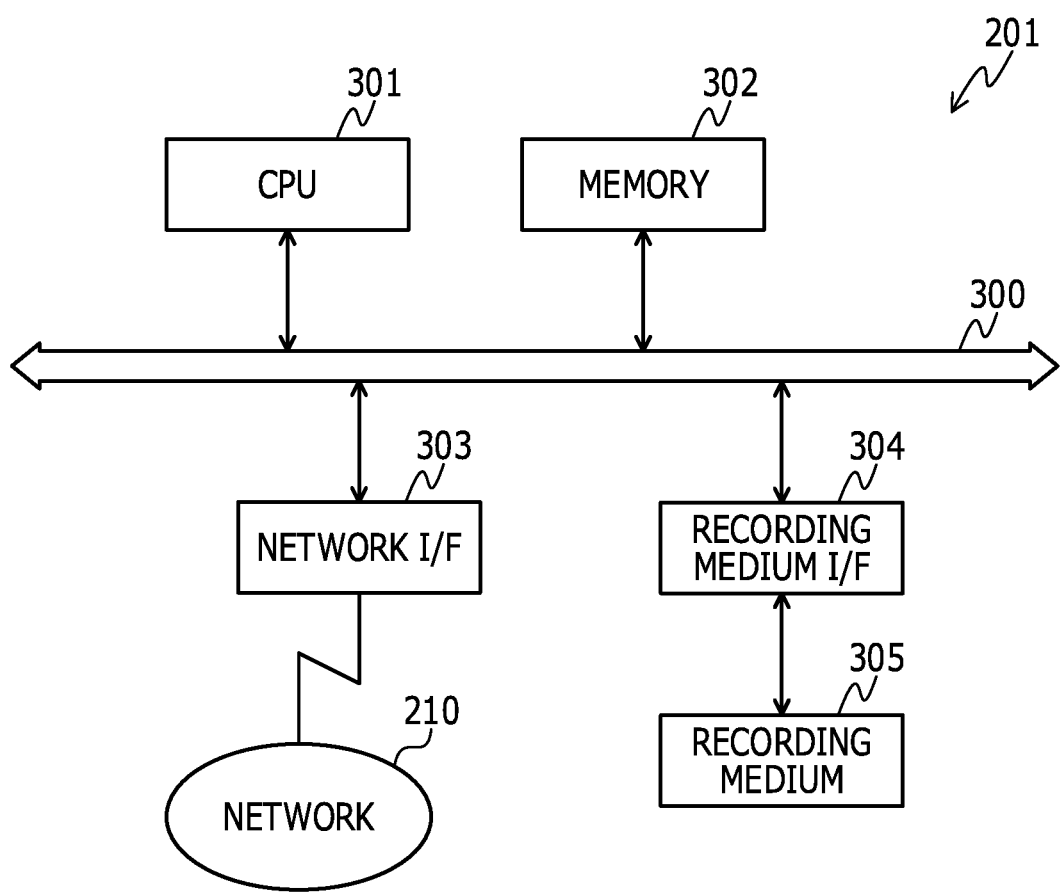
FIG. 3 is a block diagram illustrating a functional configuration example of a distributed node 201.

Next, with reference to FIG. 3, description is given of a hardware configuration example of the distributed node 201.

FIG. 3 is a block diagram illustrating a hardware configuration example of the distributed node 201. In FIG. 3, the distributed node 201 includes a central processing unit (CPU) 301, a memory 302, a network interface (I/F) 303, a recording medium I/F 304, and a recording medium 305. The respective components are connected to each other through a bus 300.

The CPU 301 performs overall control of the distributed node 201. The memory 302 includes, for example, a read only memory (ROM), a random access memory (RAM), a flash ROM, and the like. For example, the flash ROM and the ROM store various programs, while the RAM is used as a work area for the CPU 301. The programs stored in the memory 302 are loaded to the CPU 301 for the CPU 301 to execute encoded processing.

The network I/F 303 is connected to the network 210 through a communication line, and is connected to another computer through the network 210. The network I/F 303 serves as an interface between the network 210 and the inside, and controls input and output of data to and from another computer. For example, a modem, a LAN adapter, or the like may be adopted as the network I/F 303.

The recording medium I/F 304 controls read/write of data from/to the recording medium 305 under the control of the CPU 301. The recording medium I/F 304 is, for example, a disk drive, a solid state drive (SSD), a universal serial bus (USB) port, or the like. The recording medium 305 is a non-volatile memory that stores data written under the control of the recording medium I/F 304. The recording medium 305 is, for example, a disk, a semiconductor memory, a USB memory, or the like. The recording medium 305 may be detachable from the distributed node 201.

The distributed node 201 may further include a keyboard, a mouse, a display, a printer, a scanner, a microphone, a speaker, and the like, for example, in addition to the components described above. The distributed node 201 may include more than one recording medium I/F 304 or more than one recording medium 305. Alternatively, the distributed node 201 does not have to include any recording medium I/F 304 or any recording medium 305.

(Hardware Configuration Example of Management Node 202)

The management node 202 has the same hardware configuration as that of the distributed node 201 illustrated in FIG. 3, and thus description thereof is omitted.

(Hardware Configuration Example of Terminal Device 203)

The terminal device 203 has the same hardware configuration as that of the distributed node 201 illustrated in FIG. 3, and thus description thereof is omitted. The terminal device 203 may further include a sensor device.

The sensor device detects a state of the terminal device 203, for example. The sensor device detects, for example, at least any of the position, movement, and direction of the terminal device 203. The sensor device is realized by at least any of an acceleration sensor, a geomagnetic sensor, an optical sensor, a vibration sensor, and the like, for example. The sensor device may be realized by a global positioning system (GPS) receiver to detect GPS coordinates of the terminal device 203.

The sensor device may acquire biological information, for example. The sensor device acquires information regarding body temperature, pulse, heart rate, respiration, and the like, as the biological information, for example. The sensor device may acquire information regarding fingerprint, veins, facial appearance, voiceprint, palm shape, retina, Iris, and the like, as the biological information, for example. The sensor device may acquire image information, for example.

(Hardware Configuration Example of Development Node 204)

The development node 204 has the same hardware configuration as that of the distributed node 201 illustrated in FIG. 3, and thus description thereof is omitted.

(Functional Configuration Example of Information Processor 100)

Figure 4:
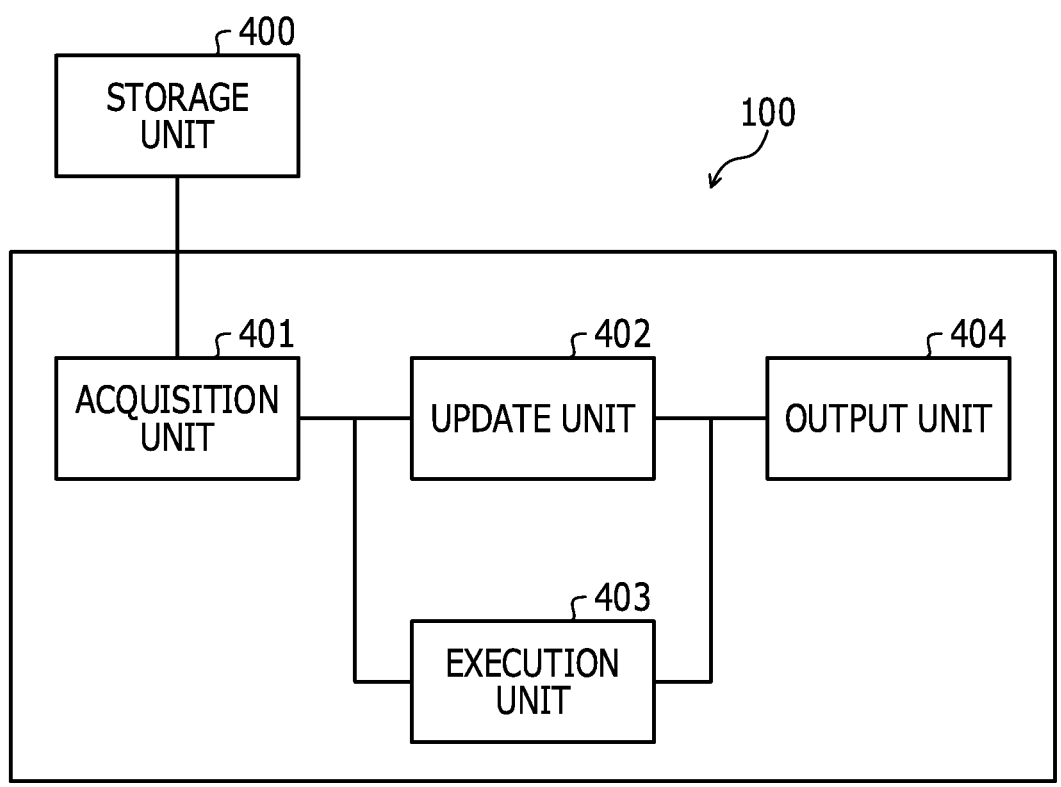
FIG. 4 is a block diagram illustrating a functional configuration example of an information processor 100.

Next, with reference to FIG. 4, description is given of a functional configuration example of the information processor 100.

FIG. 4 is a block diagram illustrating a functional configuration example of the information processor 100. The information processor 100 includes a storage unit 400, an acquisition unit 401, an update unit 402, an execution unit 403, and an output unit 404.

The storage unit 400 is realized by a storage area such as the memory 302 and the recording medium 305 illustrated in FIG. 3, for example. Although the following description is given of the case where the storage unit 400 is included in the information processor 100, the embodiment is not limited thereto. For example, the storage unit 400 may be included in a device different from the information processor 100 and a storage content of the storage unit 400 may be referred to by the information processor 100.

The acquisition unit 401, the update unit 402, the execution unit 403, and the output unit 404 function as an example of a controller. The acquisition unit 401, the update unit 402, the execution unit 403, and the output unit 404 realize their functions by the network I/F 303 or by the CPU 301 executing the programs stored in the storage area such as the memory 302 and the recording medium 305 illustrated in FIG. 3, for example. The processing results from the respective functional units are stored in the storage area such as the memory 302 and the recording medium 305 illustrated in FIG. 3, for example.

The storage unit 400 stores various information to be referred to or updated in the processing by the respective functional units. The storage unit 400 stores a plug-in, for example. The plug-in is a subprogram that may be called from a main program. The storage unit 400 stores the plug-in and information indicating the type of an event, for example, in association with each other. The event is a change in state of a thing. The type represents what state of the thing has changed. Thus, the storage unit 400 makes it possible to execute a plug-in corresponding to the information indicating the type of the event.

The plug-in is stored, for example, as executable format data. The plug-in may be stored in an encoded format. The plug-in may be stored as information indicating a location of the plug-in. The location is, for example, a storage area in the information processor 100. The location may be, for example, a storage area in a device different from the information processor 100.

The storage unit 400 may store, for example, information identifying the source of an event, information indicating the type of the event, and the plug-in in association with each other. The source of the event is a specific thing. The specific thing is, for example, a person, a car, or the like. Thus, the storage unit 400 makes it possible to execute a plug-in corresponding to the information indicating the type of the event for each piece of information identifying the source of the event.

The storage unit 400 may store information identifying the source of an event, information indicating the type of the event, a plug-in, and a valid period of the plug-in, for example, in association with each other. The valid period is a period for which the plug-in may be executed. Thus, the storage unit 400 makes it possible to specify the valid period of the plug-in.

The storage unit 400 may store a plug-in in association with a digest value calculated from information obtained by encoding the plug-in. The digest value is, for example, a hash value. The information obtained by encoding the plug-in may be used as the digest value. Thus, the storage unit 400 makes it possible to acquire a plug-in without decoding the information obtained by encoding the plug-in.

The acquisition unit 401 acquires various information to be used in the processing by the respective functional units, and outputs the information to the respective functional units. For example, the acquisition unit 401 may acquire the various information to be used in the processing by the respective functional units from the storage unit 400, and output the information to the respective functional units. For example, the acquisition unit 401 may acquire the various information to be used in the processing by the respective functional units from a device different from the information processor 100, and output the information to the respective functional units.

The acquisition unit 401 receives a first control message. The first control message represents at least information indicating the type of an event to be an execution condition for a plug-in to be added and information regarding the plug-in in association with each other. The first control message may further represent information identifying the source of the event. The information regarding the plug-in is, for example, an address of a storage area where the plug-in is stored. The information regarding the plug-in may be, for example, information obtained by encoding the plug-in. The event is, for example, a change in state of a person or object. The first control message may further represent information indicating a valid period of the plug-in. The first control message is, for example, collectively transmitted to the distributed node 201 operating as the information processor 100 from the management node 202.

The acquisition unit 401 receives a second control message. The second control message represents at least information indicating the type of an event to be an execution condition for a plug-in to be deleted and information regarding the plug-in in association with each other. The second control message may further represent information identifying the source of the event. The second control message is, for example, collectively transmitted to the distributed node 201 operating as the information processor 100 from the management node 202.

The acquisition unit 401 receives an event message representing information indicating the type of an event. The event message represents at least the information indicating the type of an event. The event message may further represent information indicating the content of the event. The information indicating the content of the event is, for example, information indicating a state of a person or object at a timing when there is a change in state of the person or object. The information indicating the state of the person or object is, for example, information based on information detected by a sensor unit included in the terminal device 203. The event message may further represent information identifying the source of the event. The event message may further represent information indicating the point of occurrence of the event.

The acquisition unit 401 may receive a third control message to change the valid period of the plug-in. The third control message represents at least information indicating the type of an event to be an execution condition for a plug-in whose valid period is to be changed and information regarding the plug-in in association with each other. The third control message may further represent information identifying the source of the event.

The acquisition unit 401 may receive a fourth control message to update the plug-in. The fourth control message is, for example, a message obtained by combining the first and second control messages. The fourth control message represents at least information indicating the type of an event to be an execution condition for a plug-in to be updated and deleted, information regarding the plug-in, and information regarding a new plug-in to be added by update in association with each other. The fourth control message may further represent information identifying the source of the event.

Alternatively, the fourth control message may be, for example, a message obtained by combining the first and third control messages. The fourth control message represents at least information indicating the type of an event to be an execution condition for a plug-in to be deleted by changing the valid period, information regarding the plug-in, and information regarding a new plug-in to be added by update in association with each other. The fourth control message may further represent information identifying the source of the event.

The acquisition unit 401 receives a synchronization message that is regularly issued. The synchronization message is, for example, a barrier message. The barrier message represents an instruction to back up the storage content in the storage unit 400. The barrier message represents, for example, a backup instruction to recover a failure with distributed checkpoints. The backup is, for example, saving the storage content as the checkpoints in an external storage device. The barrier message is transmitted from the management node 202, for example.

The update unit 402 stores a plug-in in the storage unit 400.

Upon receipt of the first control message, for example, the update unit 402 stores a plug-in and information indicating the type of an event specified from the received first control message, in association with each other, in the storage unit 400. Thus, the update unit 402 may add a new plug-in to the processing program upon receipt of the first control message, and may update the processing program.

Upon receipt of the first control message, for example, the update unit 402 may store information identifying the source of an event specified from the received first control message, information indicating the type of the event, and a plug-in, in association with each other, in the storage unit 400. The update unit 402 performs, for example, operations as in operation example 1 to be described later with reference to FIGS. 5 to 7. Thus, the update unit 402 may store a different plug-in for each source of an event.

The update unit 402 may store, for example, information identifying the source of an event specified from the received first control message, information indicating the type of the event, a plug-in, and a valid period of the plug-in, in association with each other, in the storage unit 400. The update unit 402 performs, for example, operations as in operation example 2 to be described later with reference to FIGS. 15 and 16. Thus, the update unit 402 may store plug-ins so as to reduce inconsistency in processing.

Upon receipt of the first control message, the update unit 402 may wait to receive a synchronization message that is regularly issued. The update unit 402 receives the synchronization message and backs up the storage content in the storage unit 400. The backup is, for example, saving the storage content as checkpoints in an external storage device. After the backup, the update unit 402 stores information identifying the source of an event specified from the received first control message, information indicating the type of the event, and a plug-in, in association with each other, in the storage unit 400. The update unit 402 performs, for example, operations as in operation example 4 to be described later with reference to FIGS. 26 and 27. Thus, the update unit 402 makes it possible to normally execute the backup.

Upon receipt of the first control message, for example, the update unit 402 may decode a plug-in from information obtained by encoding the plug-in included in the received first control message. The update unit 402 stores information identifying the source of an event included in the received first control message, information indicating the type of the event, and the decoded plug-in, in association with each other, in the storage unit 400. The update unit 402 performs, for example, operations as in operation example 5 to be described later with reference to FIGS. 35 to 37. Thus, the update unit 402 may avoid access concentration due to the acquisition of the plug-in.

Upon receipt of the first control message, for example, the update unit 402 may decode the plug-in if a digest value calculated from the information obtained by encoding the plug-in included in the received first control message is not stored in the storage unit 400. The update unit 402 stores the decoded plug-in in association with the digest value in the storage unit 400. The update unit 402 performs, for example, operations as in operation example 6 to be described later with reference to FIGS. 42 to 44. Thus, the update unit 402 makes it possible to acquire and reuse the decoded plug-in when subsequently receiving information obtained by encoding the same plug-in.

Upon receipt of the first control message, for example, the update unit 402 may acquire the plug-in from the storage unit 400 if a digest value calculated from the information obtained by encoding the plug-in included in the received first control message is stored in the storage unit 400. The update unit 402 performs, for example, operations as in operation example 6 to be described later with reference to FIGS. 42 to 44. Thus, the update unit 402 makes it possible to reduce the load of decoding.

The update unit 402 deletes the plug-in from the storage unit 400.

Upon receipt of the second control message, for example, the update unit 402 deletes the plug-in stored in the storage unit 400 in association with the information indicating the type of the event specified from the received second control message. Thus, the update unit 402 may delete the plug-in from the processing program and may update the processing program.

Upon receipt of the second control message, for example, the update unit 402 may delete the plug-in stored in the storage unit 400 in association with the information identifying the source of the event and the information indicating the type of the event specified from the received second control message. Thus, the update unit 402 may selectively delete the plug-in corresponding to the source of a specific event and may update the processing program.

Upon receipt of the second control message, for example, the update unit 402 may specify the plug-in stored in the storage unit 400 in association with the information identifying the source of the event and the information indicating the type of the event specified from the received second control message. When the specified plug-in corresponds to the plug-in specified from the second control message, the update unit 402 deletes the plug-in. The update unit 402 performs, for example, operations as in operation example 1 to be described later with reference to FIGS. 5 to 7. Thus, the update unit 402 may delete the plug-in from the processing program and may update the processing program. Even when there is more than one plug-in corresponding to the same combination of the source of the event and the type of the event, the update unit 402 may selectively delete any one of the plug-ins.

The update unit 402 may specify a valid period of a plug-in, which is stored in the storage unit 400 in association with the information identifying the source of the event and the information indicating the type of the event specified from the received event message, for example. When the point of occurrence of the event specified from the event message is after the specified period, the update unit 402 deletes the plug-in. The update unit 402 performs, for example, operations as in operation example 2 to be described later with reference to FIGS. 15 and 16. Thus, the update unit 402 may delete the plug-in from the processing program and may update the processing program.

Upon receipt of a synchronization message, the update unit 402 may specify the valid period of the plug-in stored in the storage unit 400 after backing up the storage content in the storage unit 400. When the point of occurrence of the event specified from the last received event message is after the specified period, the update unit 402 deletes the plug-in. The update unit 402 performs, for example, operations as in operation example 3 to be described later with reference to FIGS. 21 and 22. Thus, the update unit 402 makes it possible to normally execute the backup.

Upon receipt of the second control message, for example, the update unit 402 may wait to receive a synchronization message. The update unit 402 receives the synchronization message and backs up the storage content in the storage unit 400. After the backup, the update unit 402 specifies a plug-in stored in the storage unit 400 in association with the information identifying the source of the event and the information indicating the type of the event specified from the received second control message. When the specified plug-in corresponds to the plug-in specified from the second control message, the update unit 402 deletes the plug-in. The update unit 402 performs, for example, operations as in operation example 4 to be described later with reference to FIGS. 26 and 27. Thus, the update unit 402 makes it possible to reduce inconsistency in processing.

Upon receipt of a third control message to change the valid period of the plug-in, the update unit 402 may change the valid period of the plug-in. For example, the update unit 402 changes the valid period of the plug-in stored in the storage unit 400 in association with the information identifying the source of the event and the information indicating the type of the event specified from the third control message. Thus, the update unit 402 may update the valid period of the plug-in.

Upon receipt of a fourth control message to update the plug-in, the update unit 402 may update the plug-in. For example, the update unit 402 realizes the update of the plug-in by combining addition of a plug-in according to the first control message and deletion of the plug-in according to the second control message. Thus, the update unit 402 may update the plug-in and may update the processing program.

For example, the update unit 402 may realize the update of the plug-in by combining addition of a plug-in according to the first control message and deletion of the plug-in by changing the valid period of the plug-in according to the third control message. Thus, the update unit 402 may update the plug-in and may update the processing program.

The execution unit 403 executes the plug-in.

Upon receipt of an event message, for example, the execution unit 403 executes the plug-in stored in the storage unit 400 in association with the information indicating the type of the event specified from the received event message. Thus, the execution unit 403 may process the event message.

Upon receipt of an event message, for example, the execution unit 403 executes the plug-in stored in the storage unit 400 in association with the information identifying the source of the event and the information indicating the type of the event specified from the received event message. The execution unit 403 performs, for example, operations as in operation example 1 to be described later with reference to FIGS. 5 to 7. Thus, the execution unit 403 may change the processing content of the event message for each source of the event.

For example, the execution unit 403 may specify the valid period of the plug-in stored in the storage unit 400 in association with the information identifying the source of the event and the information indicating the type of the event specified from the received event message. When the point of occurrence of the event specified from the event message is included in the specified period, the execution unit 403 executes the plug-in. The execution unit 403 performs, for example, operations as in operation example 2 to be described later with reference to FIGS. 15 and 16. Thus, the execution unit 403 may reduce inconsistency in processing.

The output unit 404 outputs the execution result of the plug-in. The output format is, for example, display on a display, print output to a printer, transmission to an external device through the network I/F 303, or storage in a storage area such as the memory 302 and the recording medium 305. Thus, the output unit 404 makes it possible to utilize the execution result of the plug-in.

The output unit 404 may output the processing results from the respective functional units. Thus, the output unit 404 makes it possible to notify a user of the processing results from the respective functional units, and to support the management and operation of the information processor 100, for example, update of settings for the information processor 100, and the like. As a result, the user-friendliness of the information processor 100 may be improved.

Operation Example 1 of Parallel Distributed Processing System 200

Figure 5:
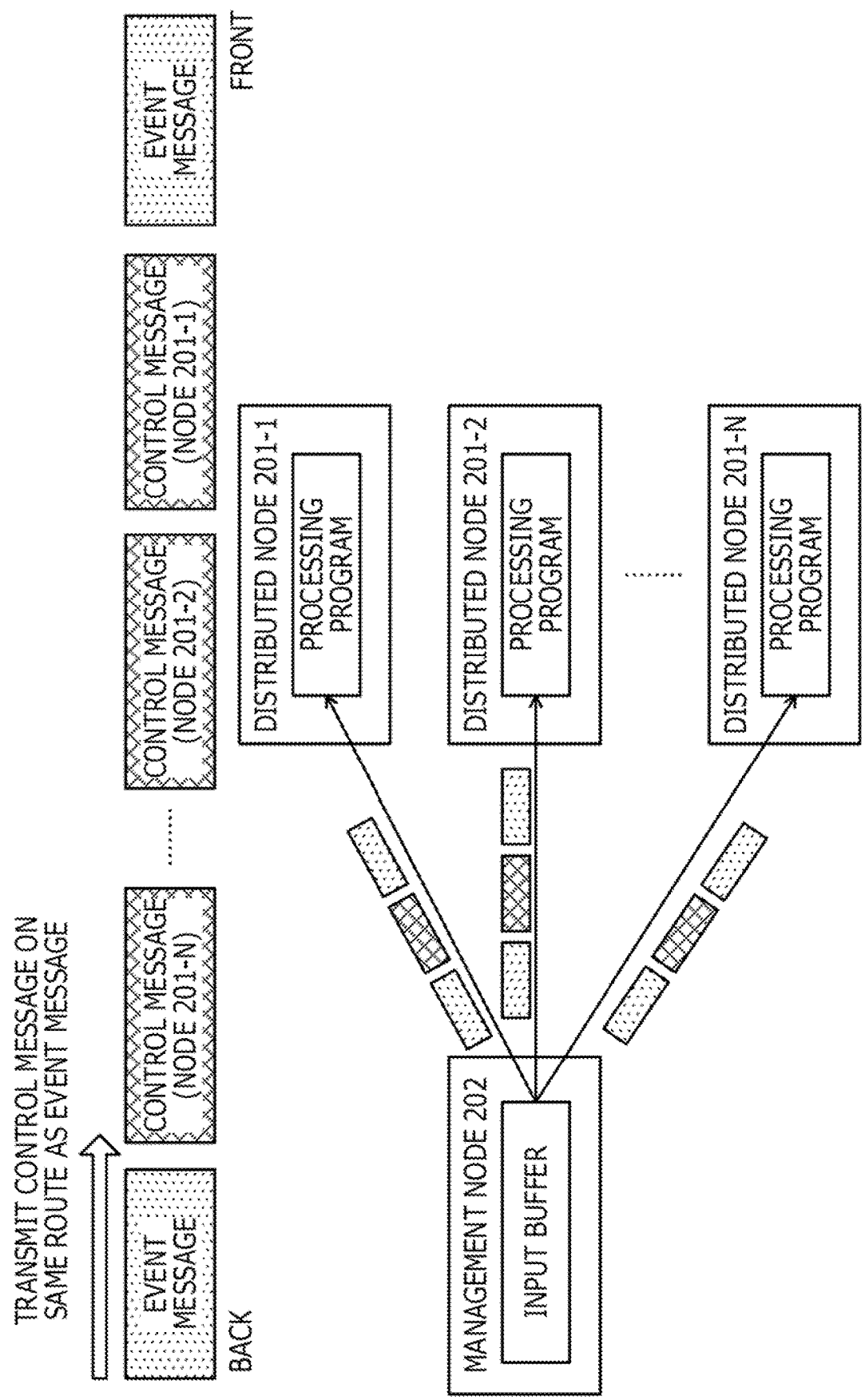
FIG. 5 is an explanatory diagram illustrating a flow of operations of the parallel distributed processing system 200 in operation example 1.
Figure 6:
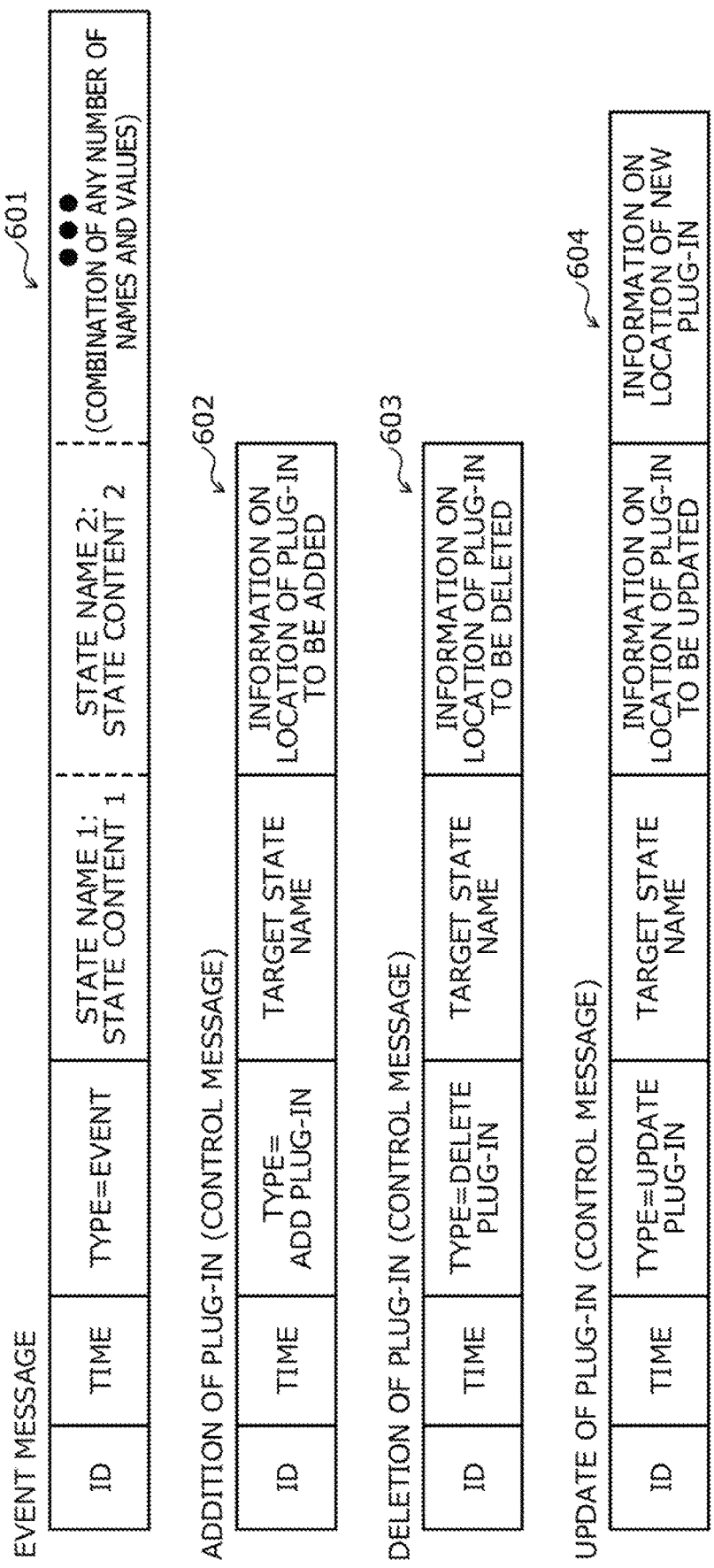
FIG. 6 is an explanatory diagram illustrating an example of various messages in operation example 1.
Figure 7:
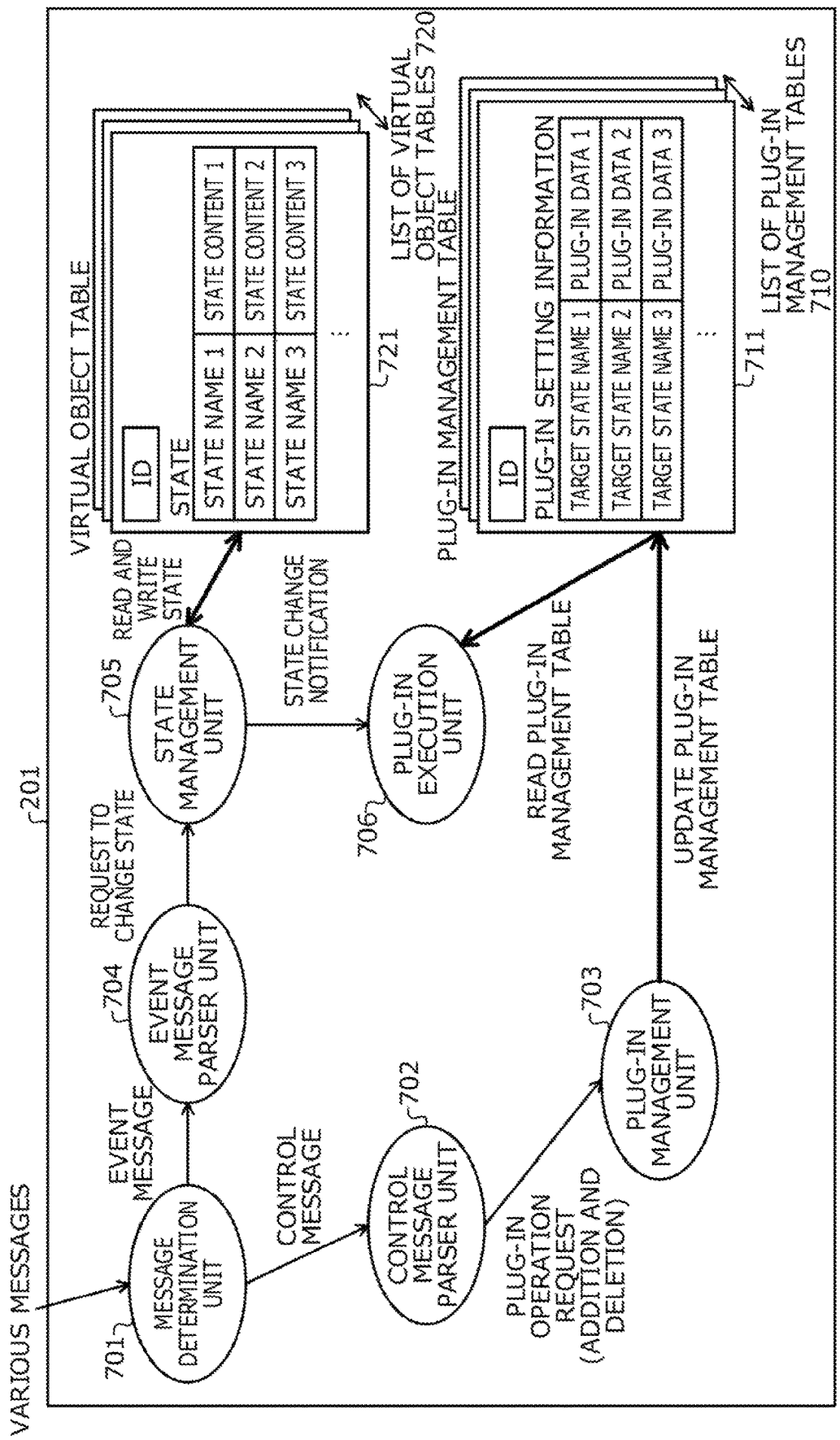
FIG. 7 is an explanatory diagram illustrating a specific functional configuration example of the distributed node 201 in operation example 1.

Next, with reference to FIGS. 5 to 7, description is given of operation example 1 of the parallel distributed processing system 200. First, with reference to FIG. 5, description is given of a flow of operations of the parallel distributed processing system 200 in operation example 1.

FIG. 5 is an explanatory diagram illustrating the flow of operations of the parallel distributed processing system 200 in operation example 1. In operation example 1, the management node 202 transmits a control message to the distributed node 201 through the same path as that of an event message.

Upon receipt of the event message, for example, the management node 202 adds the control message to an input buffer. For example, the management node 202 collectively adds control messages to the input buffer so as to avoid mixed transmission of event messages between the start of the transmission of the control messages to the respective distributed nodes 201 and the end of the transmission. The management node 202 transmits the event message and the control message to the distributed node 201 in order of storage in the input buffer.

The distributed node 201 processes the event message and the control message in order of reception. Upon receipt of the control message, for example, the distributed node 201 adds, deletes, or updates a plug-in according to the control message. Upon receipt of the event message, for example, the distributed node 201 executes the plug-in according to the event message. Thus, the distributed node 201 may update the processing program by adding, deleting, or updating the plug-in for the processing program.

The parallel distributed processing system 200 may reduce the occurrence of inconsistency in processing by collectively transmitting the control messages to the respective distributed nodes 201. The parallel distributed processing system 200 enables all the event messages transmitted before the control messages to be processed by a pre-update processing program. At the same time, the parallel distributed processing system 200 enables all the event messages transmitted after the control messages to be processed by a post-update processing program.

The distributed node 201 may receive the event message also when updating the processing program. The parallel distributed processing system 200 may keep transmitting the event messages without stopping the transmission of the event messages after transmitting the control message to each distributed node 201. Therefore, the parallel distributed processing system 200 may dynamically update the processing program without being stopped, and may thus suppress the occurrence of processing time-out. The parallel distributed processing system 200 may realize the update of the processing program without increasing the number of the distributed nodes 201.

Next, description is given of an example of various messages in operation example 1 with reference to FIG. 6, followed by description of a specific functional configuration example of the distributed node 201 when receiving various messages in operation example 1 with reference to FIG. 7.

FIG. 6 is an explanatory diagram illustrating an example of various messages in operation example 1. In operation example 1, the parallel distributed processing system 200 uses, for example, an event message 601, a control message 602 to add a plug-in, a control message 603 to delete the plug-in, and a control message 604 to update the plug-in.

The event message 601 includes fields of ID, time, type, and one or more states. The state is a combination of state name and state content. In the ID field, an ID is set as information identifying a thing at the source of an event. In the time field, the time of occurrence of the event is set. In the type field, "event" is set as the type of the message.

In the state field, information regarding an event that has occurred about the thing. In the state field, for example, a state name and a state content are set. The state name is information indicating the type of the event. The state name indicates, for example, what state of the thing has changed. The state is, for example, a speed. The state content is information indicating the content of the event. The state content is, for example, a feature amount indicating the state of the thing. The feature amount is the value of the speed.

The control message 602 to add a plug-in includes fields of ID, time, type, target state name, and information on location of plug-in to be added. In the ID field, an ID is set as information identifying a thing at the source of an event. In the time field, the time of generation of the control message is set. In the type field, "add plug-in" is set as the type of message.

In the target state name field, a target state name is set as information indicating the type of an event to be a plug-in execution condition. In the field of information on the location of plug-in to be added, an address of a storage area is set, where plug-in data that is plug-in executable format data is stored.

The control message 603 to delete a plug-in includes fields of ID, time, type, target state name, and information on location of plug-in to be deleted. In the ID field, an ID is set as information identifying a thing at the source of an event. In the time field, the time of generation of the control message is set. In the type field, "delete plug-in" is set as the type of message.

In the target state name field, a target state name is set as information indicating the type of an event to be a plug-in execution condition. In the field of information on the location of plug-in to be deleted, an address of a storage area is set, where plug-in data that is plug-in executable format data is stored.

The control message 604 to update a plug-in includes fields of ID, time, type, target state name, information on location of plug-in to be updated, and information on location of new plug-in. In the ID field, an ID is set as information identifying a thing at the source of an event. In the time field, the time of generation of the control message is set. In the type field, "update plug-in" is set as the type of message.

In the target state name field, a target state name is set as information indicating the type of an event to be a plug-in execution condition. In the field of information on the location of plug-in to be updated, an address of a storage area is set, where plug-in data that is executable format data on a plug-in to be deleted by update is stored. In the field of information on the location of new plug-in, an address of a storage area is set, where plug-in data that is executable format data on a plug-in to be added by update is stored.

FIG. 7 is an explanatory diagram illustrating a specific functional configuration example of the distributed node 201 in operation example 1. As illustrated in FIG. 7, the distributed node 201 includes a list 720 of virtual object tables 721. The virtual object tables 721 are realized, for example, by storage areas such as the memory 302 and the recording medium 305 in the distributed node 201 illustrated in FIG. 3.

The virtual object table 721 includes an ID field. In the virtual object table 721, a state name field and a state content field are associated with each other. The virtual object table 721 stores records by setting information in the respective fields.

In the ID field, an ID is set as information identifying a thing at the source of an event. In the state name field, a state name is set as information indicating the type of the event. In the state content field, a state content is set as information indicating the content of the event.

As illustrated in FIG. 7, the distributed node 201 includes a list 710 of plug-in management tables 711. The plug-in management tables 711 are realized, for example, by storage areas such as the memory 302 and the recording medium 305 in the distributed node 201 illustrated in FIG. 3.

The plug-in management table 711 includes an ID field. The plug-in management table 711 further includes a target state name field and a plug-in data field, which are associated with each other. The plug-in management table 711 stores records by setting information in the respective fields. In the following description, the target state name and the plug-in data may be collectively described as "plug-in setting information".

In the ID field, an ID is set as information identifying a thing at the source of an event. In the target state name field, a target state name is set as information indicating the type of an event to be a plug-in execution condition. In the plug-in data field, plug-in data that is plug-in executable format data is set.

As illustrated in FIG. 7, the distributed node 201 includes a message determination unit 701, a control message parser unit 702, a plug-in management unit 703, an event message parser unit 704, a state management unit 705, and a plug-in execution unit 706.

The message determination unit 701 receives input of any of the event message 601, the control message 602 to add a plug-in, the control message 603 to delete the plug-in, and the control message 604 to update the plug-in. The message determination unit 701 determines the type of the inputted message, and hands over the message to the control message parser unit 702 or the event message parser unit 704.

The control message parser unit 702 interprets the control message 602 to add the plug-in, the control message 603 to delete the plug-in, and the control message 604 to update the plug-in. The control message parser unit 702 extracts the ID, target state name, and information on the location of the plug-in to be added from the control message 602 to add the plug-in, for example, and hands over the extracted information to the plug-in management unit 703.

The control message parser unit 702 extracts the ID, target state name, and information on the location of the plug-in to be deleted from the control message 603 to delete the plug-in, for example, and hands over the extracted information to the plug-in management unit 703. The control message parser unit 702 extracts the ID, target state name, information on the location of the plug-in to be updated, and information on the location of new plug-in from the control message 604 to update the plug-in, for example. Then, the control message parser unit 702 hands over the extracted information to the plug-in management unit 703.

The plug-in management unit 703 updates the plug-in management table 711 based on the information handed over from the control message parser unit 702. The plug-in management unit 703 receives, for example, the ID, the target state name, and the information on the location of the plug-in to be added. The plug-in management unit 703 specifies the plug-in management table 711 corresponding to the received ID. The plug-in management unit 703 acquires plug-in data that is executable format data on the plug-in to be added, based on the information on the location of the plug-in to be added. The plug-in management unit 703 adds the received target state name and the acquired plug-in data, in association with each other, to the specified plug-in management table 711.

The plug-in management unit 703 receives, for example, the ID, the target state name, and the information on the location of the plug-in to be deleted. The plug-in management unit 703 specifies the plug-in management table 711 corresponding to the received ID. The plug-in management unit 703 acquires plug-in data that is executable format data on the plug-in to be deleted, based on the information on the location of the plug-in to be deleted. When the specified plug-in management table 711 includes plug-in data corresponding to the acquired plug-in data, the plug-in management unit 703 deletes the plug-in data, in association with the received target state name, from the plug-in management table 711.

The plug-in management unit 703 receives, for example, the ID, the target state name, the information on the location of the plug-in to be updated, and the information on the location of new plug-in. The plug-in management unit 703 specifies the plug-in management table 711 corresponding to the received ID. The plug-in management unit 703 acquires plug-in data that is executable format data on the plug-in to be updated and deleted, based on the information on the location of the plug-in to be updated. The plug-in management unit 703 acquires plug-in data that is new plug-in executable format data based on the information on the location of the new plug-in.

When the specified plug-in management table 711 includes plug-in data corresponding to the plug-in data to be updated and deleted, the plug-in management unit 703 deletes the plug-in data, in association with the received target state name, from the plug-in management table 711. The plug-in management unit 703 adds the received target state name and the acquired new plug-in data, in association with each other, in the specified plug-in management table 711.

The event message parser unit 704 interprets the event message 601 to extract an ID and one or more states, and hands over the extracted information to the state management unit 705. The state management unit 705 receives the ID and one or more states. The state management unit 705 specifies the virtual object table 721 corresponding to the received ID. The state management unit 705 updates the specified virtual object table 721 with the received one or more states. When the state content of any of the states is changed, the state management unit 705 transmits a change notification including the ID and the state name of the state to the plug-in execution unit 706.

The plug-in execution unit 706 specifies the plug-in management table 711 corresponding to the ID included in the change notification. The plug-in execution unit 706 uses the state name included in the change notification to search through the specified plug-in management table 711 for a target state name. The plug-in execution unit 706 executes plug-in data associated with the searched target state name. The plug-in execution unit 706 executes no plug-in data when having failed to search for any target state name.

Thus, the distributed node 201 may update the processing program by adding, deleting, or updating the plug-in for the processing program. The parallel distributed processing system 200 may reduce the occurrence of inconsistency in processing by collectively transmitting the control messages to the respective distributed nodes 201. The parallel distributed processing system 200 enables all the event messages transmitted before the control messages to be processed by a pre-update processing program. At the same time, the parallel distributed processing system 200 enables all the event messages transmitted after the control messages to be processed by a post-update processing program.

The distributed node 201 may receive the event message also when updating the processing program. The parallel distributed processing system 200 may keep transmitting the event messages without stopping the transmission of the event messages after transmitting the control message to each distributed node 201. Therefore, the parallel distributed processing system 200 may dynamically update the processing program without being stopped, and may thus suppress the occurrence of processing time-out. The parallel distributed processing system 200 may realize the update of the processing program without increasing the number of the distributed nodes 201. Since the management node 202 does not have to suspend the transmission of the event messages, the size of the storage area used by the input buffer may be reduced.

(Overall Processing Procedure in Operation Example 1)

Figure 8:
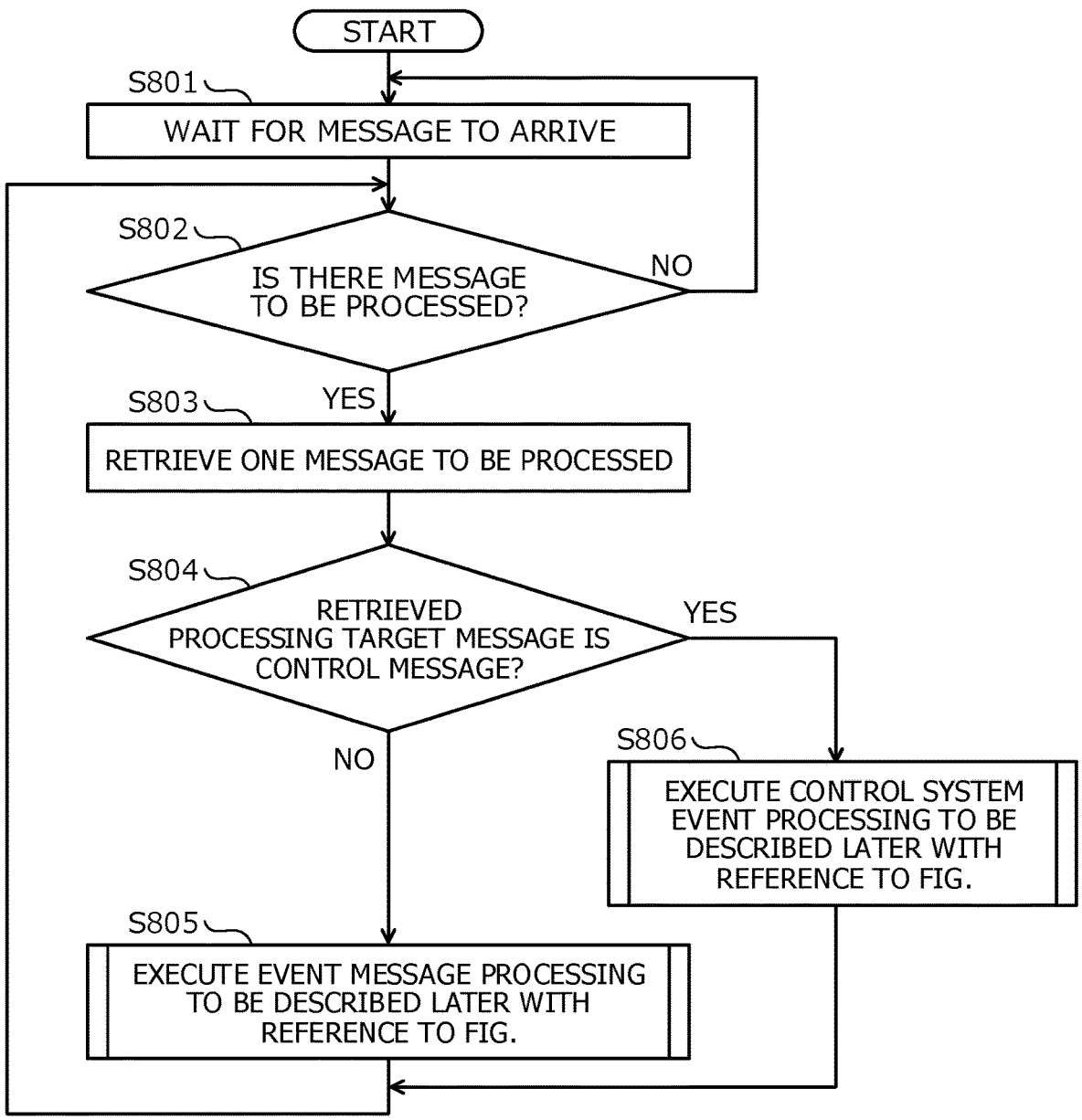
FIG. 8 is a flowchart illustrating an example of an overall processing procedure in operation example 1.

Next, with reference to FIG. 8, description is given of an example of an overall processing procedure in operation example 1, which is executed by the distributed node 201. The overall processing is realized, for example, by the CPU 301, the storage area such as the memory 302 and the recording medium 305, and the network I/F 303 illustrated in FIG. 3.

FIG. 8 is a flowchart illustrating an example of the overall processing procedure in operation example 1. In FIG. 8, the distributed node 201 waits for a message to arrive (Step S801). Then, the distributed node 201 moves to Step S802.

In Step S802, the distributed node 201 determines whether or not there is a message to be processed (Step S802). When there is no message to be processed (Step S802: No), the distributed node 201 returns to Step S801. On the other hand, when there is a message to be processed (Step S802: Yes), the distributed node 201 moves to Step S803.

In Step S803, the distributed node 201 retrieves one of the messages to be processed (Step S803).

Then, the distributed node 201 determines whether or not the retrieved processing target message is a control message (Step S804). When the retrieved message is not the control message (Step S804: No), the distributed node 201 moves to Step S805. On the other hand, when the retrieved message is the control message (Step S804: Yes), the distributed node 201 moves to Step S806.

In Step S805, the distributed node 201 executes event message processing to be described later with reference to FIG. 9 (Step S805). Then, the distributed node 201 returns to Step S802.

In Step S806, the distributed node 201 executes control system event processing to be described later with reference to FIG. 11 (Step S806). Then, the distributed node 201 returns to Step S802.

(Event Message Processing Procedure in Operation Example 1)

Next, with reference to FIG. 9, description is given of an example of an event message processing procedure in operation example 1, which is executed by the distributed node 201. The event message processing is realized, for example, by the CPU 301, the storage area such as the memory 302 and the recording medium 305, and the network I/F 303 illustrated in FIG. 3.

Figure 9A:
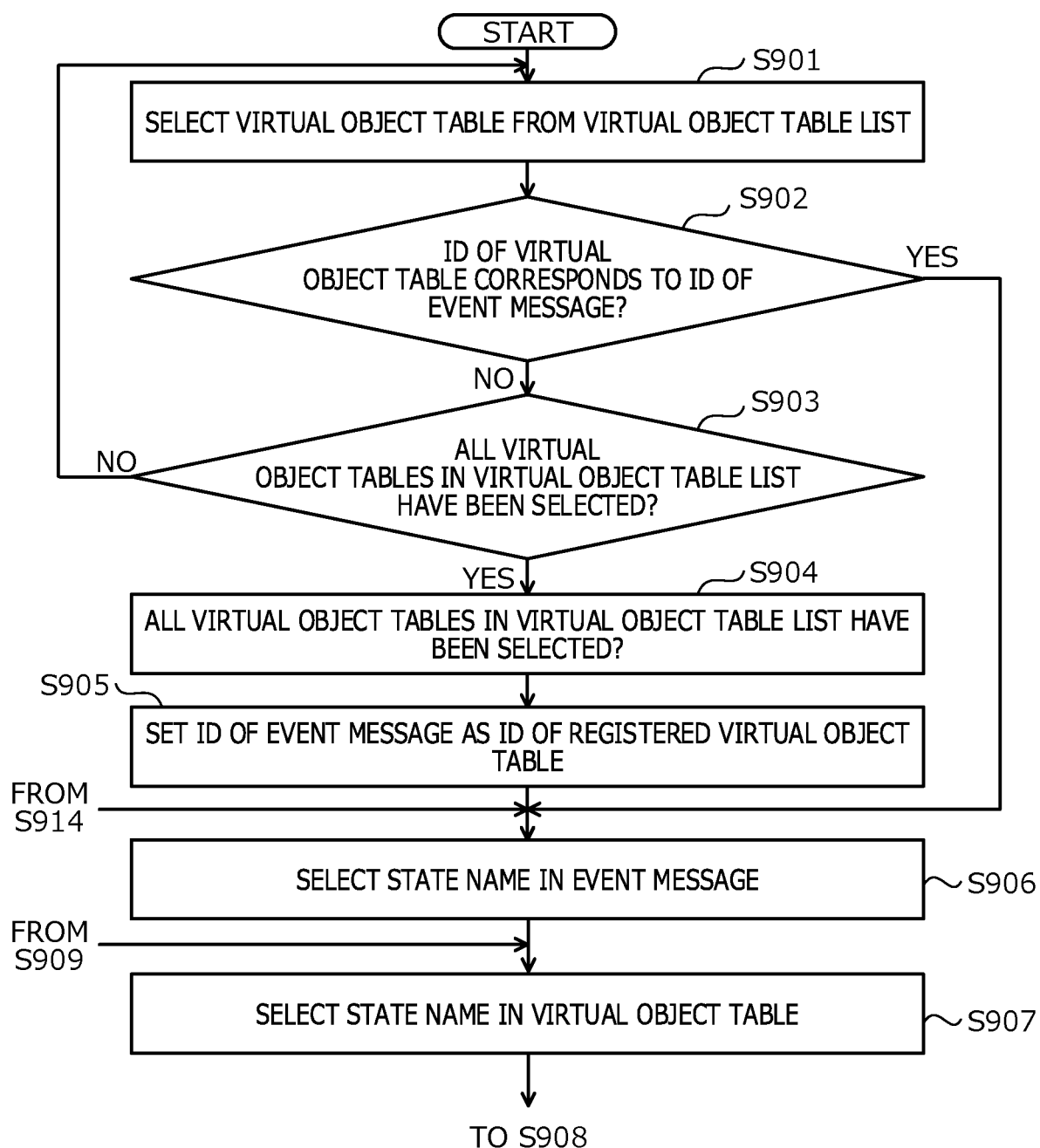
FIGS. 9A and 9B are a flowchart illustrating an example of an event message processing procedure in operation example 1.
Figure 9B:
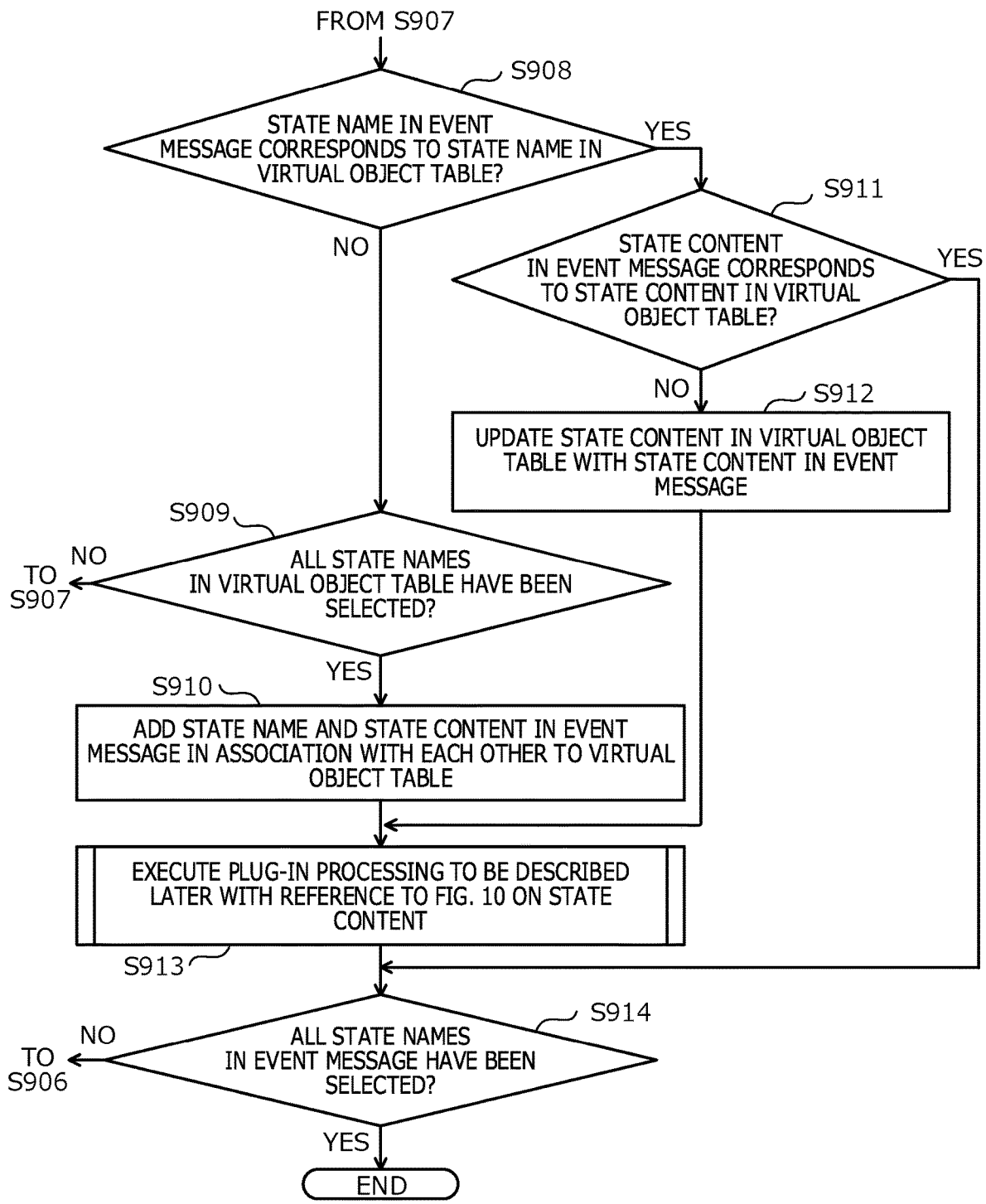

FIG. 9 (i.e. FIGS. 9A and 9B) is a flowchart illustrating an example of the event message processing procedure in operation example 1. In FIG. 9, the distributed node 201 selects one virtual object table 721 from the list 720 of virtual object tables 721 (Step S901).

Next, the distributed node 201 determines whether or not the ID of the selected virtual object table 721 corresponds to the ID of the retrieved event message (Step S902). When the both IDs correspond to each other (Step S902: Yes), the distributed node 201 moves to Step S906. On the other hand, when the both IDs do not correspond to each other (Step S902: No), the distributed node 201 moves to Step S903.

In Step S903, the distributed node 201 determines whether or not all the virtual object tables 721 have been selected from the list 720 of virtual object tables 721 (Step S903). When there is any virtual object table 721 yet to be selected (Step S903: No), the distributed node 201 returns to Step S901. On the other hand, when all the virtual object tables 721 have been selected (Step S903: Yes), the distributed node 201 moves to Step S904.

In Step S904, the distributed node 201 generates a new virtual object table 721 to register in the list 720 of virtual object tables 721 (Step S904). Then, the distributed node 201 sets the ID of the event message as the ID of the registered virtual object table 721 (Step S905). Thereafter, the distributed node 201 moves to Step S906.

In Step S906, the distributed node 201 selects the state name in the event message (Step S906). Then, the distributed node 201 selects the state name in the virtual object table 721 (Step S907).

Thereafter, the distributed node 201 determines whether or not the state name in the event message corresponds to the state name in the virtual object table 721 (Step S908). When the both state names do not correspond to each other (Step S908: No), the distributed node 201 moves to Step S909. On the other hand, when the both state names correspond to each other (Step S908: Yes), the distributed node 201 moves to Step S911.

In Step S909, the distributed node 201 determines whether or not all the state names in the virtual object table 721 have been selected (Step S909). When there is any state name yet to be selected (Step S909: No), the distributed node 201 returns to Step S907. On the other hand, when all the state names have been selected (Step S909: Yes), the distributed node 201 moves to Step S910.

In Step S910, the distributed node 201 adds the state name and the state content in the event message, in association with each other, to the virtual object table 721 (Step S910). Then, the distributed node 201 moves to Step S913.

In Step S911, the distributed node 201 determines whether or not the state content in the event message corresponds to the state content in the virtual object table 721 (Step S911). When the both state contents do not correspond to each other (Step S911: No), the distributed node 201 moves to Step S912. On the other hand, when the both state contents correspond to each other (Step S911: Yes), the distributed node 201 moves to Step S914.

In Step S912, the distributed node 201 updates the state content in the virtual object table 721 with the state content in the event message (Step S912). Then, the distributed node 201 moves to Step S913.

In Step S913, the distributed node 201 executes plug-in processing to be described later with reference to FIG. 10 on the state content (Step S913). Then, the distributed node 201 moves to Step S914.

In Step S914, the distributed node 201 determines whether or not all the state names in the event message have been selected (Step S914). When there is any state name yet to be selected (Step S914: No), the distributed node 201 returns to Step S906. On the other hand, when all the state names have been selected (Step S914: Yes), the distributed node 201 terminates the event message processing.

(Plug-in Processing Procedure in Operation Example 1)

Figure 10:
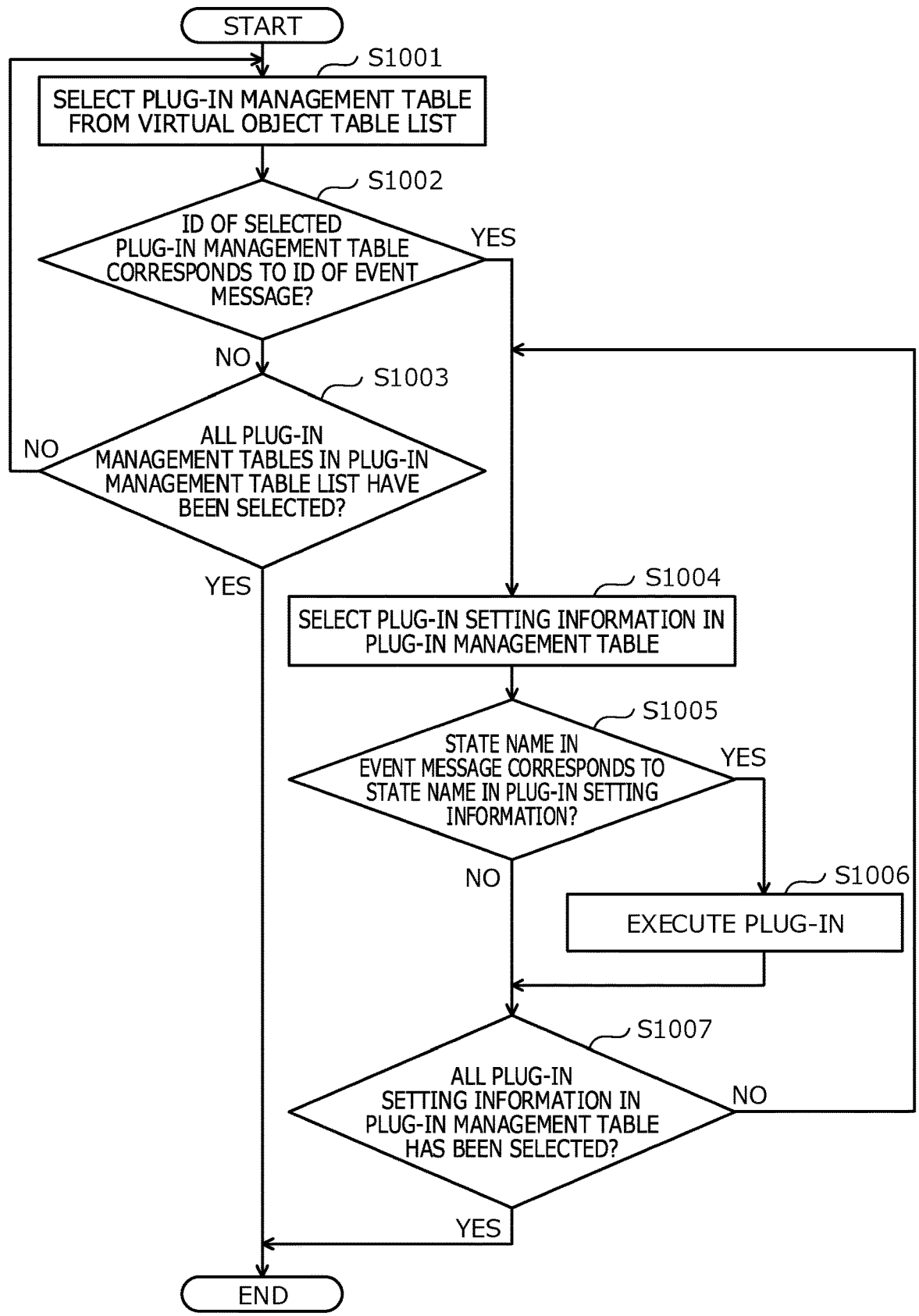
FIG. 10 is a flowchart illustrating an example of a plug-in processing procedure in operation example 1.

Next, with reference to FIG. 10, description is given of an example of a plug-in processing procedure in operation example 1, which is executed by the distributed node 201. The plug-in processing is realized, for example, by the CPU 301, the storage area such as the memory 302 and the recording medium 305, and the network I/F 303 illustrated in FIG. 3.

FIG. 10 is a flowchart illustrating an example of the plug-in processing procedure in operation example 1. In FIG. 10, the distributed node 201 selects one plug-in management table 711 from the list 710 of plug-in management tables 711 (Step S1001).

Next, the distributed node 201 determines whether or not the ID of the selected plug-in management table 711 corresponds to the ID of the retrieved event message (Step S1002). When the both IDs do not correspond to each other (Step S1002: No), the distributed node 201 moves to Step S1003. On the other hand, when the both IDs correspond to each other (Step S1002: Yes), the distributed node 201 moves to Step S1004.

In Step S1003, the distributed node 201 determines whether or not all the plug-in management tables 711 have been selected from the list 710 of plug-in management tables 711 (Step S1003). When there is any plug-in management table 711 yet to be selected (Step S1003: No), the distributed node 201 returns to Step S1001. On the other hand, when all the plug-in management tables 711 have been selected (Step S1003: Yes), the distributed node 201 terminates the plug-in processing.

In Step S1004, the distributed node 201 selects plug-in setting information in the plug-in management table 711 (Step S1004).

Next, the distributed node 201 determines whether or not the state name in the event message corresponds to the state name in the plug-in setting information (Step S1005). When the both state names correspond to each other (Step S1005: Yes), the distributed node 201 moves to Step S1006. On the other hand, when the both state names do not correspond to each other (Step S1005: No), the distributed node 201 moves to Step S1007.

In Step S1006, the distributed node 201 executes a plug-in (Step S1006). Then, the distributed node 201 moves to Step S1007.

In Step S1007, the distributed node 201 determines whether or not all the plug-in setting information in the plug-in management table 711 has been selected (Step S1007). When there is any plug-in setting information yet to be selected (Step S1007: No), the distributed node 201 returns to Step S1004. On the other hand, when all the plug-in setting information has been selected (Step S1007: Yes), the distributed node 201 terminates the plug-in processing.

(Control System Event Processing Procedure in Operation Example 1)

Figure 11:
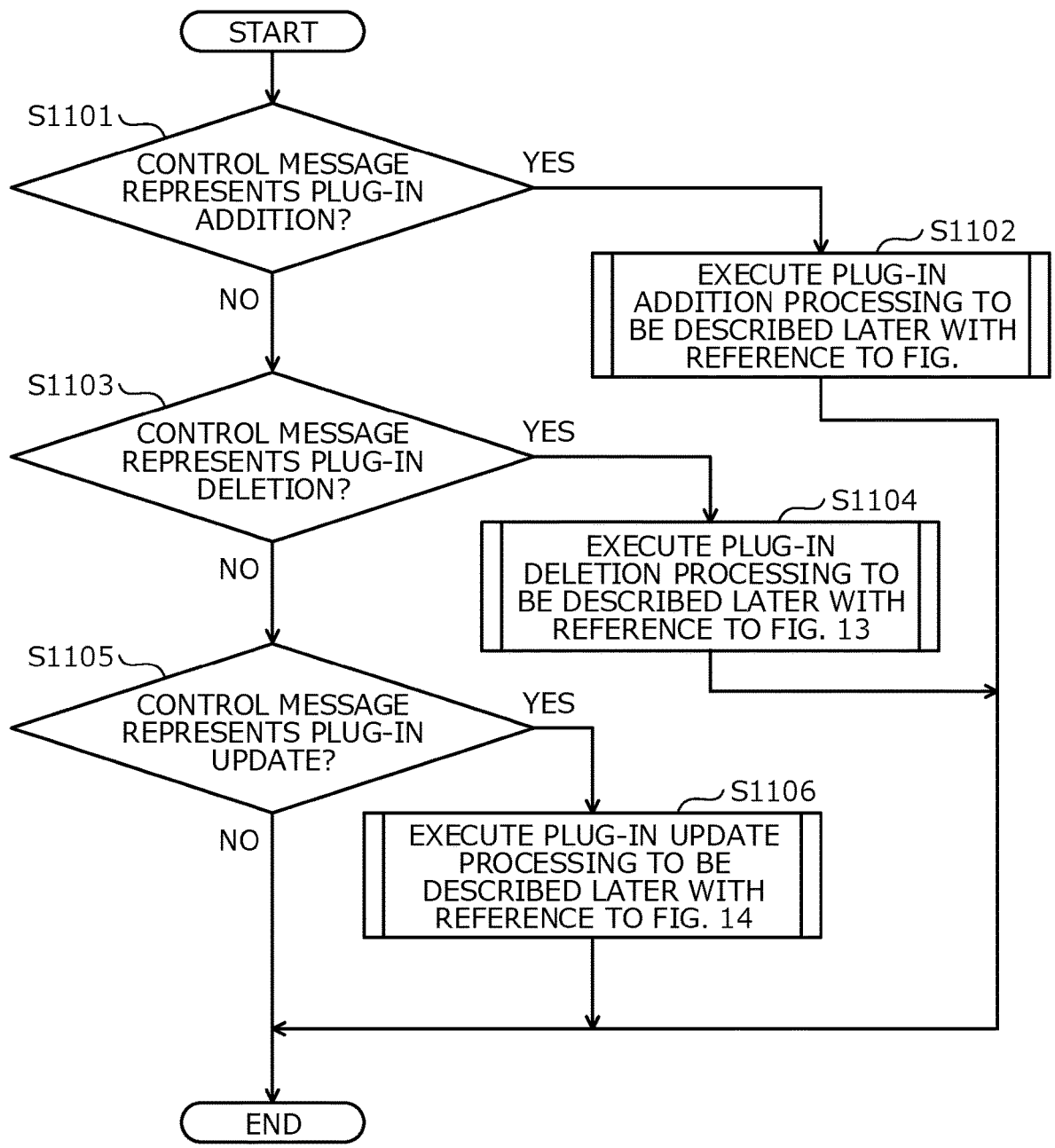
FIG. 11 is a flowchart illustrating an example of a control system event processing procedure in operation example 1.

Next, with reference to FIG. 11, description is given of an example of a control system event processing procedure in operation example 1, which is executed by the distributed node 201. The control system event processing is realized, for example, by the CPU 301, the storage area such as the memory 302 and the recording medium 305, and the network I/F 303 illustrated in FIG. 3.

FIG. 11 is a flowchart illustrating an example of the control system event processing procedure in operation example 1. In FIG. 11, the distributed node 201 determines whether or not a control message represents plug-in addition (Step S1101). When the control message represents plug-in addition (Step S1101: Yes), the distributed node 201 moves to Step S1102. On the other hand, when the control message does not represent plug-in addition (Step S1101: No), the distributed node 201 moves to Step S1103.

In Step S1102, the distributed node 201 executes plug-in addition processing to be described later with reference to FIG. 12 (Step S1102). Then, the distributed node 201 terminates the control system event processing.

In Step S1103, the distributed node 201 determines whether or not a control message represents plug-in deletion (Step S1103). When the control message represents plug-in deletion (Step S1103: Yes), the distributed node 201 moves to Step S1104. On the other hand, when the control message does not represent plug-in deletion (Step S1103: No), the distributed node 201 moves to Step S1105.

In Step S1104, the distributed node 201 executes plug-in deletion processing to be described later with reference to FIG. 13 (Step S1104). Then, the distributed node 201 terminates the control system event processing.

In Step S1105, the distributed node 201 determines whether or not a control message represents plug-in update (Step S1105). When the control message represents plug-in update (Step S1105: Yes), the distributed node 201 moves to Step S1106. On the other hand, when the control message does not represent plug-in update (Step S1105: No), the distributed node 201 terminates the control system event processing.

In Step S1106, the distributed node 201 executes plug-in update processing to be described later with reference to FIG. 14 (Step S1106). Then, the distributed node 201 terminates the control system event processing.

(Plug-in Addition Processing Procedure in Operation Example 1)

Figure 12:
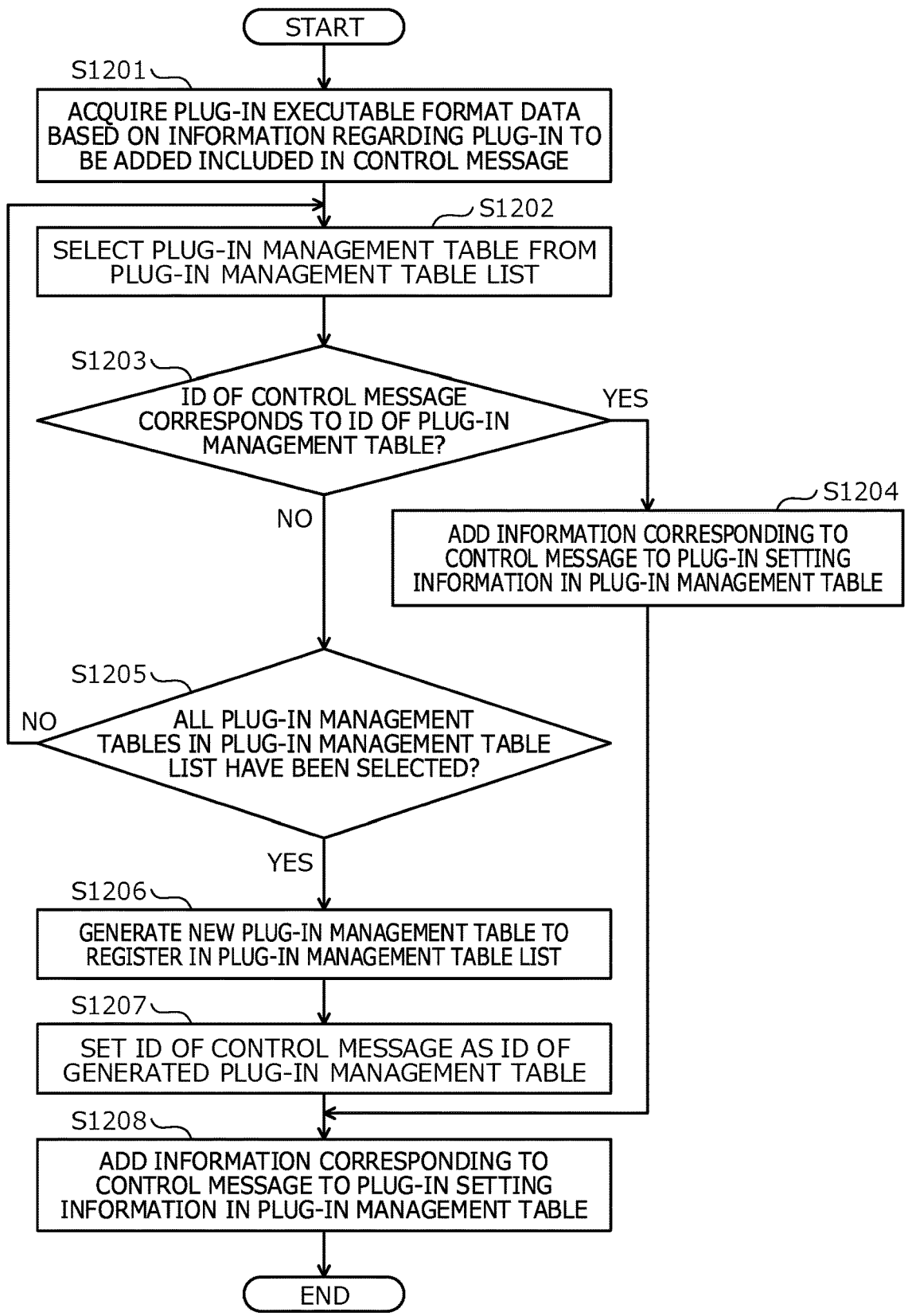
FIG. 12 is a flowchart illustrating an example of a plug-in addition processing procedure in operation example 1.

Next, with reference to FIG. 12, description is given of an example of a plug-in addition processing procedure in operation example 1, which is executed by the distributed node 201. The plug-in addition processing is realized, for example, by the CPU 301, the storage area such as the memory 302 and the recording medium 305, and the network I/F 303 illustrated in FIG. 3.

FIG. 12 is a flowchart illustrating an example of the plug-in addition processing procedure in operation example 1. In FIG. 12, the distributed node 201 acquires plug-in executable format data based on the information regarding a plug-in to be added, which is included in a control message (Step S1201). Then, the distributed node 201 moves to Step S1202.

In Step S1202, the distributed node 201 selects one plug-in management table 711 from the list 710 of plug-in management tables 711 (Step S1202).

Next, the distributed node 201 determines whether or not the ID of the control message corresponds to the ID of the selected plug-in management table 711 (Step S1203). When the both IDs correspond to each other (Step S1203: Yes), the distributed node 201 moves to Step S1204. On the other hand, when the both IDs do not correspond to each other (Step S1203: No), the distributed node 201 moves to Step S1205.

In Step S1204, the distributed node 201 adds information corresponding to the control message to the plug-in setting information in the plug-in management table 711 (Step S1204). Then, the distributed node 201 moves to Step S1208.

In Step S1205, the distributed node 201 determines whether or not all the plug-in management tables 711 have been selected from the list 710 of plug-in management tables 711 (Step S1205). When there is any plug-in management table 711 yet to be selected (Step S1205: No), the distributed node 201 returns to Step S1202. On the other hand, when all the plug-in management tables 711 have been selected (Step S1205: Yes), the distributed node 201 moves to Step S1206.

In Step S1206, the distributed node 201 generates a new plug-in management table 711 to register in the list 710 of plug-in management tables 711 (Step S1206). Then, the distributed node 201 sets the ID of the control message as the ID of the generated plug-in management table 711 (Step S1207). Thereafter, the distributed node 201 moves to Step S1208.

In Step S1208, the distributed node 201 adds information corresponding to the control message to the plug-in setting information in the plug-in management table 711 (Step S1208). Then, the distributed node 201 terminates the plug-in addition processing.

(Plug-in Deletion Processing Procedure in Operation Example 1)

Figure 13:
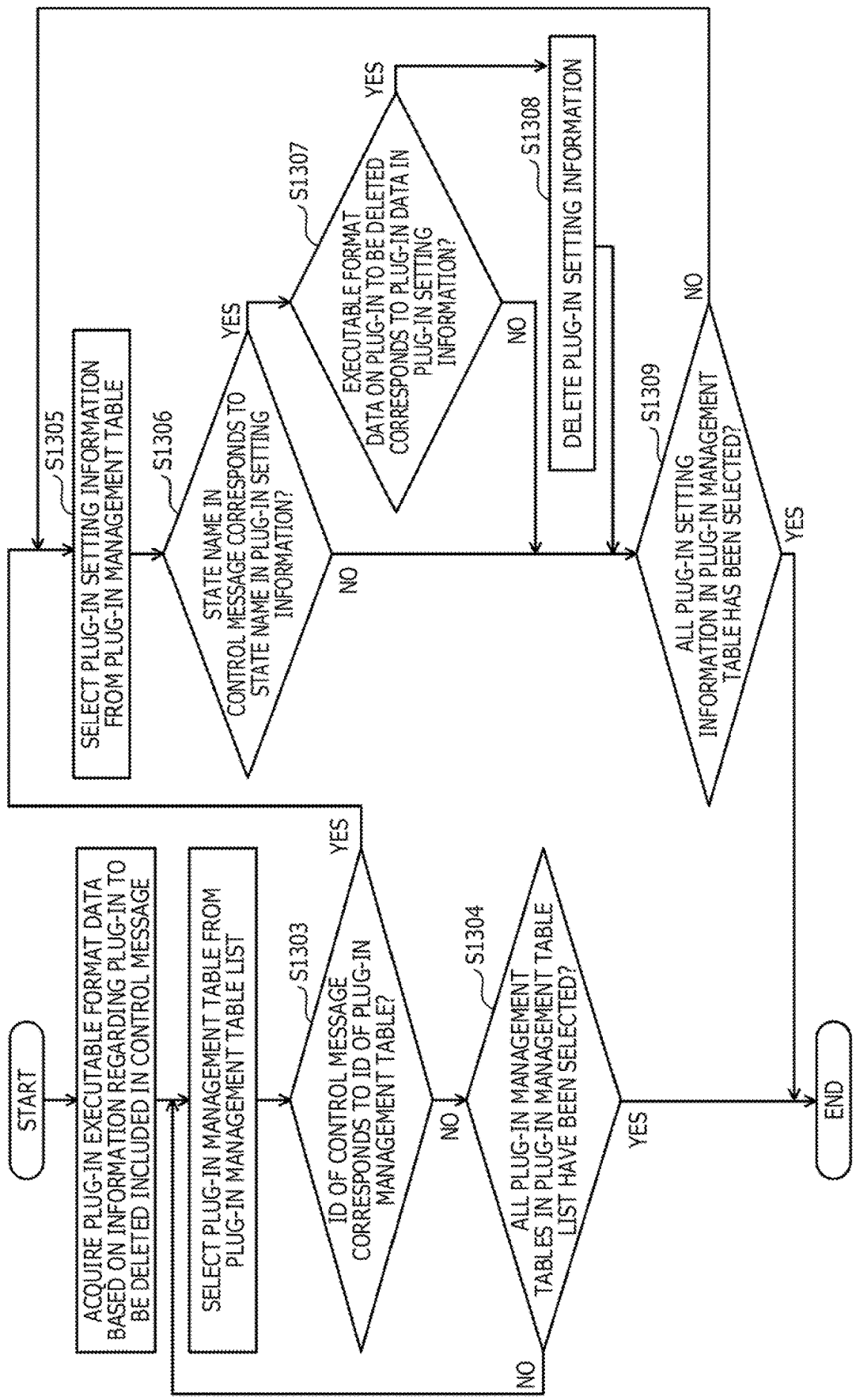
FIG. 13 is a flowchart illustrating an example of a plug-in deletion processing procedure in operation example 1.

Next, with reference to FIG. 13, description is given of an example of a plug-in deletion processing procedure in operation example 1, which is executed by the distributed node 201. The plug-in deletion processing is realized, for example, by the CPU 301, the storage area such as the memory 302 and the recording medium 305, and the network I/F 303 illustrated in FIG. 3.

FIG. 13 is a flowchart illustrating an example of the plug-in deletion processing procedure in operation example 1. In FIG. 13, the distributed node 201 acquires plug-in executable format data based on the information regarding a plug-in to be deleted, which is included in a control message (Step S1301). Then, the distributed node 201 moves to Step S1302.

In Step S1302, the distributed node 201 selects one plug-in management table 711 from the list 710 of plug-in management tables 711 (Step S1302).

Next, the distributed node 201 determines whether or not the ID of the control message corresponds to the ID of the selected plug-in management table 711 (Step S1303). When the both IDs do not correspond to each other (Step S1303: No), the distributed node 201 moves to Step S1304. On the other hand, when the both IDs correspond to each other (Step S1303: Yes), the distributed node 201 moves to Step S1305.

In Step S1304, the distributed node 201 determines whether or not all the plug-in management tables 711 have been selected from the list 710 of plug-in management tables 711 (Step S1304). When there is any plug-in management table 711 yet to be selected (Step S1304: No), the distributed node 201 returns to Step S1302. On the other hand, when all the plug-in management tables 711 have been selected (Step S1304: Yes), the distributed node 201 terminates the plug-in deletion processing.

In Step S1305, the distributed node 201 selects plug-in setting information in the plug-in management table 711 (Step S1305).

Next, the distributed node 201 determines whether or not the state name in the control message corresponds to the state name in the plug-in setting information (Step S1306). When the both state names do not correspond to each other (Step S1306: No), the distributed node 201 moves to Step S1309. On the other hand, when the both state names correspond to each other (Step S1306: Yes), the distributed node 201 moves to Step S1307.

In Step S1307, the distributed node 201 determines whether or not the executable format data on the plug-in to be deleted corresponds to the plug-in data in the plug-in setting information (Step S1307). When the both data do not correspond to each other (Step S1307: No), the distributed node 201 moves to Step S1309. On the other hand, when the both data correspond to each other (Step S1307: Yes), the distributed node 201 moves to Step S1308.

In Step S1308, the distributed node 201 deletes the plug-in setting information (Step S1308). Then, the distributed node 201 moves to Step S1309.

In Step S1309, the distributed node 201 determines whether or not all the plug-in setting information in the plug-in management table 711 has been selected (Step S1309). When there is any plug-in setting information yet to be selected (Step S1309: No), the distributed node 201 returns to Step S1305. On the other hand, when all the plug-in setting information has been selected (Step S1309: Yes), the distributed node 201 terminates the plug-in deletion processing.

(Plug-in Update Processing Procedure in Operation Example 1)

Next, with reference to FIG. 14, description is given of an example of a plug-in update processing procedure in operation example 1, which is executed by the distributed node 201. The plug-in update processing is realized, for example, by the CPU 301, the storage area such as the memory 302 and the recording medium 305, and the network I/F 303 illustrated in FIG. 3.

Figure 14A:
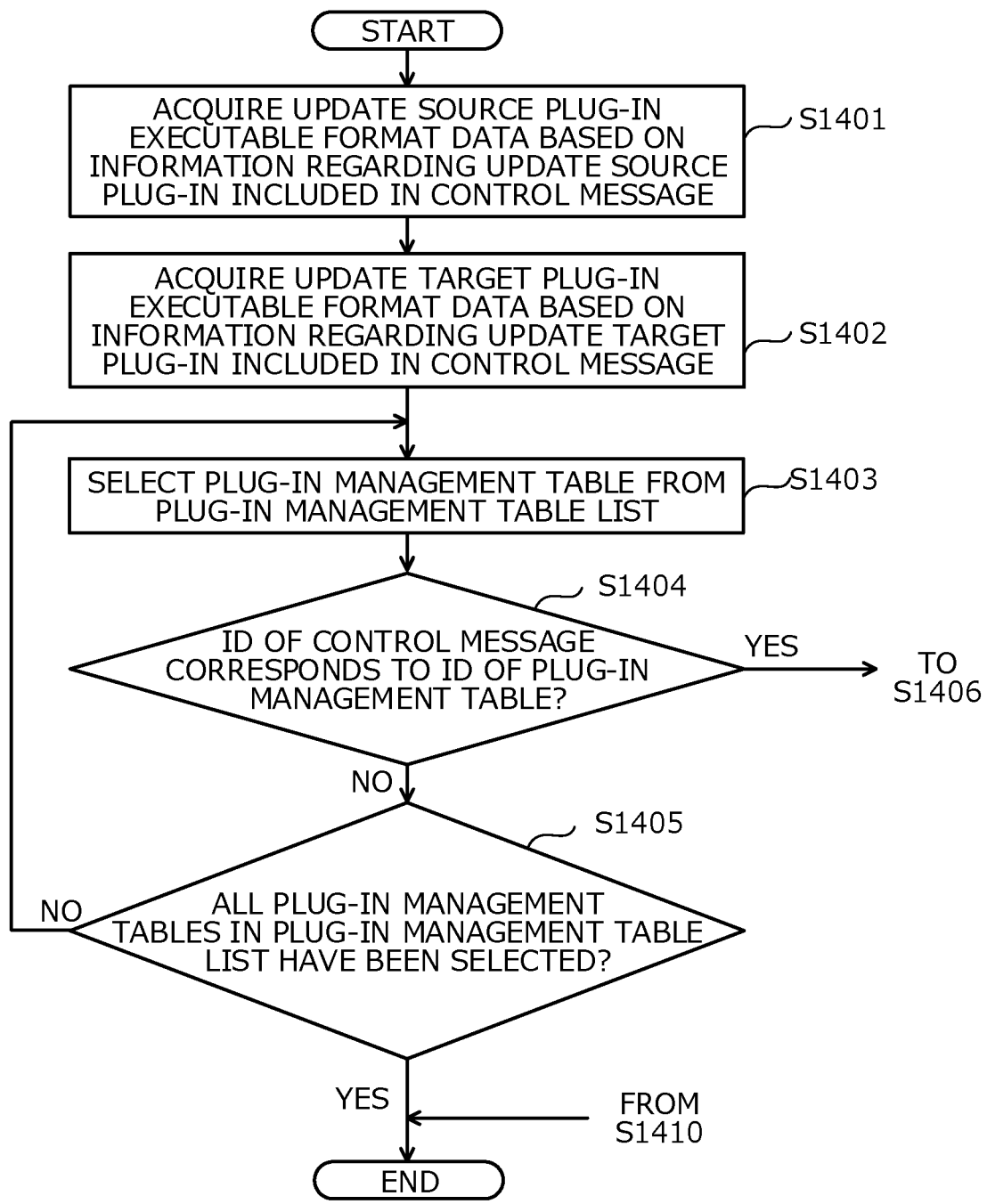
FIGS. 14A and 14B are a flowchart illustrating an example of a plug-in update processing procedure in operation example 1.
Figure 14B:
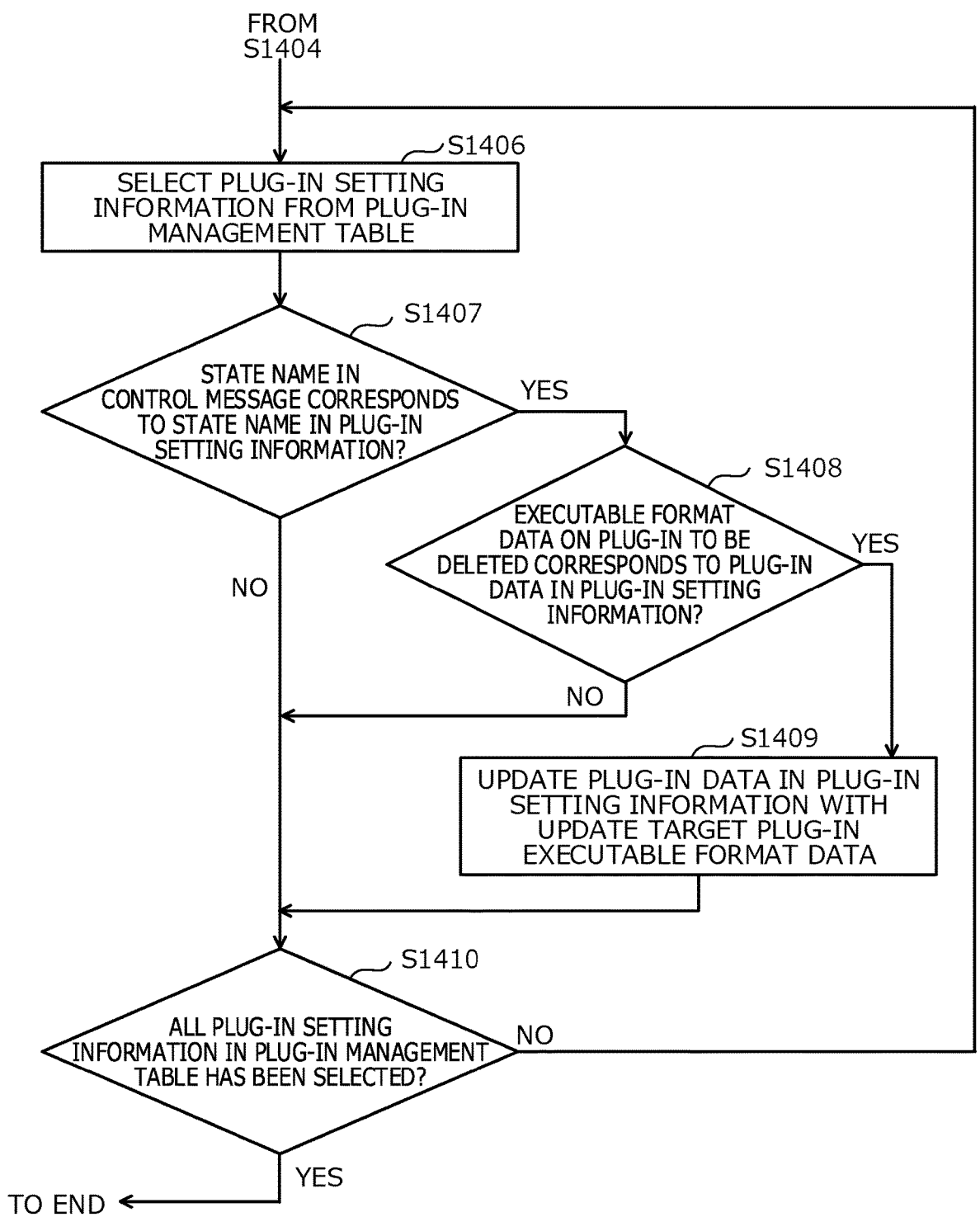

FIG. 14 (i.e. FIGS. 14A and 14B) is a flowchart illustrating an example of the plug-in update processing procedure in operation example 1. In FIG. 14, the distributed node 201 acquires executable format data on an update source plug-in based on information regarding the update source plug-in included in a control message (Step S1401).

Then, the distributed node 201 acquires executable format data on an update target plug-in based on information regarding the update target plug-in included in the control message (Step S1402). Then, the distributed node 201 moves to Step S1403.

In Step S1403, the distributed node 201 selects one plug-in management table 711 from the list 710 of plug-in management tables 711 (Step S1403).

Next, the distributed node 201 determines whether or not the ID of the control message corresponds to the ID of the selected plug-in management table 711 (Step S1404). When the both IDs do not correspond to each other (Step S1404:

No), the distributed node 201 moves to Step S1405. On the other hand, when the both IDs correspond to each other (Step S1404: Yes), the distributed node 201 moves to Step S1406.

In Step S1405, the distributed node 201 determines whether or not all the plug-in management tables 711 have been selected from the list 710 of plug-in management tables 711 (Step S1405). When there is any plug-in management table 711 yet to be selected (Step S1405: No), the distributed node 201 returns to Step S1403. On the other hand, when all the plug-in management tables 711 have been selected (Step S1405: Yes), the distributed node 201 terminates the plug-in update processing.

In Step S1406, the distributed node 201 selects plug-in setting information in the plug-in management table 711 (Step S1406).

Next, the distributed node 201 determines whether or not the state name in the control message corresponds to the state name in the plug-in setting information (Step S1407). When the both state names do not correspond to each other (Step S1407: No), the distributed node 201 moves to Step S1410. On the other hand, when the both state names correspond to each other (Step S1407: Yes), the distributed node 201 moves to Step S1408.

In Step S1408, the distributed node 201 determines whether or not the update source plug-in executable format data corresponds to the plug-in data in the plug-in setting information (Step S1408). When the both data do not correspond to each other (Step S1408: No), the distributed node 201 moves to Step S1410. On the other hand, when the both data correspond to each other (Step S1408: Yes), the distributed node 201 moves to Step S1409.

In Step S1409, the distributed node 201 updates the plug-in data in the plug-in setting information with the update target plug-in executable format data (Step S1409). Then, the distributed node 201 moves to Step S1410.

In Step S1410, the distributed node 201 determines whether or not all the plug-in setting information in the plug-in management table 711 has been selected (Step S1410). When there is any plug-in setting information yet to be selected (Step S1410: No), the distributed node 201 returns to Step S1406. On the other hand, when all the plug-in setting information has been selected (Step S1410: Yes), the distributed node 201 terminates the plug-in update processing.

The distributed node 201 may execute the above processing by changing the order of some of the steps. The distributed node 201 may also omit some of the steps.

Operation Example 2 of Parallel Distributed Processing System 200

Figure 15:
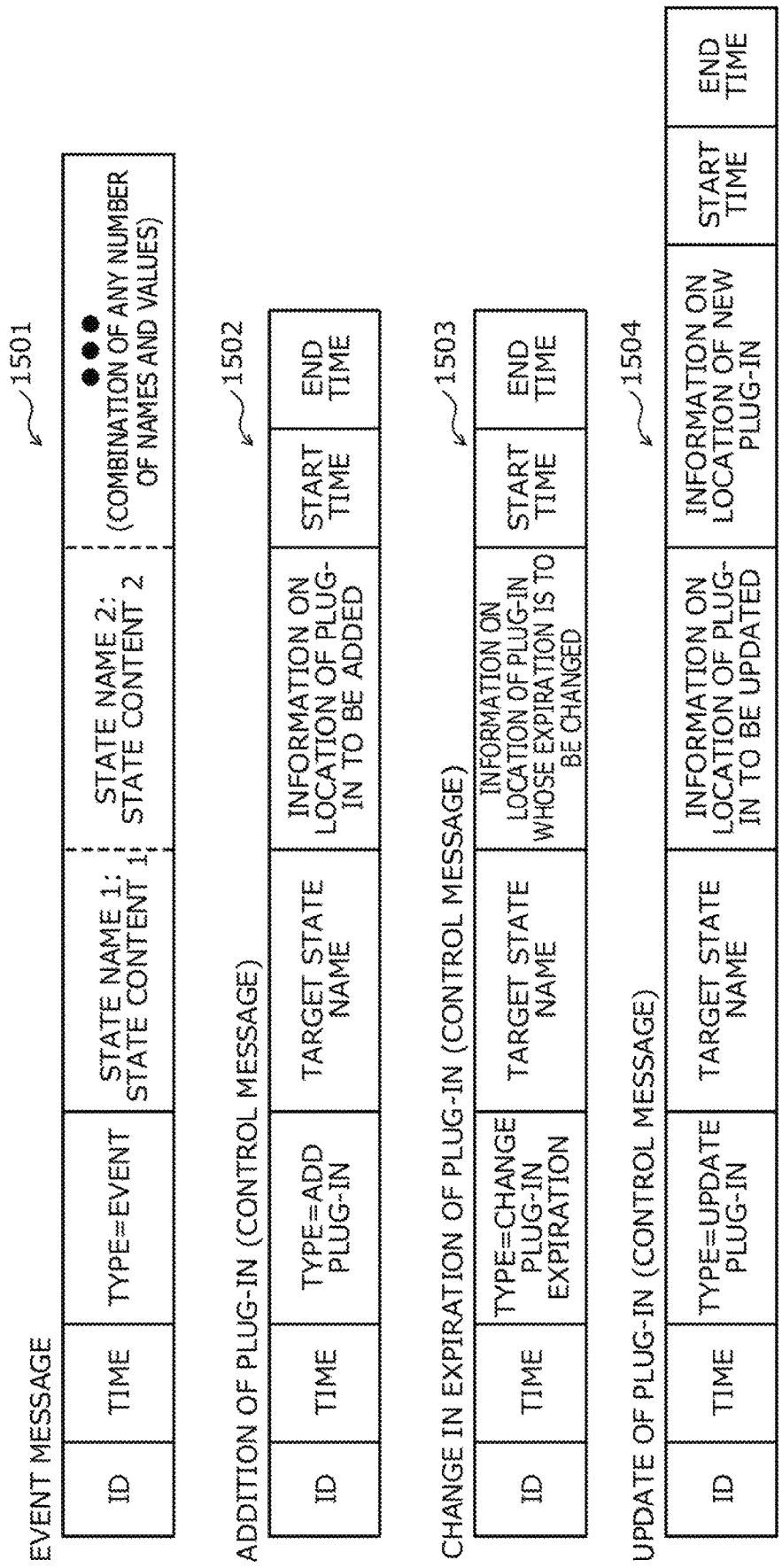
FIG. 15 is an explanatory diagram illustrating an example of various messages in operation example 2.
Figure 16:
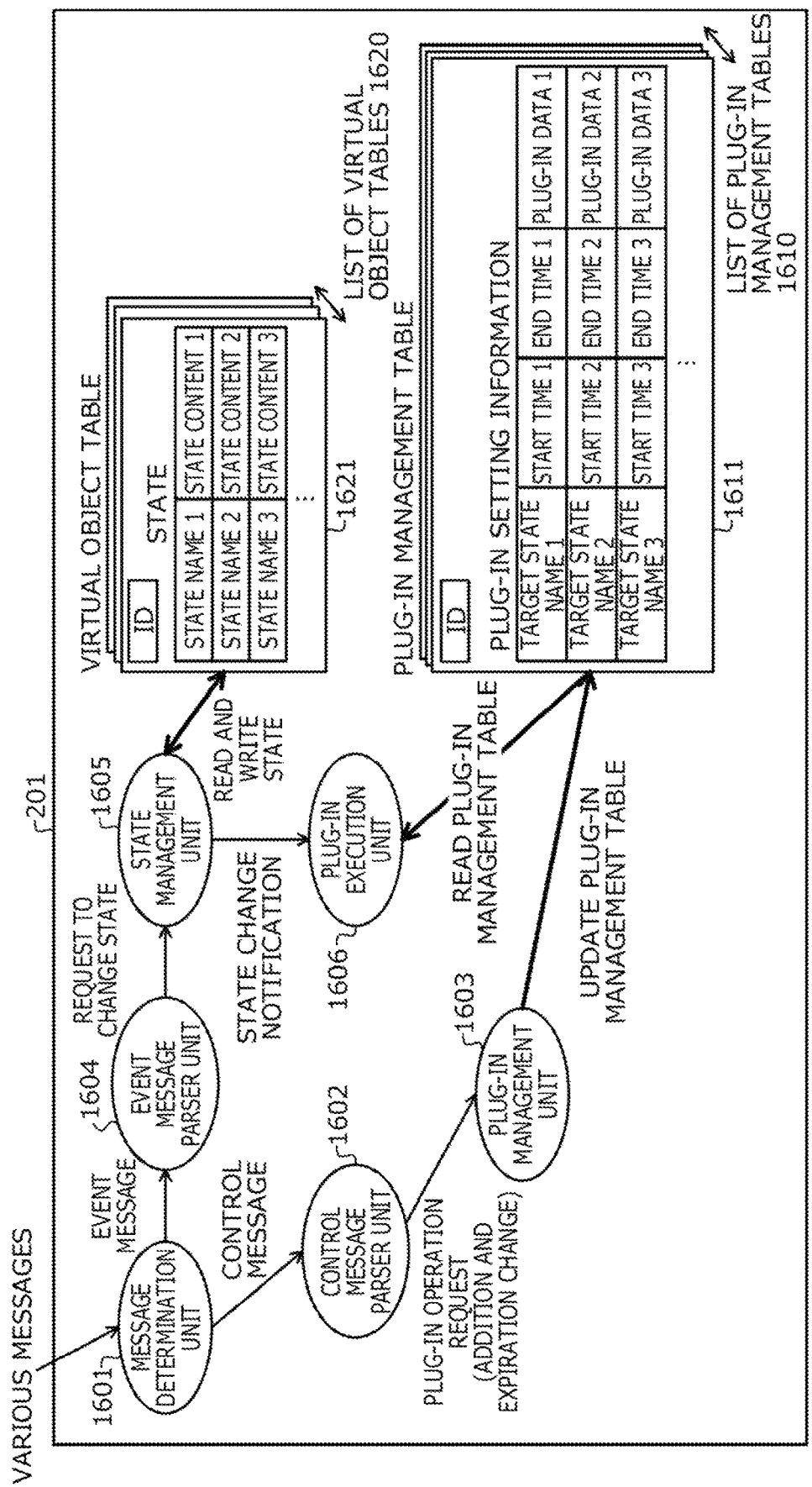
FIG. 16 is an explanatory diagram illustrating a specific functional configuration example of a distributed node 201 in operation example 2.

Next, with reference to FIGS. 15 and 16, description is given of operation example 2 of the parallel distributed processing system 200. In operation example 1 described above, a plug-in is stored in a plug-in management table and activated upon receipt of a control message. The activation is enabling execution of plug-in data that is plug-in executable format data.

On the other hand, in operation example 2, a valid period is set for a plug-in, and the plug-in is activated in the valid period of the plug-in regardless of when a control message is received. Accordingly, in operation example 2, inconsistency in processing may be reduced even when there is a change in the order of arrival of event messages and control messages in the distributed node 201 due to a network delay or the like.

First, description is given of an example of various messages in operation example 2 with reference to FIG. 15, followed by description of a specific functional configuration example of a distributed node 201 when receiving various messages in operation example 2 with reference to FIG. 16.

FIG. 15 is an explanatory diagram illustrating an example of various messages in operation example 2. In operation example 2, the parallel distributed processing system 200 uses, for example, an event message 1501, a control message 1502 to add a plug-in, a control message 1503 to change the expiration of the plug-in, and a control message 1504 to update the plug-in.

The event message 1501 is the same as the event message 601 illustrated in FIG. 6, and thus description thereof is omitted.

The control message 1502 to add a plug-in includes fields of ID, time, type, target state name, information on location of plug-in to be added, start time, and end time. The fields of ID, time, type, target state name, and information on location of plug-in to be added are the same as those in the control message 602 to add a plug-in illustrated in FIG. 6, and thus description thereof is omitted. In the start time field, a time at which the expiration of the plug-in to be added starts is set. In the end time field, a time at which the expiration of the plug-in to be added ends is set.

The control message 1503 to change the expiration of the plug-in includes fields of ID, time, type, target state name, information on location of plug-in whose expiration is to be changed, start time, and end time. In the ID field, an ID is set as information identifying a thing at the source of an event. In the time field, the time of generation of the control message is set. In the type field, "change plug-in expiration" is set as the type of the message.

In the target state name field, a target state name is set as information indicating the type of an event to be a plug-in execution condition. In the field of information on the location of plug-in whose expiration is to be changed, an address of a storage area is set, where plug-in data that is plug-in executable format data is stored. In the start time field, a time is set, at which the expiration of the plug-in whose expiration is to be changed starts. In the end time field, a time is set, at which the expiration of the plug-in whose expiration is to be changed ends.

The control message 1504 to update a plug-in includes fields of ID, time, type, target state name, information on location of plug-in to be updated, information on location of new plug-in, start time, and end time. The fields of ID, time, type, target state name, information on location of plug-in to be added, and information on location of new plug-in are the same as those in the control message 604 to update a plug-in illustrated in FIG. 6, and thus description thereof is omitted. In the start time field, a time at which the expiration of a new plug-in starts is set. In the end time field, a time at which the expiration of the new plug-in ends is set.

FIG. 16 is an explanatory diagram illustrating a specific functional configuration example of the distributed node 201 in operation example 2. As illustrated in FIG. 16, the distributed node 201 includes a list 1620 of virtual object tables 1621. The virtual object table 1621 is the same as the virtual object table 721 illustrated in FIG. 7, and thus description thereof is omitted.

As illustrated in FIG. 16, the distributed node 201 includes a list 1610 of plug-in management tables 1611. The plug-in management tables 1611 are realized, for example, by storage areas such as the memory 302 and the recording medium 305 in the distributed node 201 illustrated in FIG. 3.

The plug-in management table 1611 includes an ID field. The plug-in management table 1611 further includes fields for target state name, start time, end time, and plug-in data, which are associated with each other. The plug-in management table 1611 stores records by setting information in the respective fields. In the following description, the target state name, the start time, the end time, and the plug-in data may be collectively described as "plug-in setting information".

In the ID field, an ID is set as information identifying a thing at the source of an event. In the target state name field, a target state name is set as information indicating the type of an event to be a plug-in execution condition. In the start time field, a start time of the expiration of the plug-in is set. In the end time field, an end time of the expiration of the plug-in is set. In the plug-in data field, plug-in data that is plug-in executable format data is set.

As illustrated in FIG. 16, the distributed node 201 includes a message determination unit 1601, a control message parser unit 1602, a plug-in management unit 1603, an event message parser unit 1604, a state management unit 1605, and a plug-in execution unit 1606.

The message determination unit 1601 receives input of any of the event message 1501, the control message 1502 to add a plug-in, the control message 1503 to change the expiration of the plug-in, and the control message 1504 to update the plug-in. The message determination unit 1601 determines the type of the inputted message, and hands over the message to the control message parser unit 1602 or the event message parser unit 1604.

The control message parser unit 1602 interprets the control message 1502 to add the plug-in, the control message 1503 to change the expiration of the plug-in, and the control message 1504 to update the plug-in. The control message parser unit 1602 extracts the ID, target state name, information on the location of the plug-in to be added, start time, and end time from the control message 1502 to add the plug-in, for example, and hands over the extracted information to the plug-in management unit 1603.

The control message parser unit 1602 extracts the ID, target state name, information on the location of the plug-in whose expiration is to be changed, start time, and end time from the control message 1503 to change the expiration of the plug-in, for example, and hands over the extracted information to the plug-in management unit 1603. The control message parser unit 1602 extracts the ID, target state name, information on the location of the plug-in to be updated, information on the location of new plug-in, start time, and end time from the control message 1504, for example. Then, the control message parser unit 1602 hands over the extracted information to the plug-in management unit 1603.

The plug-in management unit 1603 updates the plug-in management table 1611 based on the information handed over from the control message parser unit 1602. The plug-in management unit 1603 receives, for example, the ID, the target state name, the information on the location of the plug-in to be added, the start time, and the end time. The plug-in management unit 1603 specifies the plug-in management table 1611 corresponding to the received ID. The plug-in management unit 1603 acquires plug-in data that is executable format data on the plug-in to be added, based on the information on the location of the plug-in to be added. The plug-in management unit 1603 adds the received target state name, start time, and end time as well as the acquired plug-in data, in association with each other, to the specified plug-in management table 1611.

The plug-in management unit 1603 receives, for example, the ID, the target state name, the information on the location of the plug-in whose expiration is to be changed, the start time, and the end time. The plug-in management unit 1603 specifies the plug-in management table 1611 corresponding to the received ID. The plug-in management unit 1603 acquires plug-in data that is executable format data on the plug-in whose expiration is to be changed, based on the information on the location of the plug-in whose expiration is to be changed. When the specified plug-in management table 1611 includes plug-in data corresponding to the acquired plug-in data in association with the received target state name, the plug-in management unit 1603 changes the start time and end time of the plug-in data.

The plug-in management unit 1603 receives, for example, the ID, the target state name, the information on the location of the plug-in to be updated, the information on the location of new plug-in, the start time, and the end time. The plug-in management unit 1603 specifies the plug-in management table 1611 corresponding to the received ID. The plug-in management unit 1603 acquires plug-in data that is executable format data on the plug-in to be updated and deleted, based on the information on the location of the plug-in to be updated. The plug-in management unit 1603 acquires plug-in data that is new plug-in executable format data based on the information on the location of the new plug-in.

The plug-in management unit 1603 determines whether or not the specified plug-in management table 1611 includes plug-in data corresponding to the plug-in data to be updated and deleted by changing the expiration, in association with the received target state name. When there is such corresponding plug-in data, the plug-in management unit 1603 sets the end time of the expiration of the plug-in data to the time before the received start time by a unit time. The plug-in management unit 1603 adds the received target state name, start time, and end time as well as the acquired new plug-in data, in association with each other, in the specified plug-in management table 1611. When there is any expired plug-in, the plug-in management unit 1603 deletes the plug-in data that is executable format data of the plug-in from the plug-in management table 1611.

The event message parser unit 1604 interprets the event message 1501 to extract an ID, time, and one or more states, and hands over the extracted information to the state management unit 1605. The state management unit 1605 receives the ID, time, and one or more states. The state management unit 1605 specifies the virtual object table 1621 corresponding to the received ID. The state management unit 1605 updates the specified virtual object table 1621 with the received one or more states. When the state content of any of the states is changed, the state management unit 1605 transmits a change notification including the extracted ID, the extracted time, and the state name of the state to the plug-in execution unit 1606.

The plug-in execution unit 1606 specifies the plug-in management table 1611 corresponding to the ID included in the change notification. The plug-in execution unit 1606 uses the state name included in the change notification to search through the specified plug-in management table 1611 for a target state name. The plug-in execution unit 1606 executes plug-in data associated with the searched target state name if the expiration between the start time and the end time associated with the searched target state name includes the received time. The plug-in execution unit 1606 executes no plug-in data when having failed to search for any target state name.

Thus, the distributed node 201 may update the processing program by adding, deleting, or updating the plug-in for the processing program. For example, the distributed node 201 sets the end time of the expiration of old plug-in data to be updated and deleted to the time before the start time of the expiration of new plug-in data by a unit time. Thus, the distributed node 201 may update the old plug-in data with the new plug-in data. The parallel distributed processing system 200 may reduce inconsistency in processing even when there is a change in the order of arrival of event messages and control messages in the distributed node 201 due to a network delay or the like.

(Overall Processing Procedure in Operation Example 2)

Figure 18:
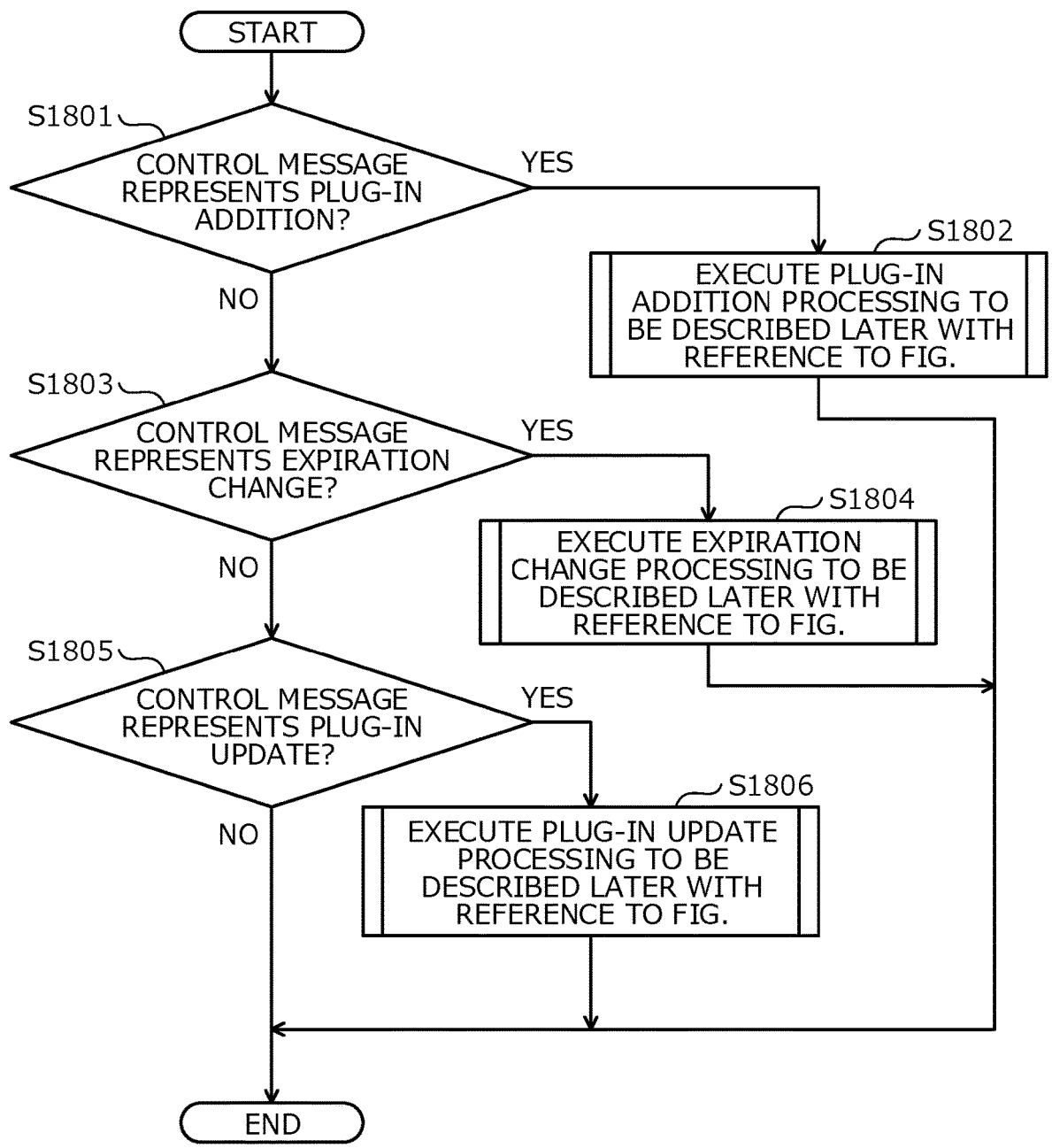
FIG. 18 is a flowchart illustrating an example of a control system event processing procedure in operation example 2.

An overall processing procedure in operation example 2 is the same as the overall processing procedure in operation example 1 illustrated in FIG. 8, and thus description thereof is omitted. In the overall processing procedure in operation example 2, control system event processing in operation example 2 to be described later with reference to FIG. 18 is called up instead of the control system event processing in operation example 1 illustrated in FIG. 11.

(Event Message Processing Procedure in Operation Example 2)

An event message processing procedure in operation example 2 is the same as the event message processing procedure in operation example 1 illustrated in FIG. 9, and thus description thereof is omitted. In the event message processing procedure in operation example 2, plug-in processing in operation example 2 to be described later with reference to FIG. 17 is called up instead of the plug-in processing in operation example 1 illustrated in FIG. 10.

(Plug-in Processing Procedure in Operation Example 2)

Next, with reference to FIG. 17, description is given of an example of a plug-in processing procedure in operation example 2, which is executed by the distributed node 201. The plug-in processing is realized, for example, by the CPU 301, the storage area such as the memory 302 and the recording medium 305, and the network I/F 303 illustrated in FIG. 3.

Figure 17A:
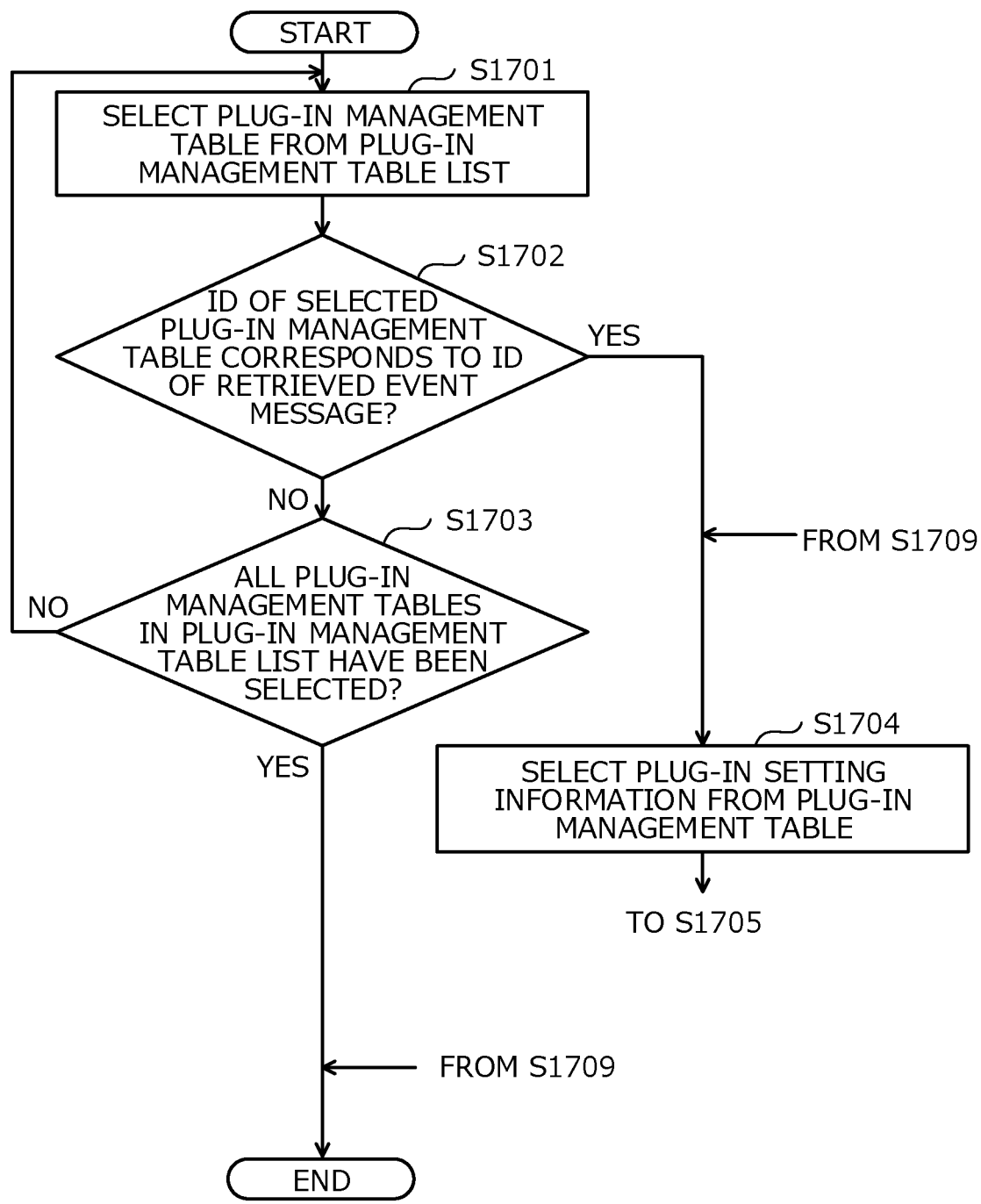
FIGS. 17A and 17B are a flowchart illustrating an example of a plug-in processing procedure in operation example 2.
Figure 17B:
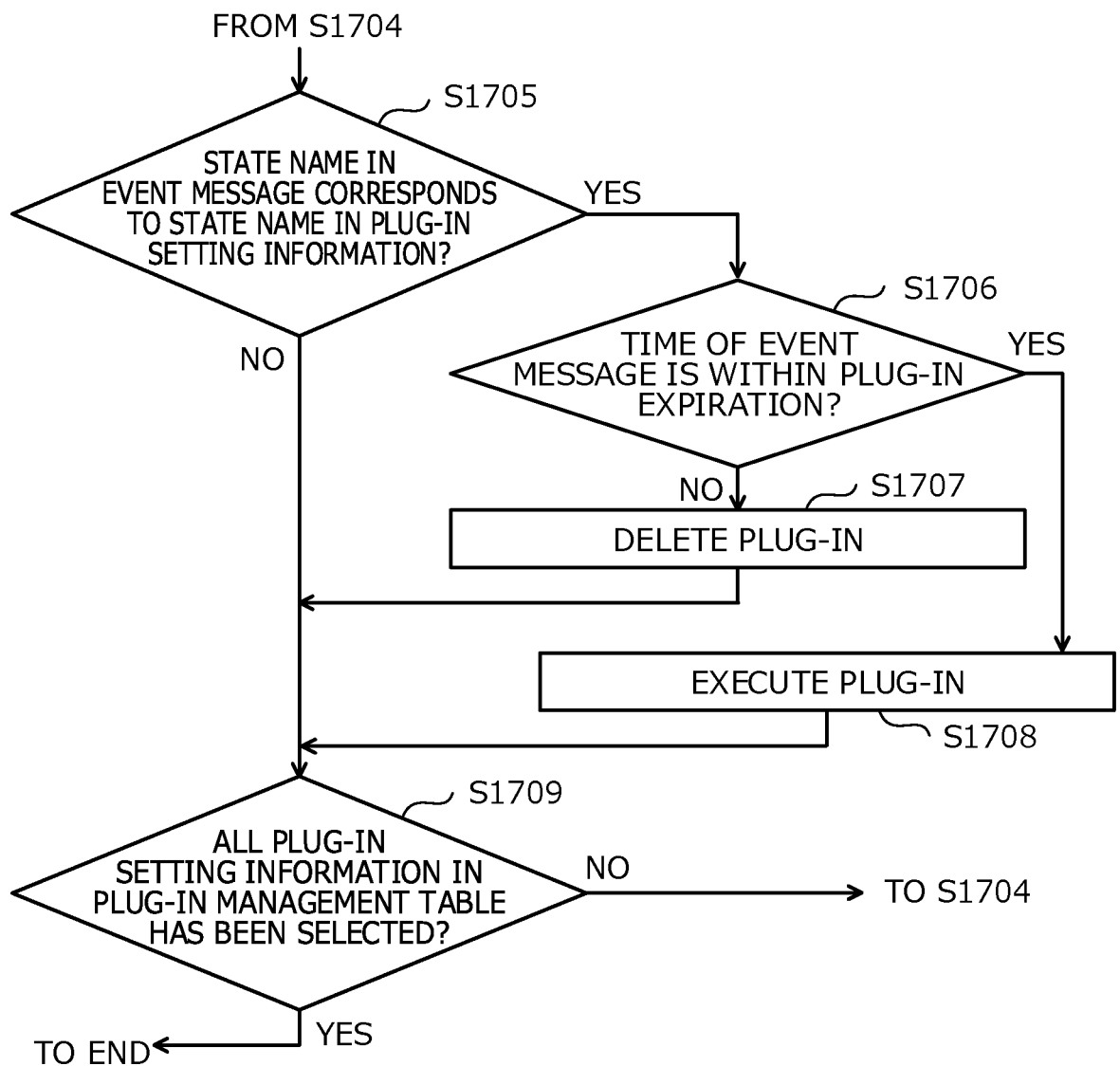

FIG. 17 (i.e. FIGS. 17A and 17B) is a flowchart illustrating an example of the plug-in processing procedure in operation example 2. In FIG. 17, the distributed node 201 selects one plug-in management table 1611 from the list 1610 of plug-in management tables 1611 (Step S1701).

Next, the distributed node 201 determines whether or not the ID of the selected plug-in management table 1611 corresponds to the ID of the retrieved event message (Step S1702). When the both IDs do not correspond to each other (Step S1702: No), the distributed node 201 moves to Step S1703. On the other hand, when the both IDs correspond to each other (Step S1702: Yes), the distributed node 201 moves to Step S1704.

In Step S1703, the distributed node 201 determines whether or not all the plug-in management tables 1611 have been selected from the list 1610 of plug-in management tables 1611 (Step S1703). When there is any plug-in management table 1611 yet to be selected (Step S1703: No), the distributed node 201 returns to Step S1701. On the other hand, when all the plug-in management tables 1611 have been selected (Step S1703: Yes), the distributed node 201 terminates the plug-in processing.

In Step S1704, the distributed node 201 selects plug-in setting information in the plug-in management table 1611 (Step S1704).

Next, the distributed node 201 determines whether or not the state name in the event message corresponds to the state name in the plug-in setting information (Step S1705). When the both state names correspond to each other (Step S1705: Yes), the distributed node 201 moves to Step S1706. On the other hand, when the both state names do not correspond to each other (Step S1705: No), the distributed node 201 moves to Step S1709.

In Step S1706, the distributed node 201 determines whether or not the time of the event message is within the expiration of the plug-in (Step S1706). When the time is not within the expiration (Step S1706: No), the distributed node 201 moves to Step S1707. On the other hand, when the time is within the expiration (Step S1706: Yes), the distributed node 201 moves to Step S1708.

In Step S1707, the distributed node 201 deletes the plug-in (Step S1707). Then, the distributed node 201 moves to Step S1709.

In Step S1708, the distributed node 201 executes the plug-in (Step S1708). Then, the distributed node 201 moves to Step S1709.

In Step S1709, the distributed node 201 determines whether or not all the plug-in setting information in the plug-in management table 1611 has been selected (Step S1709). When there is any plug-in setting information yet to be selected (Step S1709: No), the distributed node 201 returns to Step S1704. On the other hand, when all the plug-in setting information has been selected (Step S1709: Yes), the distributed node 201 terminates the plug-in processing.

(Control System Event Processing Procedure in Operation Example 2)

Next, with reference to FIG. 18, description is given of an example of a control system event processing procedure in operation example 2, which is executed by the distributed node 201. The control system event processing is realized, for example, by the CPU 301, the storage area such as the memory 302 and the recording medium 305, and the network I/F 303 illustrated in FIG. 3.

FIG. 18 is a flowchart illustrating an example of the control system event processing procedure in operation example 2. In FIG. 18, the distributed node 201 determines whether or not a control message represents plug-in addition (Step S1801). When the control message represents plug-in addition (Step S1801: Yes), the distributed node 201 moves to Step S1802. On the other hand, when the control message does not represent plug-in addition (Step S1801: No), the distributed node 201 moves to Step S1803.

In Step S1802, the distributed node 201 executes plug-in addition processing described above with reference to FIG. 12 (Step S1802). Then, the distributed node 201 terminates the control system event processing.

In Step S1803, the distributed node 201 determines whether or not a control message represents expiration change (Step S1803). When the control message represents expiration change (Step S1803: Yes), the distributed node 201 moves to Step S1804. On the other hand, when the control message does not represent expiration change (Step S1803: No), the distributed node 201 moves to Step S1805.

In Step S1804, the distributed node 201 executes expiration change processing to be described later with reference to FIG. 19 (Step S1804). Then, the distributed node 201 terminates the control system event processing.

In Step S1805, the distributed node 201 determines whether or not a control message represents plug-in update (Step S1805). When the control message represents plug-in update (Step S1805: Yes), the distributed node 201 moves to Step S1806. On the other hand, when the control message does not represent plug-in update (Step S1805: No), the distributed node 201 terminates the control system event processing.

In Step S1806, the distributed node 201 executes plug-in update processing to be described later with reference to FIG. 20 (Step S1806). Then, the distributed node 201 terminates the control system event processing.

(Plug-in Addition Processing Procedure in Operation Example 2)

A plug-in addition processing procedure in operation example 2 is the same as the plug-in addition processing procedure in operation example 1 illustrated in FIG. 12, and thus description thereof is omitted.

(Expiration Change Processing Procedure in Operation Example 2)

Next, with reference to FIG. 19, description is given of an example of an expiration change processing procedure in operation example 2, which is executed by the distributed node 201. The expiration change processing is realized, for example, by the CPU 301, the storage area such as the memory 302 and the recording medium 305, and the network I/F 303 illustrated in FIG. 3.

Figure 19A:
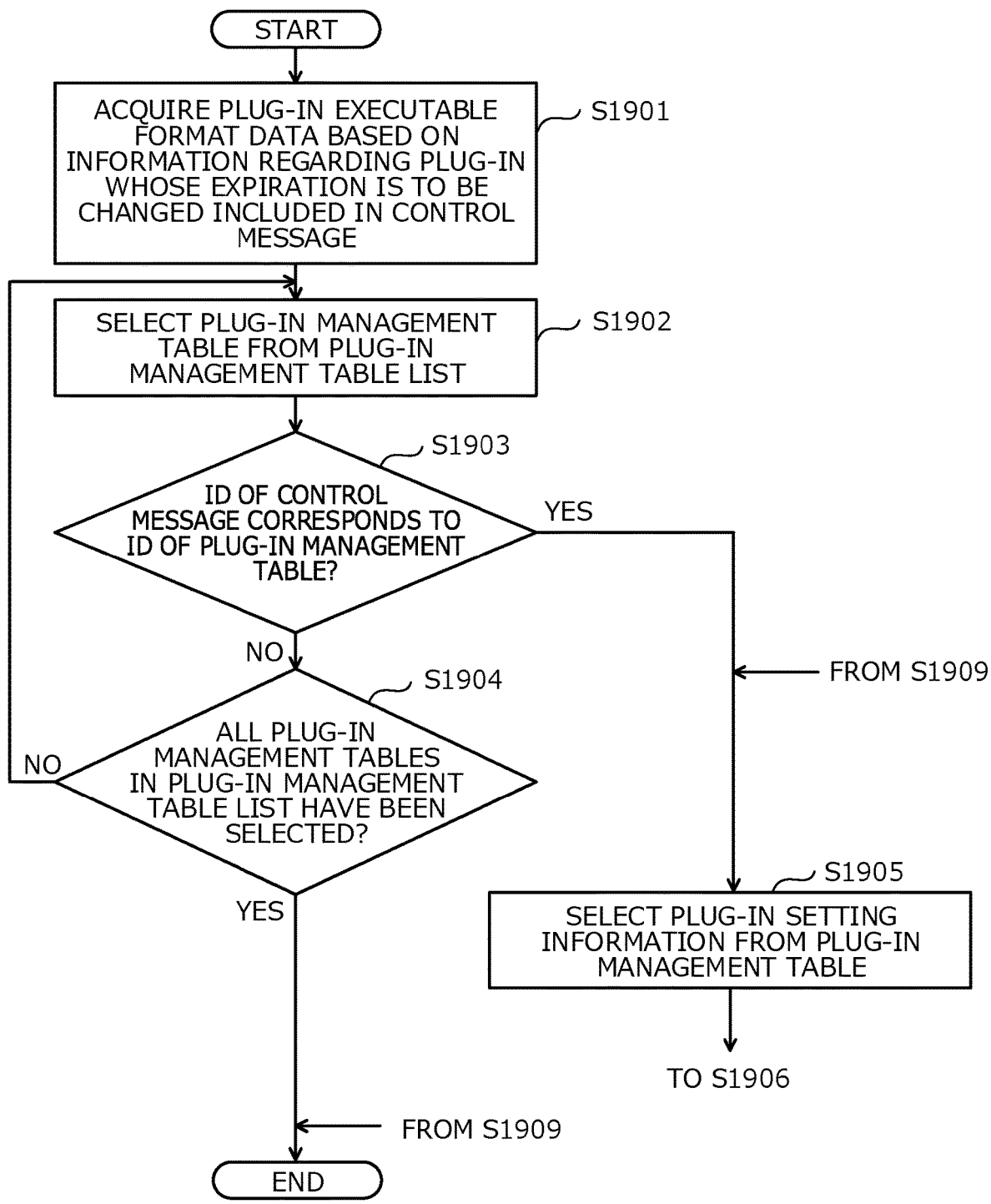
FIGS. 19A and 19B are a flowchart illustrating an example of an expiration change processing procedure in operation example 2.
Figure 19B:
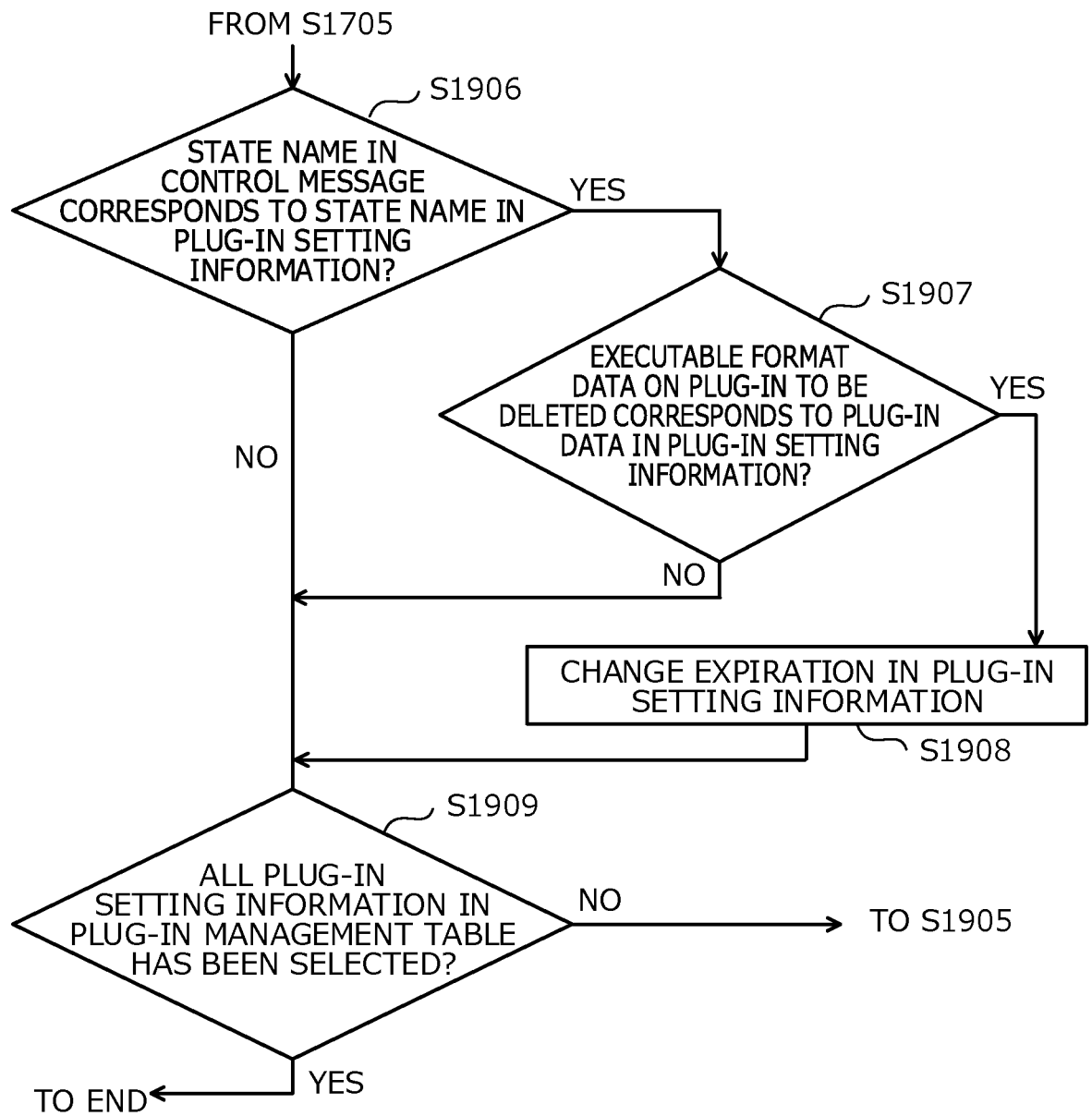

FIG. 19 (i.e. FIGS. 19A and 19B) is a flowchart illustrating an example of the expiration change processing procedure in operation example 2. In FIG. 19, the distributed node 201 acquires plug-in executable format data based on the information regarding a plug-in whose expiration is to be changed, which is included in a control message (Step S1901). Then, the distributed node 201 moves to Step S1902.

In Step S1902, the distributed node 201 selects one plug-in management table 1611 from the list 1610 of plug-in management tables 1611 (Step S1902).

Next, the distributed node 201 determines whether or not the ID of the control message corresponds to the ID of the selected plug-in management table 1611 (Step S1903). When the both IDs do not correspond to each other (Step S1903: No), the distributed node 201 moves to Step S1904. On the other hand, when the both IDs correspond to each other (Step S1903: Yes), the distributed node 201 moves to Step S1905.

In Step S1904, the distributed node 201 determines whether or not all the plug-in management tables 1611 have been selected from the list 1610 of plug-in management tables 1611 (Step S1904). When there is any plug-in management table 1611 yet to be selected (Step S1904: No), the distributed node 201 returns to Step S1902. On the other hand, when all the plug-in management tables 1611 have been selected (Step S1904: Yes), the distributed node 201 terminates the expiration change processing.

In Step S1905, the distributed node 201 selects plug-in setting information in the plug-in management table 1611 (Step S1905).

Next, the distributed node 201 determines whether or not the state name in the control message corresponds to the state name in the plug-in setting information (Step S1906). When the both state names do not correspond to each other (Step S1906: No), the distributed node 201 moves to Step S1909. On the other hand, when the both state names correspond to each other (Step S1906: Yes), the distributed node 201 moves to Step S1907.

In Step S1907, the distributed node 201 determines whether or not the executable format data on the plug-in whose expiration is to be changed corresponds to the plug-in data in the plug-in setting information (Step S1907). When the both data do not correspond to each other (Step S1907: No), the distributed node 201 moves to Step S1909. On the other hand, when the both data correspond to each other (Step S1907: Yes), the distributed node 201 moves to Step S1908.

In Step S1908, the distributed node 201 changes the expiration of the plug-in setting information (Step S1908). Then, the distributed node 201 moves to Step S1909.

In Step S1909, the distributed node 201 determines whether or not all the plug-in setting information in the plug-in management table 1611 has been selected (Step S1909). When there is any plug-in setting information yet to be selected (Step S1909: No), the distributed node 201 returns to Step S1905. On the other hand, when all the plug-in setting information has been selected (Step S1909: Yes), the distributed node 201 terminates the expiration change processing.

(Plug-in Update Processing Procedure in Operation Example 2)

Figure 20:
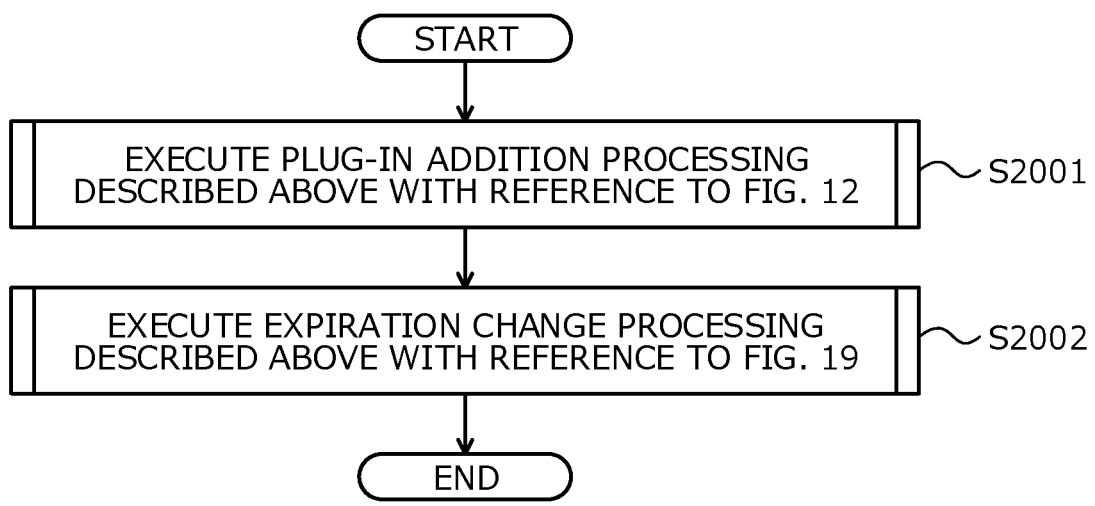
FIG. 20 is a flowchart illustrating an example of a plug-in update processing procedure in operation example 2.

Next, with reference to FIG. 20, description is given of an example of a plug-in update processing procedure in operation example 2, which is executed by the distributed node 201. The plug-in update processing is realized, for example, by the CPU 301, the storage area such as the memory 302 and the recording medium 305, and the network I/F 303 illustrated in FIG. 3.

FIG. 20 is a flowchart illustrating an example of the plug-in update processing procedure in operation example 2. In FIG. 20, the distributed node 201 executes the plug-in addition processing described above with reference to FIG. 12 (Step S2001). Then, the distributed node 201 executes the expiration change processing described above with reference to FIG. 19 (Step S2002). Then, the distributed node 201 terminates the plug-in update processing.

The distributed node 201 may execute the above processing by changing the order of some of the steps. The distributed node 201 may also omit some of the steps.

Operation Example 3 of Parallel Distributed Processing System 200

Next, description is given of operation example 3 of the parallel distributed processing system 200. Operation example 2 described above is an operation example of deleting the expired plug-in.

On the other hand, operation example 3 is an operation example of waiting to delete a plug-in until a barrier message is received after a valid period has passed. Accordingly, in operation example 3, the plug-in may be saved, rather than being deleted, until the barrier message arrives, making it possible to normally execute backup according to the barrier message so as to enable failure recovery with distributed checkpoints.

The failure recovery with distributed checkpoints is realized, for example, by the management node 202 saving messages for a certain period of time and by the distributed node 201 backing up internal state information as checkpoints in an external storage device. In the event of a failure, the failure is recovered by the distributed node 201 returning the internal state information and the management node 202 retransmitting the messages.

Figure 21:
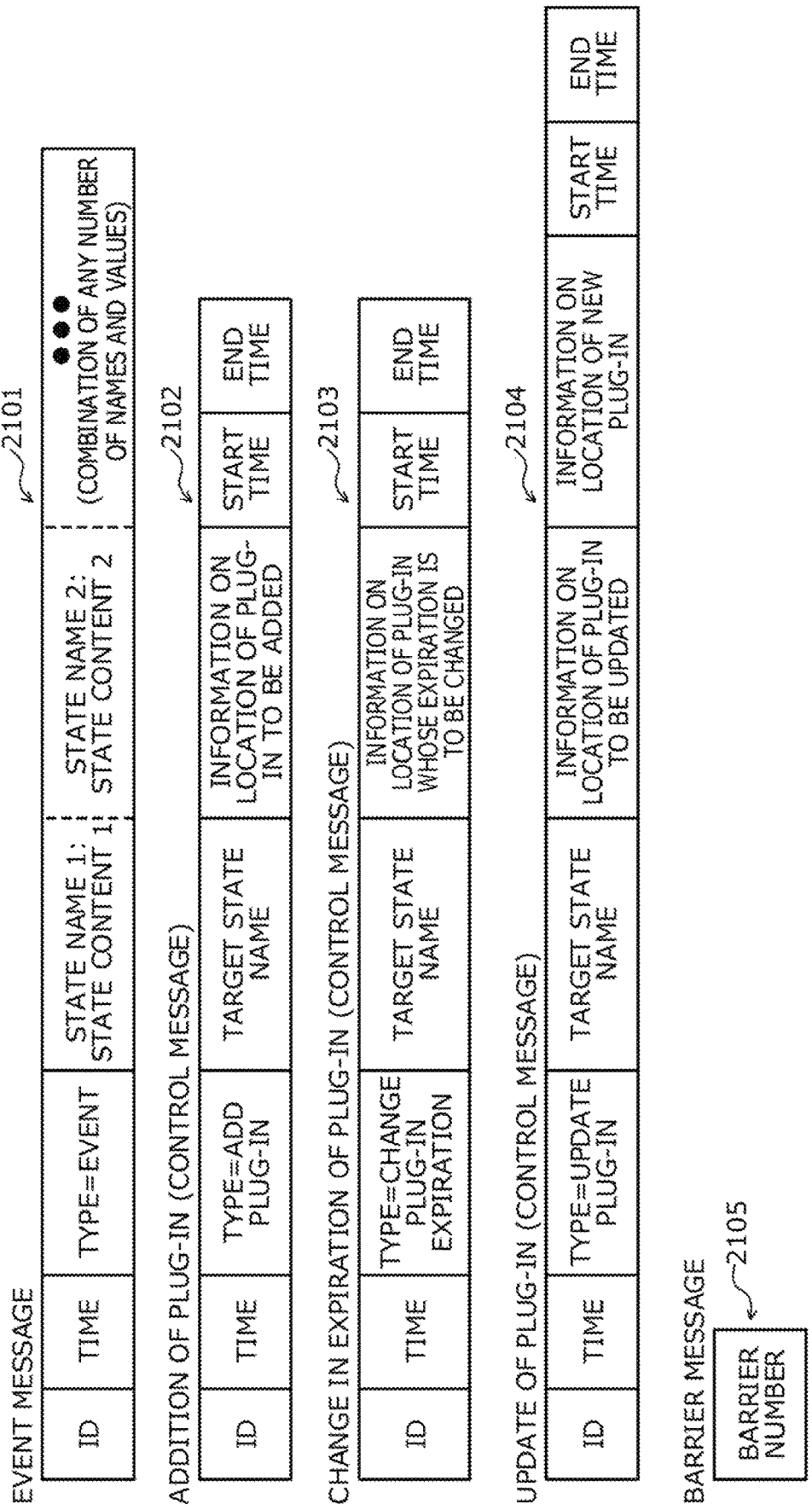
FIG. 21 is an explanatory diagram illustrating an example of various messages in operation example 3.
Figure 22:
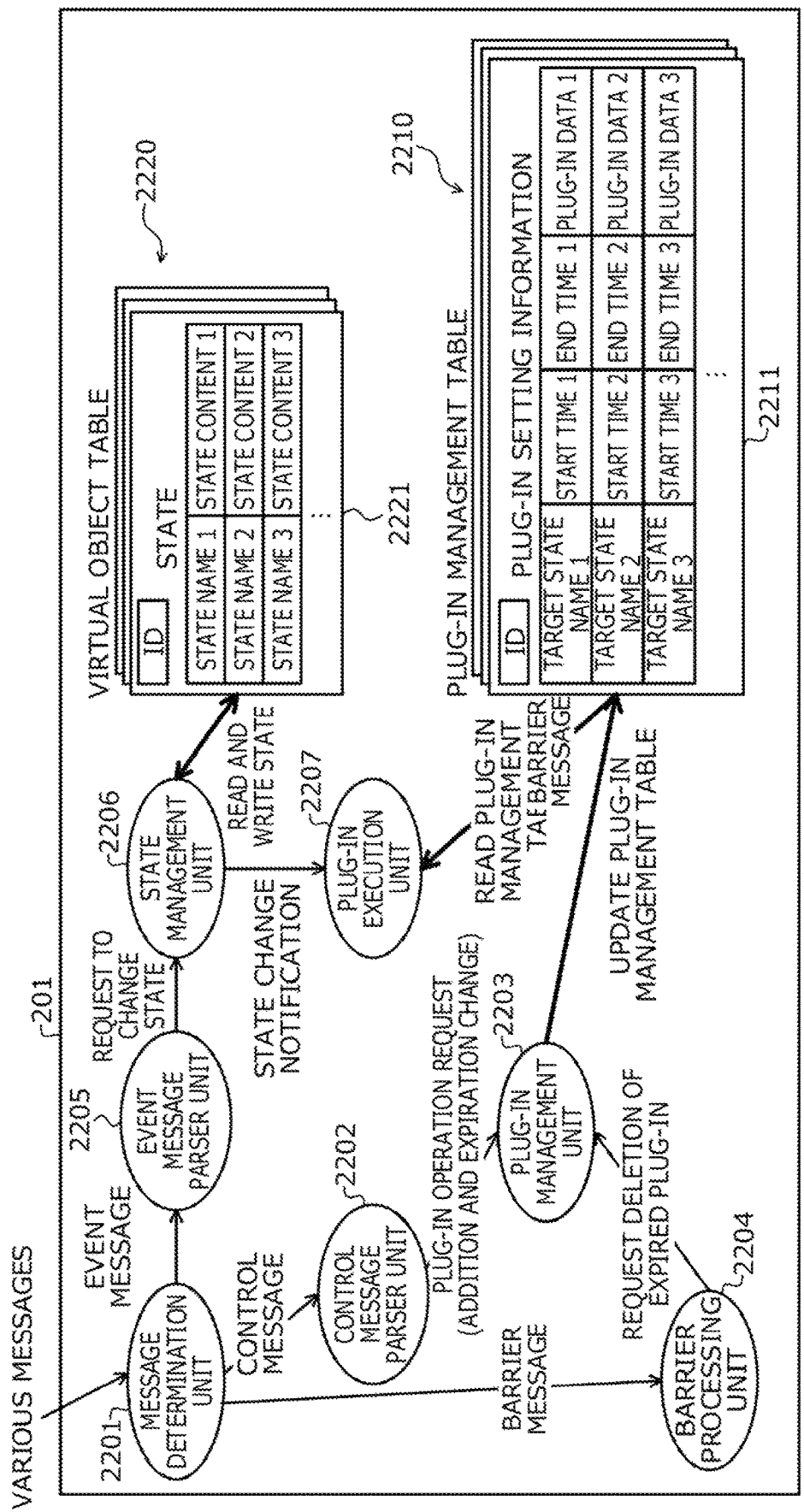
FIG. 22 is an explanatory diagram illustrating a specific functional configuration example of a distributed node 201 in operation example 3.

First, description is given of an example of various messages in operation example 3 with reference to FIG. 21, followed by description of a specific functional configuration example of a distributed node 201 when receiving various messages in operation example 3 with reference to FIG. 22.

FIG. 21 is an explanatory diagram illustrating an example of various messages in operation example 3. In operation example 3, the parallel distributed processing system 200 uses, for example, an event message 2101, a control message 2102 to add a plug-in, a control message 2103 to change the expiration of the plug-in, and a control message 2104 to update the plug-in. The parallel distributed processing system 200 also uses a barrier message 2105, for example.

The event message 2101 is the same as the event message 601 illustrated in FIG. 6, and thus description thereof is omitted. The control message 2102 to add a plug-in is the same as the control message 1502 to add a plug-in illustrated in FIG. 15, and thus description thereof is omitted.

The control message 2103 to change the expiration of the plug-in is the same as the control message 1503 to change the expiration of the plug-in illustrated in FIG. 15, and thus description thereof is omitted. The control message 2104 to update the plug-in is the same as the control message 1504 to update the plug-in illustrated in FIG. 15, and thus description thereof is omitted. The barrier message 2105 has a unique barrier number.

FIG. 22 is an explanatory diagram illustrating a specific functional configuration example of the distributed node 201 in operation example 3. As illustrated in FIG. 22, the distributed node 201 includes a list 2220 of virtual object tables 2221. The virtual object table 2221 is the same as the virtual object table 721 illustrated in FIG. 7, and thus description thereof is omitted.

As illustrated in FIG. 22, the distributed node 201 includes a list 2210 of plug-in management tables 2211. The plug-in management table 2211 is the same as the plug-in management table 1611 illustrated in FIG. 16, and thus description thereof is omitted.

As illustrated in FIG. 22, the distributed node 201 includes a message determination unit 2201, a control message parser unit 2202, a plug-in management unit 2203, and a barrier processing unit 2204. The distributed node 201 further includes an event message parser unit 2205, a state management unit 2206, and a plug-in execution unit 2207.

The message determination unit 2201 receives input of the event message 2101, the control message 2102 to add a plug-in, the control message 2103 to change the expiration of the plug-in, and the control message 2104 to update the plug-in. The message determination unit 2201 also receives input of the barrier message 2105. Then, the message determination unit 2201 determines the types of the inputted messages, and hands over the messages to the control message parser unit 2202, the barrier processing unit 2204, or the event message parser unit 2205.

The control message parser unit 2202 is the same as the control message parser unit 1602 illustrated in FIG. 16, and thus description thereof is omitted.

The plug-in management unit 2203 is the same as the plug-in management unit 1603 illustrated in FIG. 16, except for an operation of deleting a plug-in. Upon receipt of a request to delete an expired plug-in from the barrier processing unit 2204, the plug-in management unit 2203 deletes plug-in data, which is executable format data on the plug-in, from the plug-in management table 2211.

Upon receipt of the barrier message 2105, the barrier processing unit 2204 backs up the virtual object table 2221 and the plug-in management table 2211. After the backup, the barrier processing unit 2204 outputs a request to delete an expired plug-in to the plug-in management unit 2203.

The event message parser unit 2205 is the same as the event message parser unit 1604 illustrated in FIG. 16, and thus description thereof is omitted. The state management unit 2206 is the same as the state management unit 1605 illustrated in FIG. 16, and thus description thereof is omitted. The plug-in execution unit 2207 is the same as the plug-in execution unit 1606 illustrated in FIG. 16, and thus description thereof is omitted.

Thus, the distributed node 201 may update the processing program by adding, deleting, or updating the plug-in for the processing program. The parallel distributed processing system 200 may normally execute backup according to a barrier message, and thus may normally return the state of the parallel distributed processing system 200.

For example, the parallel distributed processing system 200 makes it possible not to delete a plug-in but to back up the plug-in until the distributed node 201 backs up the internal state information as checkpoints in the external storage device. Therefore, in the event of a failure, the parallel distributed processing system 200 allows the distributed node 201 to return the internal state information, thereby enabling failure recovery.

(Overall Processing Procedure in Operation Example 3)

Figure 23:
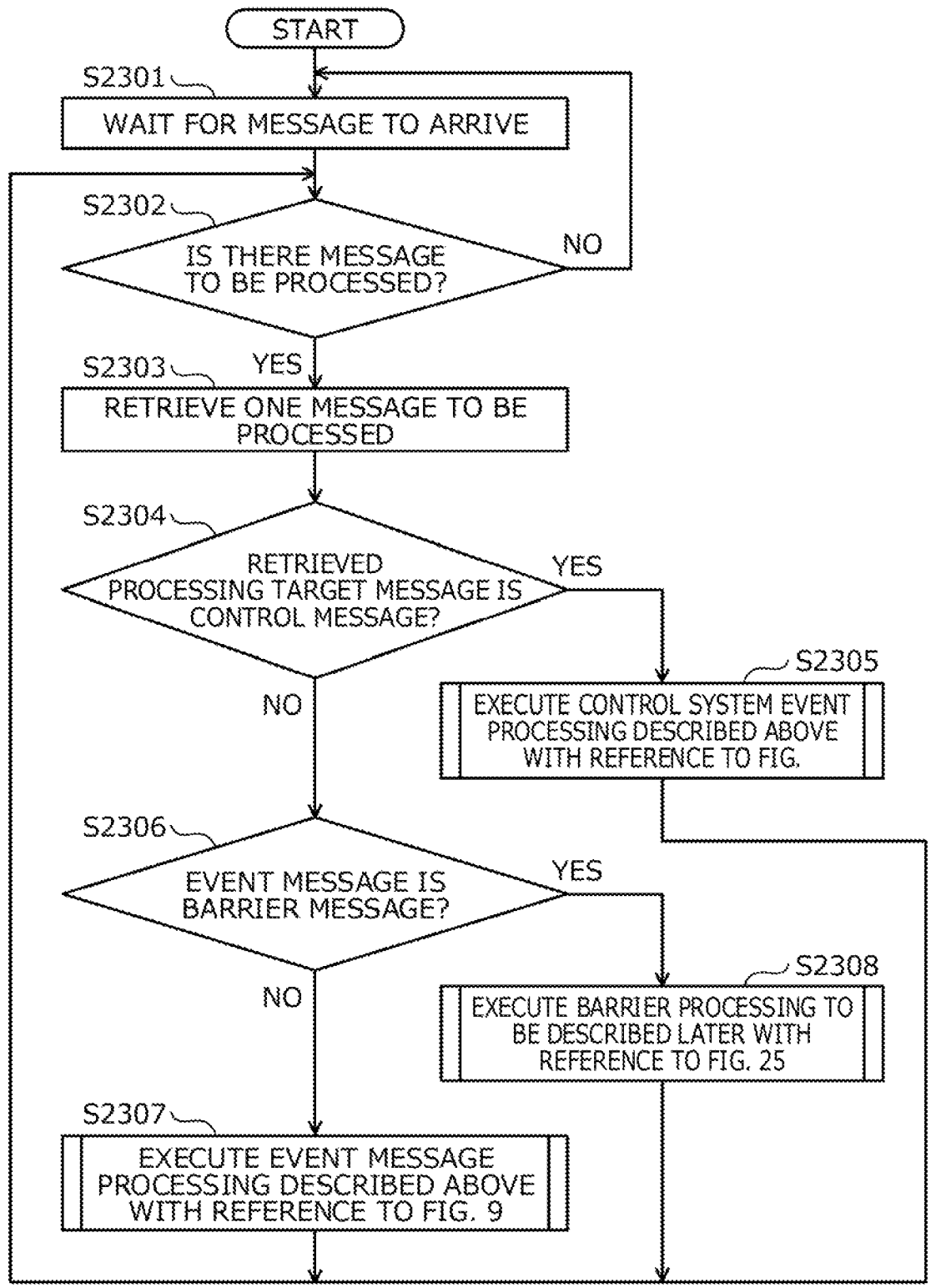
FIG. 23 is a flowchart illustrating an example of an overall processing procedure in operation example 3.

Next, with reference to FIG. 23, description is given of an example of an overall processing procedure in operation example 3, which is executed by the distributed node 201. The overall processing is realized, for example, by the CPU 301, the storage area such as the memory 302 and the recording medium 305, and the network I/F 303 illustrated in FIG. 3.

FIG. 23 is a flowchart illustrating an example of the overall processing procedure in operation example 3. In FIG. 23, the distributed node 201 waits for a message to arrive (Step S2301).

Then, the distributed node 201 determines whether or not there is a message to be processed (Step S2302). When there is no message to be processed (Step S2302: No), the distributed node 201 returns to Step S2301. On the other hand, when there is a message to be processed (Step S2302: Yes), the distributed node 201 moves to Step S2303.

In Step S2303, the distributed node 201 retrieves one of the messages to be processed (Step S2303).

Then, the distributed node 201 determines whether or not the retrieved processing target message is a control message (Step S2304). When the retrieved message is the control message (Step S2304: Yes), the distributed node 201 moves to Step S2305. On the other hand, when the retrieved message is not the control message (Step S2304: No), the distributed node 201 moves to Step S2306.

In Step S2305, the distributed node 201 executes the control system event processing described above with reference to FIG. 11 (Step S2305). Then, the distributed node 201 returns to Step S2302.

In Step S2306, the distributed node 201 determines whether or not the event message is a barrier message (Step S2306). When the event message is not the barrier message (Step S2306: No), the distributed node 201 moves to Step S2307. On the other hand, when the event message is the barrier message (Step S2306: Yes), the distributed node 201 moves to Step S2308.

In Step S2307, the distributed node 201 executes event message processing described above with reference to FIG. 9 (Step S2307). Then, the distributed node 201 returns to Step S2302.

In Step S2308, the distributed node 201 executes barrier processing to be described later with reference to FIG. 25 (Step S2308). Then, the distributed node 201 returns to Step S2302.

(Event Message Processing Procedure in Operation Example 3)

An event message processing procedure in operation example 3 is the same as the event message processing procedure in operation example 1 illustrated in FIG. 9, and thus description thereof is omitted. In the event message processing procedure in operation example 3, plug-in processing in operation example 3 to be described later with reference to FIG. 24 is called up instead of the plug-in processing in operation example 1 illustrated in FIG. 10.

(Plug-in Processing Procedure in Operation Example 3)

Next, with reference to FIG. 24, description is given of an example of a plug-in processing procedure in operation example 3, which is executed by the distributed node 201. The plug-in processing is realized, for example, by the CPU 301, the storage area such as the memory 302 and the recording medium 305, and the network I/F 303 illustrated in FIG. 3.

Figure 24A:
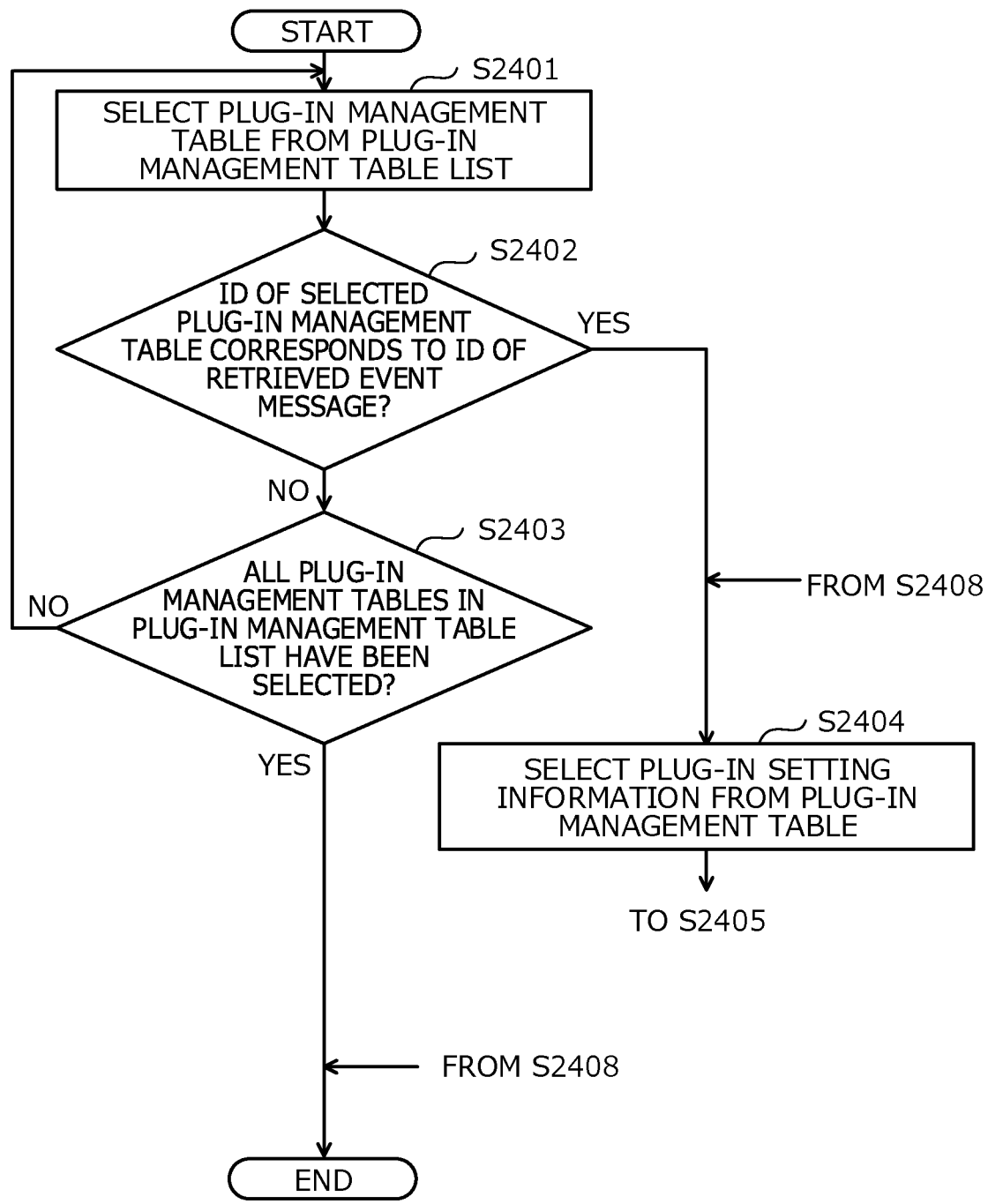
FIGS. 24A and 24B are a flowchart illustrating an example of a plug-in processing procedure in operation example 3.
Figure 24B:
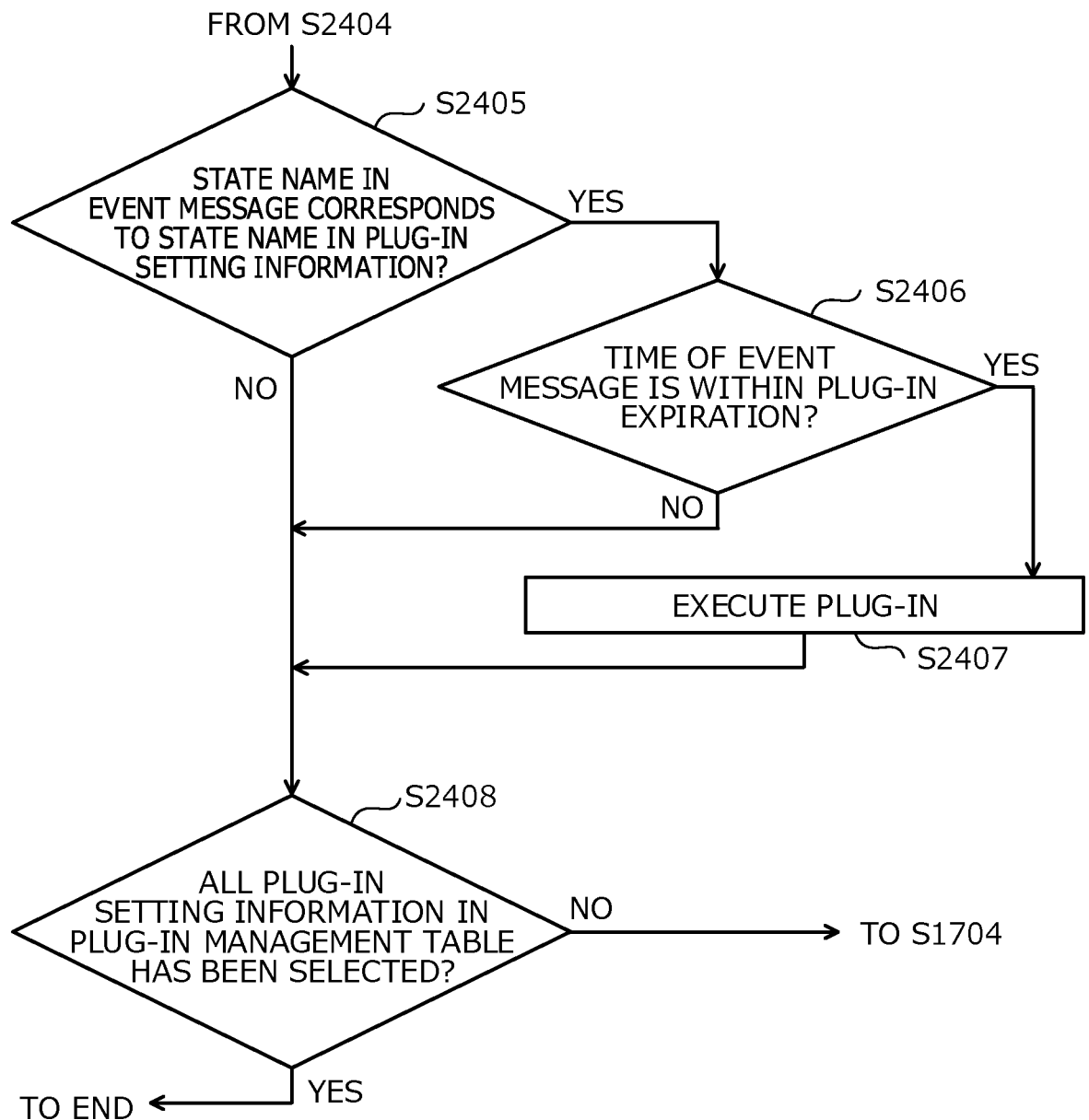

FIG. 24 (i.e. FIGS. 24A and 24B) is a flowchart illustrating an example of the plug-in processing procedure in operation example 3. In FIG. 24, the distributed node 201 selects one plug-in management table 2211 from the list 2210 of plug-in management tables 2211 (Step S2401).

Next, the distributed node 201 determines whether or not the ID of the selected plug-in management table 2211 corresponds to the ID of the retrieved event message (Step S2402). When the both IDs do not correspond to each other (Step S2402: No), the distributed node 201 moves to Step S2403. On the other hand, when the both IDs correspond to each other (Step S2402: Yes), the distributed node 201 moves to Step S2404.

In Step S2403, the distributed node 201 determines whether or not all the plug-in management tables 2211 have been selected from the list 2210 of plug-in management tables 2211 (Step S2403). When there is any plug-in management table 2211 yet to be selected (Step S2403: No), the distributed node 201 returns to Step S2401. On the other hand, when all the plug-in management tables 2211 have been selected (Step S2403: Yes), the distributed node 201 terminates the plug-in processing.

In Step S2404, the distributed node 201 selects plug-in setting information in the plug-in management table 2211 (Step S2404).

Next, the distributed node 201 determines whether or not the state name in the event message corresponds to the state name in the plug-in setting information (Step S2405). When the both state names correspond to each other (Step S2405: Yes), the distributed node 201 moves to Step S2406. On the other hand, when the both state names do not correspond to each other (Step S2405: No), the distributed node 201 moves to Step S2408.

In Step S2406, the distributed node 201 determines whether or not the time of the event message is within the expiration of the plug-in (Step S2406). When the time is not within the expiration (Step S2406: No), the distributed node 201 moves to Step S2408. On the other hand, when the time is within the expiration (Step S2406: Yes), the distributed node 201 moves to Step S2407.

In Step S2407, the distributed node 201 executes the plug-in (Step S2407). Then, the distributed node 201 moves to Step S2408.

In Step S2408, the distributed node 201 determines whether or not all the plug-in setting information in the plug-in management table 2211 has been selected (Step S2408). When there is any plug-in setting information yet to be selected (Step S2408: No), the distributed node 201 returns to Step S2404. On the other hand, when all the plug-in setting information has been selected (Step S2408: Yes), the distributed node 201 terminates the plug-in processing.

(Control System Event Processing Procedure in Operation Example 3)

A control system event processing procedure in operation example 3 is the same as the control system event processing procedure in operation example 2 illustrated in FIG. 18, and thus description thereof is omitted.

(Plug-in Addition Processing Procedure in Operation Example 3)

A plug-in addition processing procedure in operation example 3 is the same as the plug-in addition processing procedure in operation example 1 illustrated in FIG. 12, and thus description thereof is omitted.

(Expiration Change Processing Procedure in Operation Example 3)

An expiration change processing procedure in operation example 3 is the same as the expiration change processing procedure in operation example 2 illustrated in FIG. 19, and thus description thereof is omitted.

(Plug-in Update Processing Procedure in Operation Example 3)

A plug-in update processing procedure in operation example 3 is the same as the plug-in update processing procedure in operation example 2 illustrated in FIG. 20, and thus description thereof is omitted.

(Barrier Processing Procedure in Operation Example 3)

Figure 25:
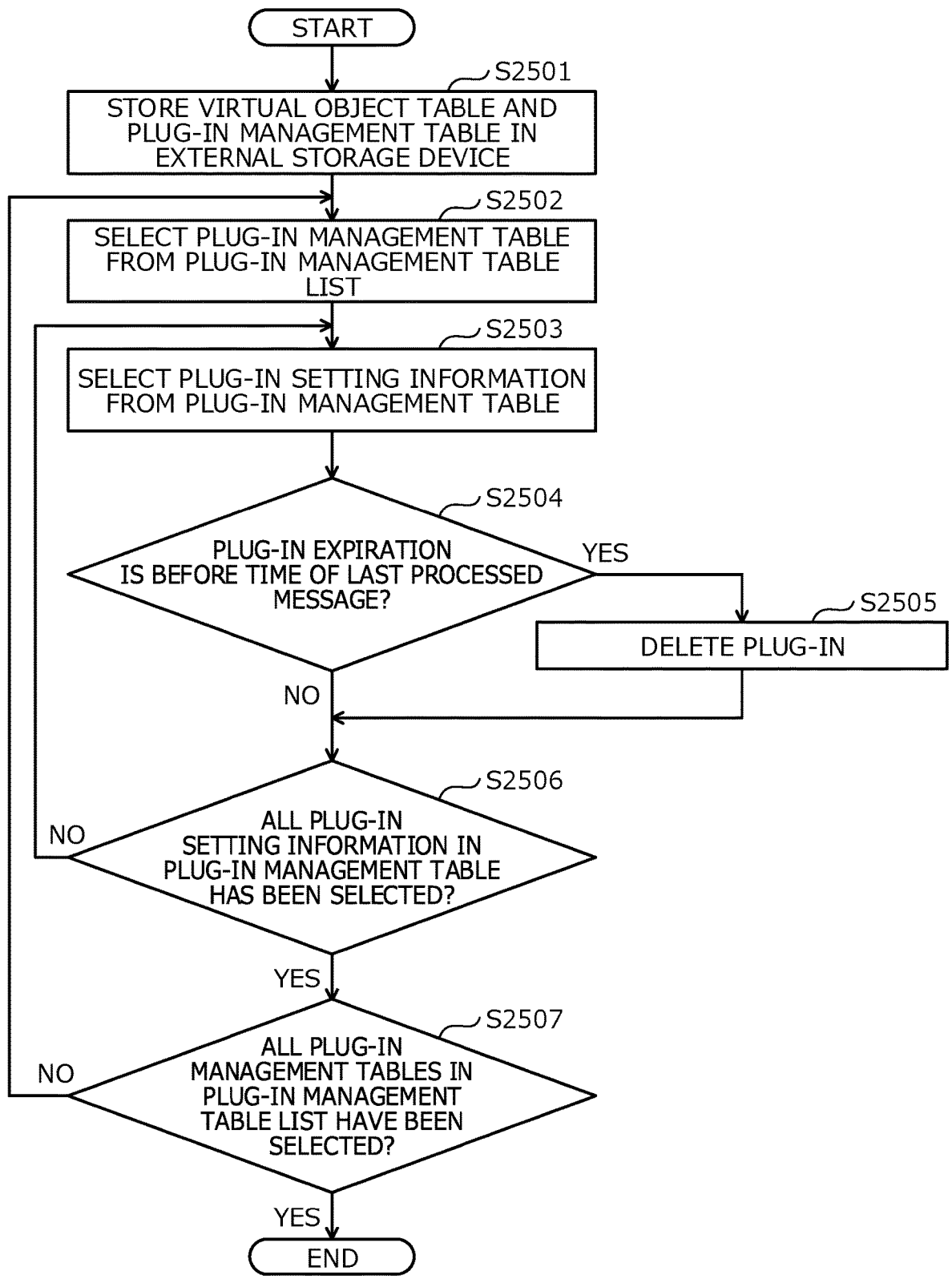
FIG. 25 is a flowchart illustrating an example of a barrier processing procedure in operation example 3.

Next, with reference to FIG. 25, description is given of an example of a barrier processing procedure in operation example 3, which is executed by the distributed node 201. The barrier processing is realized, for example, by the CPU 301, the storage area such as the memory 302 and the recording medium 305, and the network I/F 303 illustrated in FIG. 3.

FIG. 25 is a flowchart illustrating an example of the barrier processing procedure in operation example 3. In FIG. 25, the distributed node 201 stores the virtual object table 2221 and the plug-in management table 2211 in an external storage device (Step S2501). Then, the distributed node 201 moves to Step S2502.

In Step S2502, the distributed node 201 selects one plug-in management table 2211 from the list 2210 of plug-in management tables 2211 (Step S2502). Then, the distributed node 201 moves to Step S2503.

In Step S2503, the distributed node 201 selects plug-in setting information in the plug-in management table 2211 (Step S2503).

Next, the distributed node 201 determines whether or not the expiration of the plug-in is before the time of the last processed message (Step S2504). When the expiration is before the time of the last processed message (Step S2504: Yes), the distributed node 201 moves to Step S2505. On the other hand, when the expiration is not before the time of the last processed message (Step S2504: No), the distributed node 201 moves to Step S2506.

In Step S2505, the distributed node 201 deletes the plug-in (Step S2505). Then, the distributed node 201 moves to Step S2506.

In Step S2506, the distributed node 201 determines whether or not all the plug-in setting information in the plug-in management table 2211 has been selected (Step S2506). When there is any plug-in setting information yet to be selected (Step S2506: No), the distributed node 201 returns to Step S2503. On the other hand, when all the plug-in setting information has been selected (Step S2506: Yes), the distributed node 201 moves to Step S2507.

In Step S2507, the distributed node 201 determines whether or not all the plug-in management tables 2211 have been selected from the list 2210 of plug-in management tables 2211 (Step S2507). When there is any plug-in management table 2211 yet to be selected (Step S2507: No), the distributed node 201 returns to Step S2502. On the other hand, when all the plug-in management tables 2211 have been selected (Step S2507: Yes), the distributed node 201 terminates the barrier processing.

The distributed node 201 may execute the above processing by changing the order of some of the steps. The distributed node 201 may also omit some of the steps.

Operation Example 4 of Parallel Distributed Processing System 200

Next, description is given of operation example 4 of the parallel distributed processing system 200. In operation example 1 described above, a plug-in is stored in a plug-in management table and activated upon receipt of a control message.

On the other hand, in operation example 4, a plug-in is activated upon receipt of a barrier message after a control message is received. Accordingly, in operation example 4, inconsistency in processing may be reduced even when there is a change in the order of arrival of event messages and control messages in the distributed node 201 due to a network delay or the like.

Figure 26:
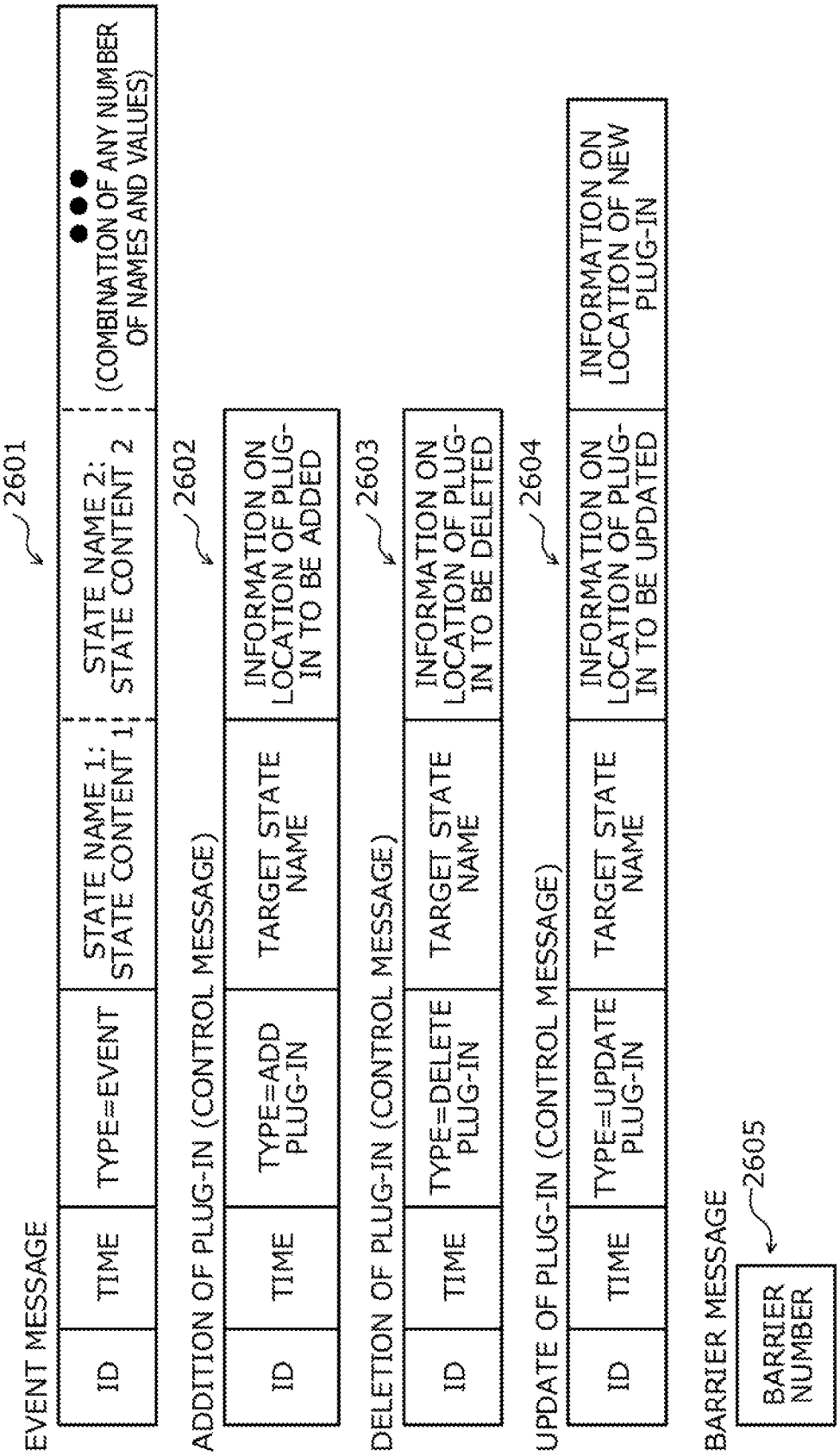
FIG. 26 is an explanatory diagram illustrating an example of various messages in operation example 4.
Figure 27:
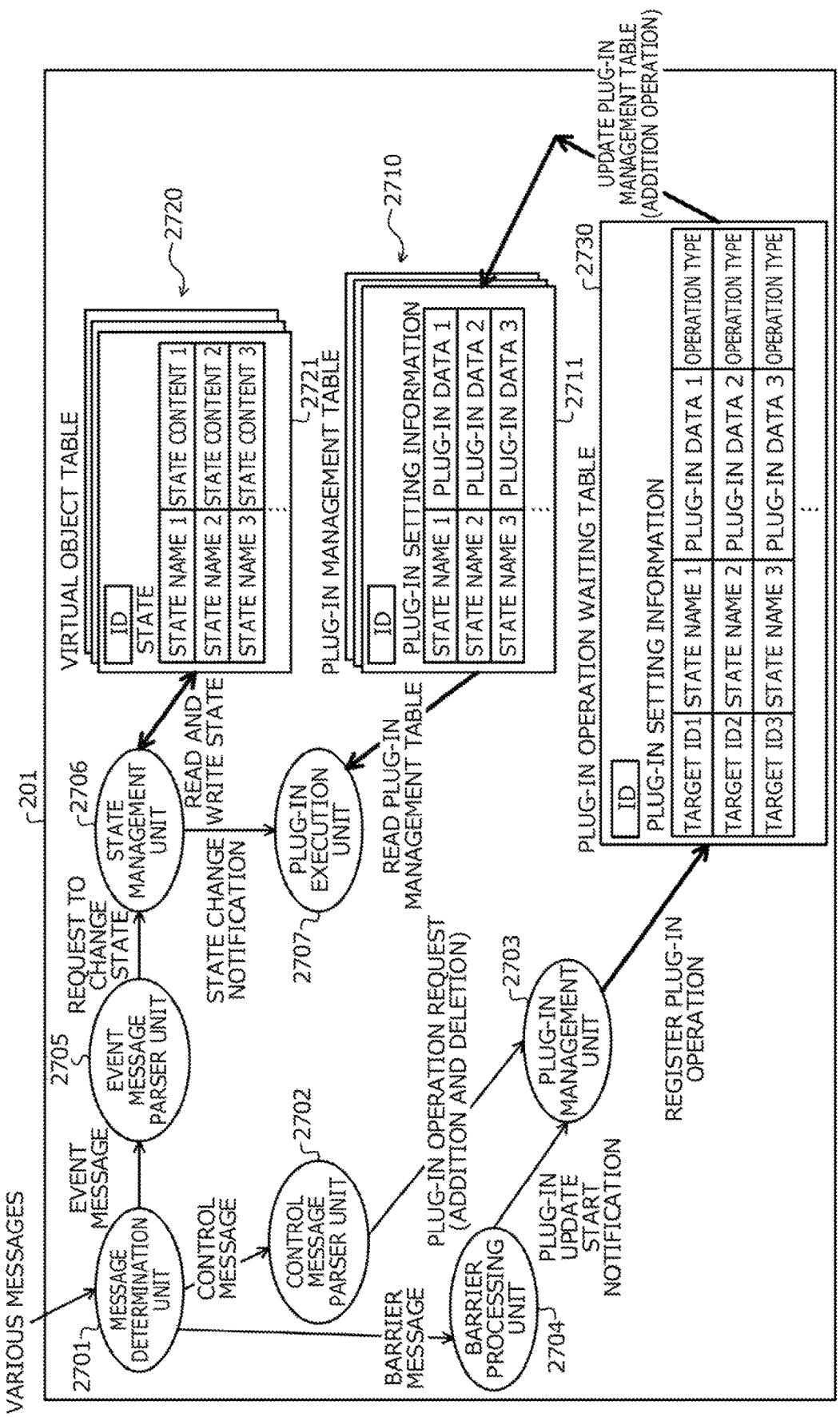
FIG. 27 is an explanatory diagram illustrating a specific functional configuration example of a distributed node 201 in operation example 4.

First, description is given of an example of various messages in operation example 4 with reference to FIG. 26, followed by description of a specific functional configuration example of a distributed node 201 when receiving various messages in operation example 4 with reference to FIG. 27.

FIG. 26 is an explanatory diagram illustrating an example of various messages in operation example 4. In operation example 4, the parallel distributed processing system 200 uses, for example, an event message 2601, a control message 2602 to add a plug-in, a control message 2603 to delete the plug-in, and a control message 2604 to update the plug-in. The parallel distributed processing system 200 also uses a barrier message 2605, for example.

The event message 2601 is the same as the event message 601 illustrated in FIG. 6, and thus description thereof is omitted. The control message 2602 to add a plug-in is the same as the control message 602 to add a plug-in illustrated in FIG. 6, and thus description thereof is omitted.

The control message 2603 to delete the plug-in is the same as the control message 603 to delete the plug-in illustrated in FIG. 6, and thus description thereof is omitted. The control message 2604 to update the plug-in is the same as the control message 604 to update the plug-in illustrated in FIG. 6, and thus description thereof is omitted. The barrier message 2605 has a unique barrier number.

FIG. 27 is an explanatory diagram illustrating a specific functional configuration example of the distributed node 201 in operation example 4. As illustrated in FIG. 27, the distributed node 201 includes a list 2720 of virtual object tables 2721. The virtual object table 2721 is the same as the virtual object table 721 illustrated in FIG. 7, and thus description thereof is omitted.

As illustrated in FIG. 27, the distributed node 201 includes a list 2710 of plug-in management tables 2711. The plug-in management table 2711 is the same as the plug-in management table 711 illustrated in FIG. 7, and thus description thereof is omitted.

As illustrated in FIG. 27, the distributed node 201 includes a plug-in operation waiting table 2730. The plug-in operation waiting table 2730 is realized by a storage area such as the memory 302 and the recording medium 305 in the distributed node 201 illustrated in FIG. 3, for example.

The plug-in operation waiting table 2730 includes an ID field. The plug-in operation waiting table 2730 further includes fields of target ID, state name, plug-in data, and operation type, which are associated with each other. The plug-in operation waiting table 2730 stores records by setting information in the respective fields.

In the target ID field, an ID is set, which corresponds to the plug-in management table 2711 in which plug-in addition and deletion are performed. In the state name field, a state name is set as information indicating the type of an event to be an execution condition for a plug-in to be added or deleted. In the plug-in data field, plug-in data is set, which is plug-in executable format data. In the operation type field, an operation type is set, which identifies which one of the plug-in addition and deletion operations is to be performed.

As illustrated in FIG. 27, the distributed node 201 includes a message determination unit 2701, a control message parser unit 2702, a plug-in management unit 2703, and a barrier processing unit 2704. The distributed node 201 further includes an event message parser unit 2705, a state management unit 2706, and a plug-in execution unit 2707.

The message determination unit 2701 receives input of the event message 2601, the control message 2602 to add a plug-in, the control message 2603 to delete the plug-in, and the control message 2604 to update the plug-in. The message determination unit 2701 also receives input of the barrier message 2605. The message determination unit 2701 determines the type of the inputted message, and hands over the message to the control message parser unit 2702, the barrier processing unit 2704, or the event message parser unit 2705.

The control message parser unit 2702 is the same as the control message parser unit 702 illustrated in FIG. 7, and thus description thereof is omitted.

The plug-in management unit 2703 updates the plug-in management table 2711 based on the information handed over from the control message parser unit 2702. The plug-in management unit 2703 receives, for example, the ID, the target state name, and the information on the location of the plug-in to be added. The plug-in management unit 2703 specifies the plug-in management table 2711 corresponding to the received ID. The plug-in management unit 2703 acquires plug-in data that is executable format data on the plug-in to be added, based on the information on the location of the plug-in to be added. The plug-in management unit 2703 waits for an addition operation to add the received target state name and the acquired plug-in data, in association with each other, to the specified plug-in management table 2711. The plug-in management unit 2703 stores a record of the addition operation in the plug-in operation waiting table 2730, and waits for the addition operation.

The plug-in management unit 2703 receives, for example, the ID, the target state name, and the information on the location of the plug-in to be deleted. The plug-in management unit 2703 specifies the plug-in management table 2711 corresponding to the received ID. The plug-in management unit 2703 acquires plug-in data that is executable format data on the plug-in to be deleted, based on the information on the location of the plug-in to be deleted. When the specified plug-in management table 2711 includes plug-in data corresponding to the acquired plug-in data in association with the received target state name, the plug-in management unit 2703 waits for a deletion operation to delete the plug-in data. The plug-in management unit 2703 stores a record of the deletion operation in the plug-in operation waiting table 2730, and waits for the deletion operation.

The plug-in management unit 2703 receives, for example, the ID, the target state name, the information on the location of the plug-in to be updated, and the information on the location of new plug-in. The plug-in management unit 2703 specifies the plug-in management table 2711 corresponding to the received ID. The plug-in management unit 2703 acquires plug-in data that is executable format data on the plug-in to be updated and deleted, based on the information on the location of the plug-in to be updated. The plug-in management unit 2703 acquires plug-in data that is new plug-in executable format data based on the information on the location of the new plug-in.

When the specified plug-in management table 2711 includes plug-in data corresponding to the plug-in data to be updated and deleted in association with the received target state name, the plug-in management unit 2703 waits for a deletion operation to delete the plug-in data. For example, the plug-in management unit 2703 stores a record of the deletion operation to the plug-in operation waiting table 2730, and waits for the deletion operation. The plug-in management unit 2703 waits for an addition operation to add the received target state name and the acquired new plug-in data, in association with each other, to the specified plug-in management table 2711. For example, the plug-in management unit 2703 stores a record of the addition operation in the plug-in operation waiting table 2730, and waits for the addition operation. Upon receipt of a plug-in update start notification, the plug-in management unit 2703 executes the addition operation and the deletion operation that have been waited for.

Upon receipt of the barrier message 2605, the barrier processing unit 2704 backs up the virtual object table 2721 and the plug-in management table 2711. After the backup, the barrier processing unit 2704 outputs the plug-in update start notification to the plug-in management unit 2703.

The event message parser unit 2705 is the same as the event message parser unit 704 illustrated in FIG. 7, and thus description thereof is omitted. The state management unit 2706 is the same as the state management unit 705 illustrated in FIG. 7, and thus description thereof is omitted. The plug-in execution unit 2707 is the same as the plug-in execution unit 706 illustrated in FIG. 7, and thus description thereof is omitted.

Thus, the distributed node 201 may update the processing program by adding, deleting, or updating the plug-in for the processing program. The parallel distributed processing system 200 may reduce inconsistency in processing even when there is a change in the order of arrival of event messages and control messages in the distributed node 201 due to a network delay or the like. For example, since the barrier message 2605 has a characteristic that the order of arrival thereof is not interchanged with that of preceding and following messages in each distributed node 201, the parallel distributed processing system 200 may reduce inconsistency in processing based on the barrier message 2605.

The parallel distributed processing system 200 may normally execute backup according to the barrier message 2605, and thus may normally return the state of the parallel distributed processing system 200.

(Overall Processing Procedure in Operation Example 4)

Figure 28:
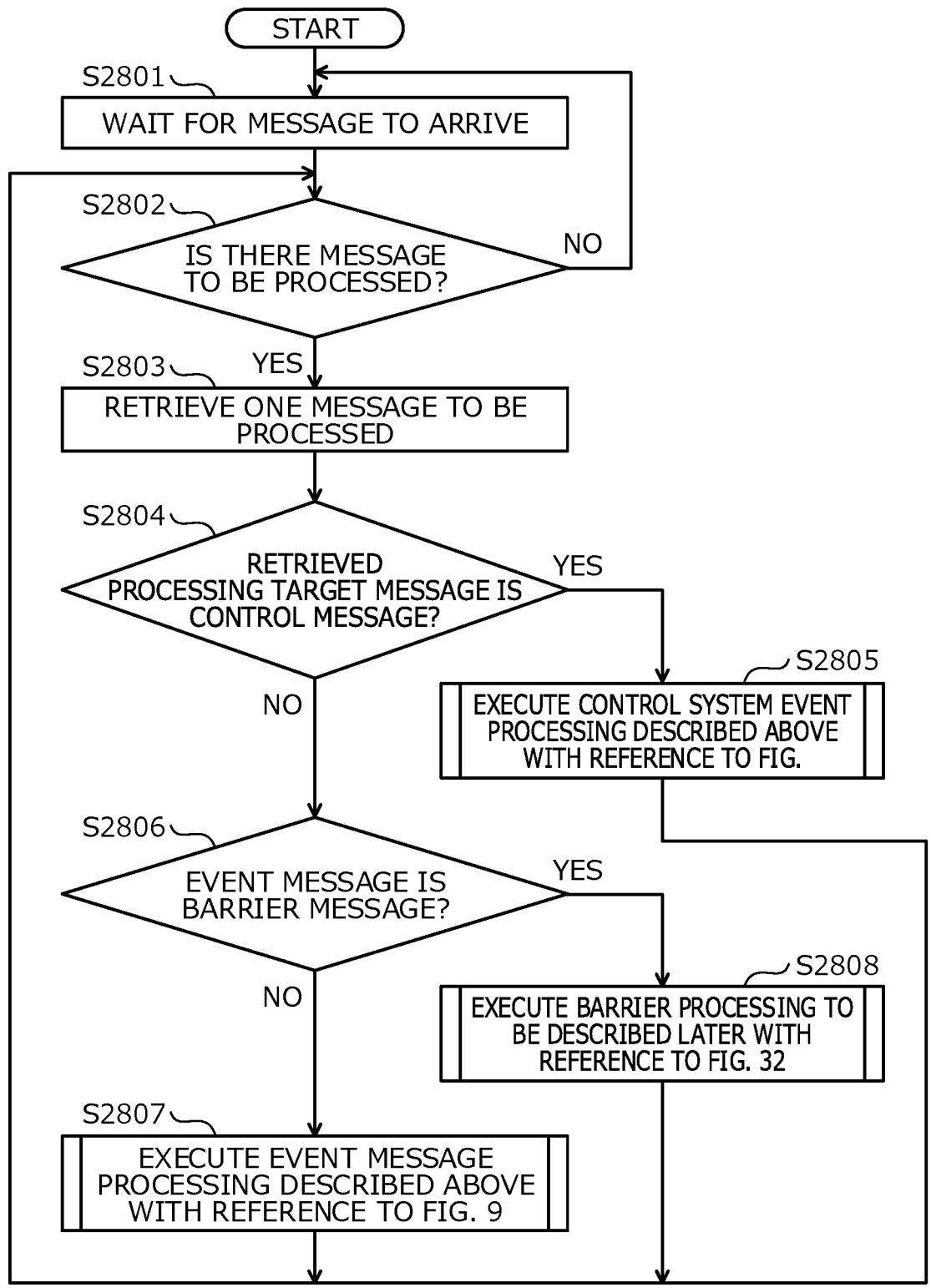
FIG. 28 is a flowchart illustrating an example of an overall processing procedure in operation example 4.

Next, with reference to FIG. 28, description is given of an example of an overall processing procedure in operation example 4, which is executed by the distributed node 201. The overall processing is realized, for example, by the CPU 301, the storage area such as the memory 302 and the recording medium 305, and the network I/F 303 illustrated in FIG. 3.

FIG. 28 is a flowchart illustrating an example of the overall processing procedure in operation example 4. In FIG. 28, the distributed node 201 waits for a message to arrive (Step S2801). Then, the distributed node 201 moves to Step S2802.

In Step S2802, the distributed node 201 determines whether or not there is a message to be processed (Step S2802). When there is no message to be processed (Step S2802: No), the distributed node 201 returns to Step S2801. On the other hand, when there is a message to be processed (Step S2802: Yes), the distributed node 201 moves to Step S2803.

In Step S2803, the distributed node 201 retrieves one of the messages to be processed (Step S2803).

Then, the distributed node 201 determines whether or not the retrieved processing target message is a control message (Step S2804). When the retrieved message is not the control message (Step S2804: No), the distributed node 201 moves to Step S2806. On the other hand, when the retrieved message is the control message (Step S2804: Yes), the distributed node 201 moves to Step S2805.

In Step S2805, the distributed node 201 executes the control system event processing described above with reference to FIG. 11 (Step S2805). Then, the distributed node 201 returns to Step S2802.

In Step S2806, the distributed node 201 determines whether or not the event message is a barrier message (Step S2806). When the event message is not the barrier message (Step S2806: No), the distributed node 201 moves to Step S2807. On the other hand, when the event message is the barrier message (Step S2806: Yes), the distributed node 201 moves to Step S2808.

In Step S2807, the distributed node 201 executes the event message processing described above with reference to FIG. 9 (Step S2807). Then, the distributed node 201 returns to Step S2802.

In Step S2808, the distributed node 201 executes the barrier processing to be described later with reference to FIG. 32 (Step S2808). Then, the distributed node 201 returns to Step S2802.

(Event Message Processing Procedure in Operation Example 4)

An event message processing procedure in operation example 4 is the same as the event message processing procedure in operation example 1 illustrated in FIG. 9, and thus description thereof is omitted.

(Plug-in Processing Procedure in Operation Example 4)

A plug-in processing procedure in operation example 4 is the same as the plug-in processing procedure in operation example 1 illustrated in FIG. 10, and thus description thereof is omitted.

(Control System Event Processing Procedure in Operation Example 4)

A control system event processing procedure in operation example 4 is the same as the control system event processing procedure in operation example 1 illustrated in FIG. 11, and thus description thereof is omitted. In the control system event processing in operation example 4, plug-in addition processing in operation example 4 to be described later with reference to FIG. 29 is called up instead of the plug-in addition processing in operation example 1 illustrated in FIG. 12.

Figure 30:
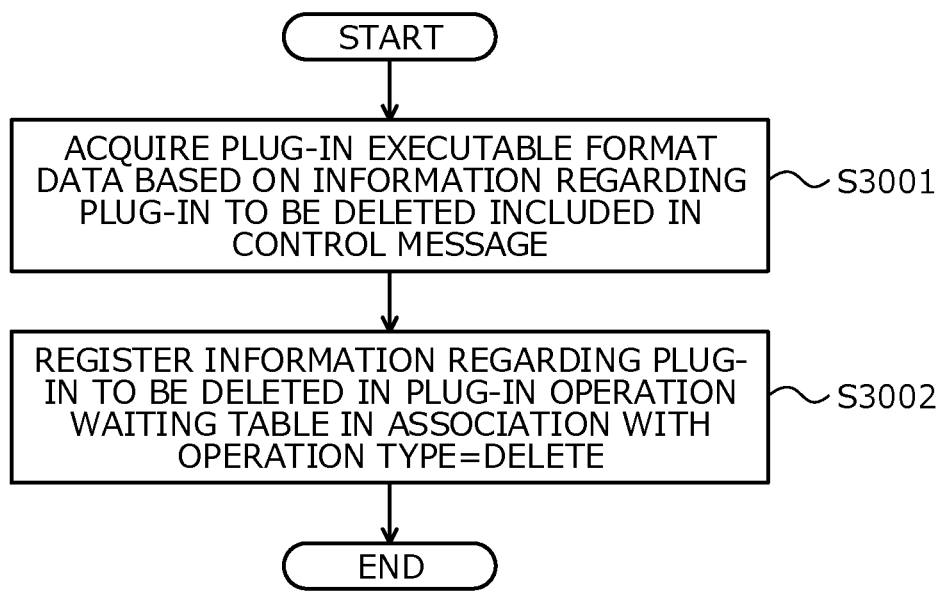
FIG. 30 is a flowchart illustrating an example of a plug-in deletion processing procedure in operation example 4.
Figure 31:
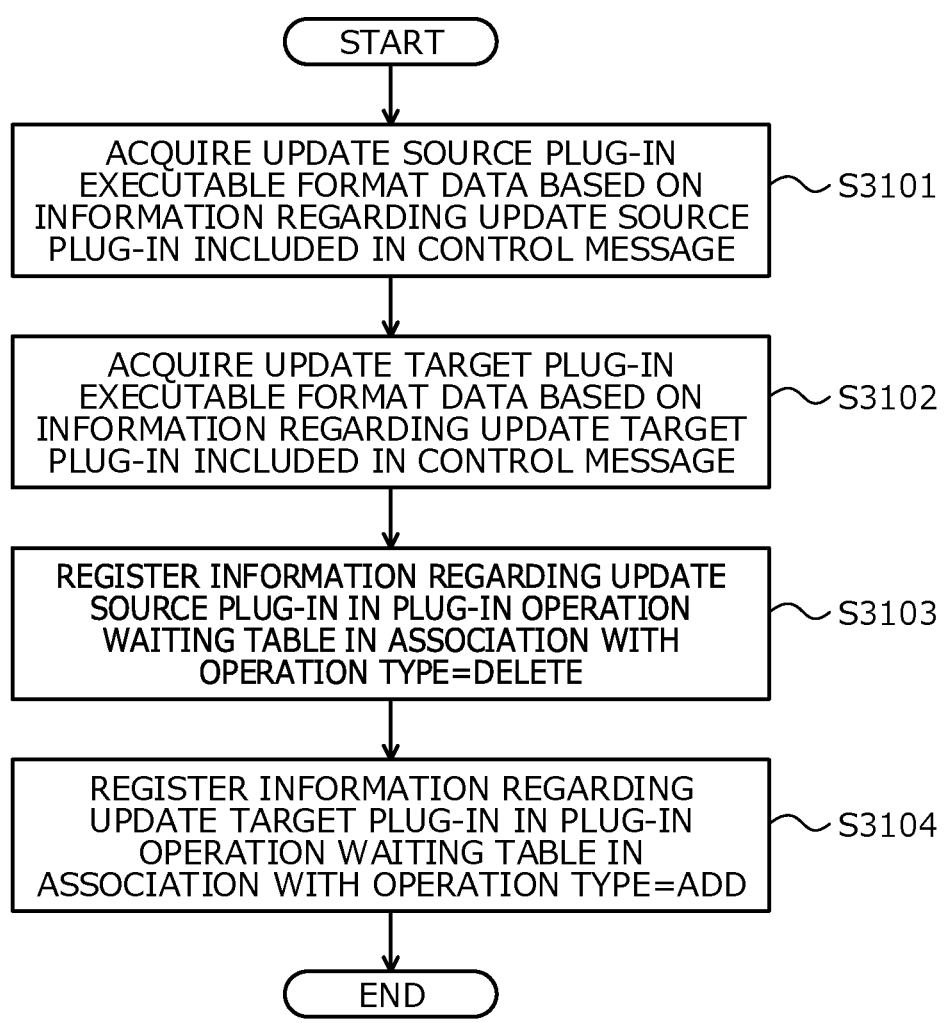
FIG. 31 is a flowchart illustrating an example of a plug-in update processing procedure in operation example 4.

In the control system event processing in operation example 4, plug-in deletion processing in operation example 4 to be described later with reference to FIG. 30 is called up instead of the plug-in deletion processing in operation example 1 illustrated in FIG. 13. In the control system event processing in operation example 4, plug-in update processing in operation example 4 to be described later with reference to FIG. 31 is called up instead of the plug-in update processing in operation example 1 illustrated in FIG. 14.

(Plug-in Addition Processing Procedure in Operation Example 4)

Figure 29:
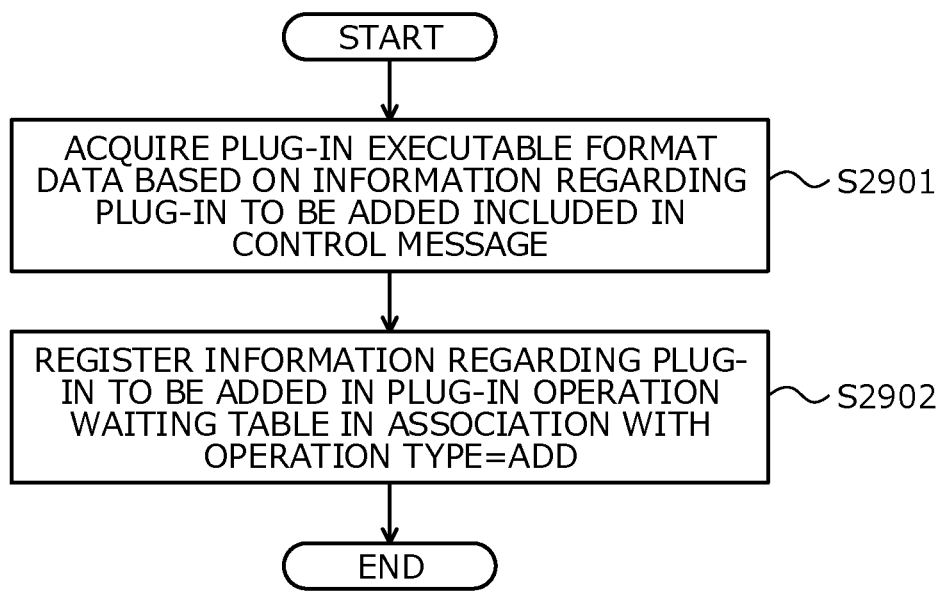
FIG. 29 is a flowchart illustrating an example of a plug-in addition processing procedure in operation example 4.

Next, with reference to FIG. 29, description is given of an example of the plug-in addition processing procedure in operation example 4, which is executed by the distributed node 201. The plug-in addition processing is realized, for example, by the CPU 301, the storage area such as the memory 302 and the recording medium 305, and the network I/F 303 illustrated in FIG. 3.

FIG. 29 is a flowchart illustrating an example of the plug-in addition processing procedure in operation example 4. In FIG. 29, the distributed node 201 acquires plug-in executable format data based on the information regarding a plug-in to be added, which is included in a control message (Step S2901).

Next, the distributed node 201 registers the information regarding the plug-in to be added, in association with "operation type=add", in the plug-in operation waiting table 2730 (Step S2902). Then, the distributed node 201 terminates the plug-in addition processing.

(Plug-in Deletion Processing Procedure in Operation Example 4)

Next, with reference to FIG. 30, description is given of an example of the plug-in deletion processing procedure in operation example 4, which is executed by the distributed node 201. The plug-in deletion processing is realized, for example, by the CPU 301, the storage area such as the memory 302 and the recording medium 305, and the network I/F 303 illustrated in FIG. 3.

FIG. 30 is a flowchart illustrating an example of the plug-in addition processing procedure in operation example 4. In FIG. 30, the distributed node 201 acquires plug-in executable format data based on the information regarding a plug-in to be deleted, which is included in a control message (Step S3001).

Next, the distributed node 201 registers the information regarding the plug-in to be deleted, in association with "operation type=delete", in the plug-in operation waiting table 2730 (Step S3002). Then, the distributed node 201 terminates the plug-in deletion processing.

(Plug-in Update Processing Procedure in Operation Example 4)

Next, with reference to FIG. 31, description is given of an example of the plug-in update processing procedure in operation example 4, which is executed by the distributed node 201. The plug-in update processing is realized, for example, by the CPU 301, the storage area such as the memory 302 and the recording medium 305, and the network I/F 303 illustrated in FIG. 3.

FIG. 31 is a flowchart illustrating an example of the plug-in update processing procedure in operation example 4. In FIG. 31, the distributed node 201 acquires plug-in executable format data based on the information regarding an update source plug-in, which is included in a control message (Step S3101). Then, the distributed node 201 acquires plug-in executable format data based on the information regarding an update target plug-in, which is included in a control message (Step S3102).

Next, the distributed node 201 registers the information regarding the update source plug-in, in association with "operation type=delete", in the plug-in operation waiting table 2730 (Step S3103). Then, the distributed node 201 registers the information regarding the update target plug-in, in association with "operation type=add", in the plug-in operation waiting table 2730 (Step S3104). The distributed node 201 terminates the plug-in update processing.

(Barrier Processing Procedure in Operation Example 4)

Figure 32:
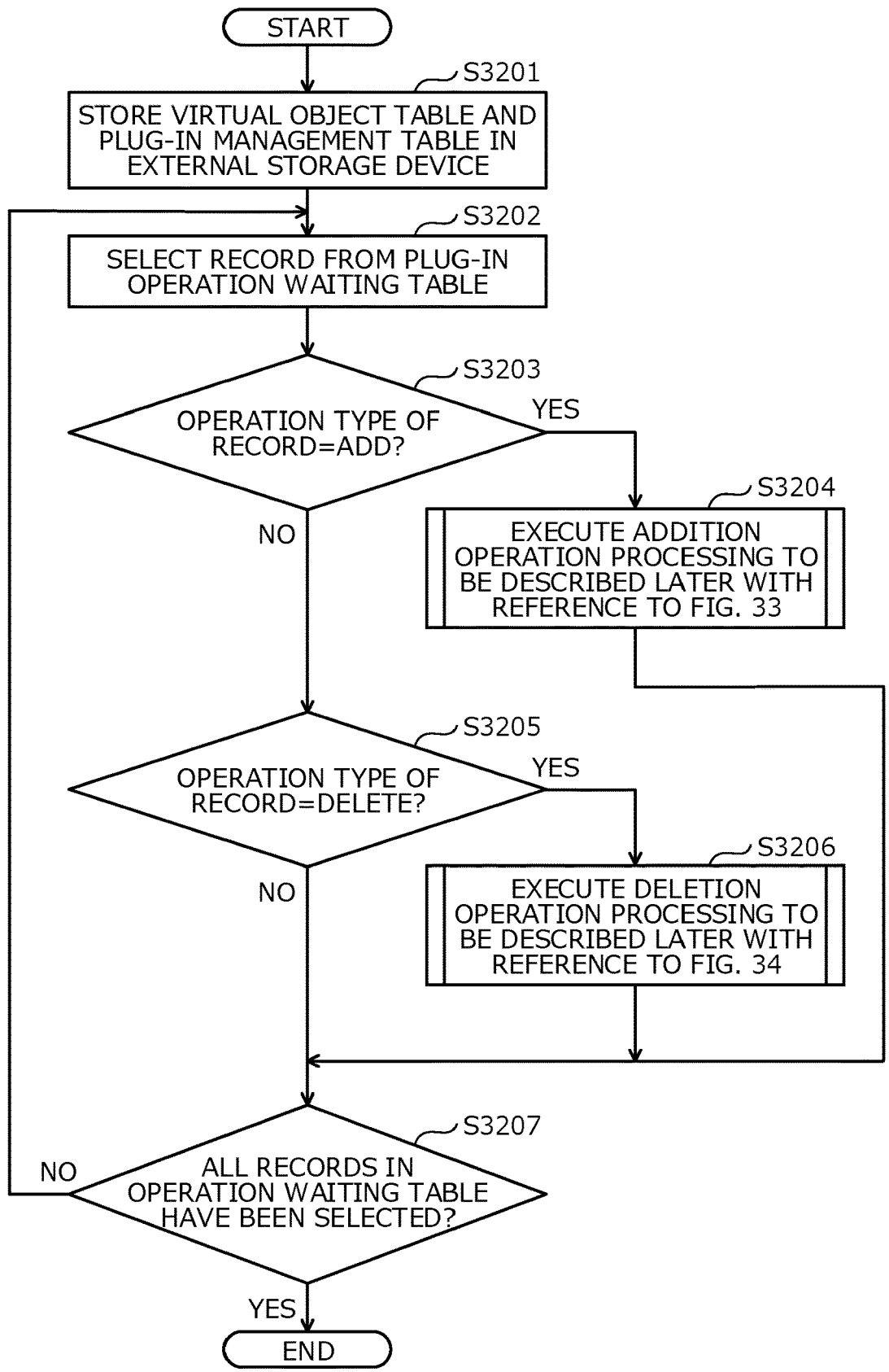
FIG. 32 is a flowchart illustrating an example of a barrier processing procedure in operation example 4.

Next, with reference to FIG. 32, description is given of an example of a barrier processing procedure in operation example 4, which is executed by the distributed node 201. The barrier processing is realized, for example, by the CPU 301, the storage area such as the memory 302 and the recording medium 305, and the network I/F 303 illustrated in FIG. 3.

FIG. 32 is a flowchart illustrating an example of the barrier processing procedure in operation example 4. In FIG. 32, the distributed node 201 stores the virtual object table 2721 and the plug-in management table 2711 in an external storage device (Step S3201). Then, the distributed node 201 moves to Step S3202.

In Step S3202, the distributed node 201 selects one of the records in the plug-in operating waiting table 2730 (Step S3202).

Next, the distributed node 201 determines whether or not the operation type of the record is "add" (Step S3203). When the operation type is "add" (Step S3203: Yes), the distributed node 201 moves to Step S3204. On the other hand, when the operation type is not "add" (Step S3203: No), the distributed node 201 moves to Step S3205.

In Step S3204, the distributed node 201 executes addition operation processing to be described later with reference to FIG. 33 (Step S3204). Then, the distributed node 201 moves to Step S3207.

In Step S3205, the distributed node 201 determines whether or not the operation type of the record is "delete" (Step S3205). When the operation type is "delete" (Step S3205: Yes), the distributed node 201 moves to Step S3206. On the other hand, when the operation type is not "delete" (Step S3205: No), the distributed node 201 moves to Step S3207.

In Step S3206, the distributed node 201 executes deletion operation processing to be described later with reference to FIG. 34 (Step S3206). Then, the distributed node 201 moves to Step S3207.

In Step S3207, the distributed node 201 determines whether or not all the records in the plug-in operation waiting table 2730 have been selected (Step S3207). When there is any record yet to be selected (Step S3207: No), the distributed node 201 returns to Step S3202. On the other hand, when all the records have been selected (Step S3207: Yes), the distributed node 201 terminates the barrier processing.

(Addition Operation Processing Procedure in Operation Example 4)

Figure 33:
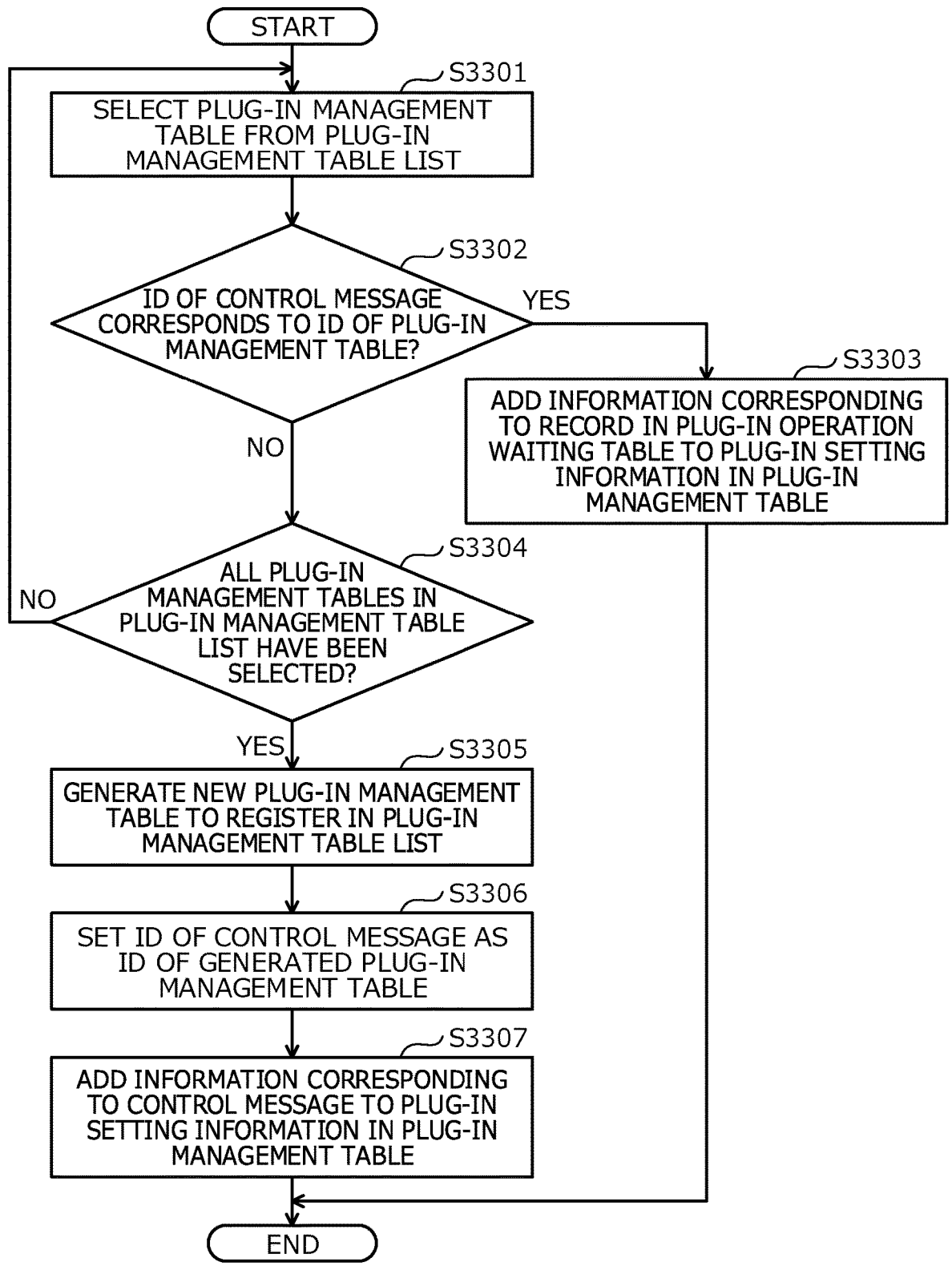
FIG. 33 is a flowchart illustrating an example of an addition operation processing procedure in operation example 4.

Next, with reference to FIG. 33, description is given of an example of an addition operation processing procedure in operation example 4, which is executed by the distributed node 201. The addition operation processing is realized, for example, by the CPU 301, the storage area such as the memory 302 and the recording medium 305, and the network I/F 303 illustrated in FIG. 3.

FIG. 33 is a flowchart illustrating an example of the addition operation processing procedure in operation example 4. In FIG. 33, the distributed node 201 selects one plug-in management table 2711 from the list 2710 of plug-in management tables 2711 (Step S3301).

Next, the distributed node 201 determines whether or not the ID of the control message corresponds to the ID of the selected plug-in management table 2711 (Step S3302). When the both IDs correspond to each other (Step S3302: Yes), the distributed node 201 moves to Step S3303. On the other hand, when the both IDs do not correspond to each other (Step S3302: No), the distributed node 201 moves to Step S3304.

In Step S3303, the distributed node 201 adds information corresponding to the record in the plug-in operation waiting table 2730 to the plug-in setting information in the plug-in management table 2711 (Step S3303). Then, the distributed node 201 terminates the addition operation processing.

In Step S3304, the distributed node 201 determines whether or not all the plug-in management tables 2711 have been selected from the list 2710 of plug-in management tables 2711 (Step S3304). When there is any plug-in management table 2711 yet to be selected (Step S3304: No), the distributed node 201 returns to Step S3301. On the other hand, when all the plug-in management tables 2711 have been selected (Step S3304: Yes), the distributed node 201 moves to Step S3305.

In Step S3305, the distributed node 201 generates a new plug-in management table 2711 to register in the list 2710 of plug-in management tables 2711 (Step S3305). Then, the distributed node 201 sets the ID of the control message as the ID of the generated plug-in management table 2711 (Step S3306).

Then, the distributed node 201 adds information corresponding to the control message to the plug-in setting information in the plug-in management table 2711 (Step S3307). Thereafter, the distributed node 201 terminates the addition operation processing.

(Deletion Operation Processing Procedure in Operation Example 4)

Next, with reference to FIG. 34, description is given of an example of a deletion operation processing procedure in operation example 4, which is executed by the distributed node 201. The deletion operation processing is realized, for example, by the CPU 301, the storage area such as the memory 302 and the recording medium 305, and the network I/F 303 illustrated in FIG. 3.

Figure 34A:
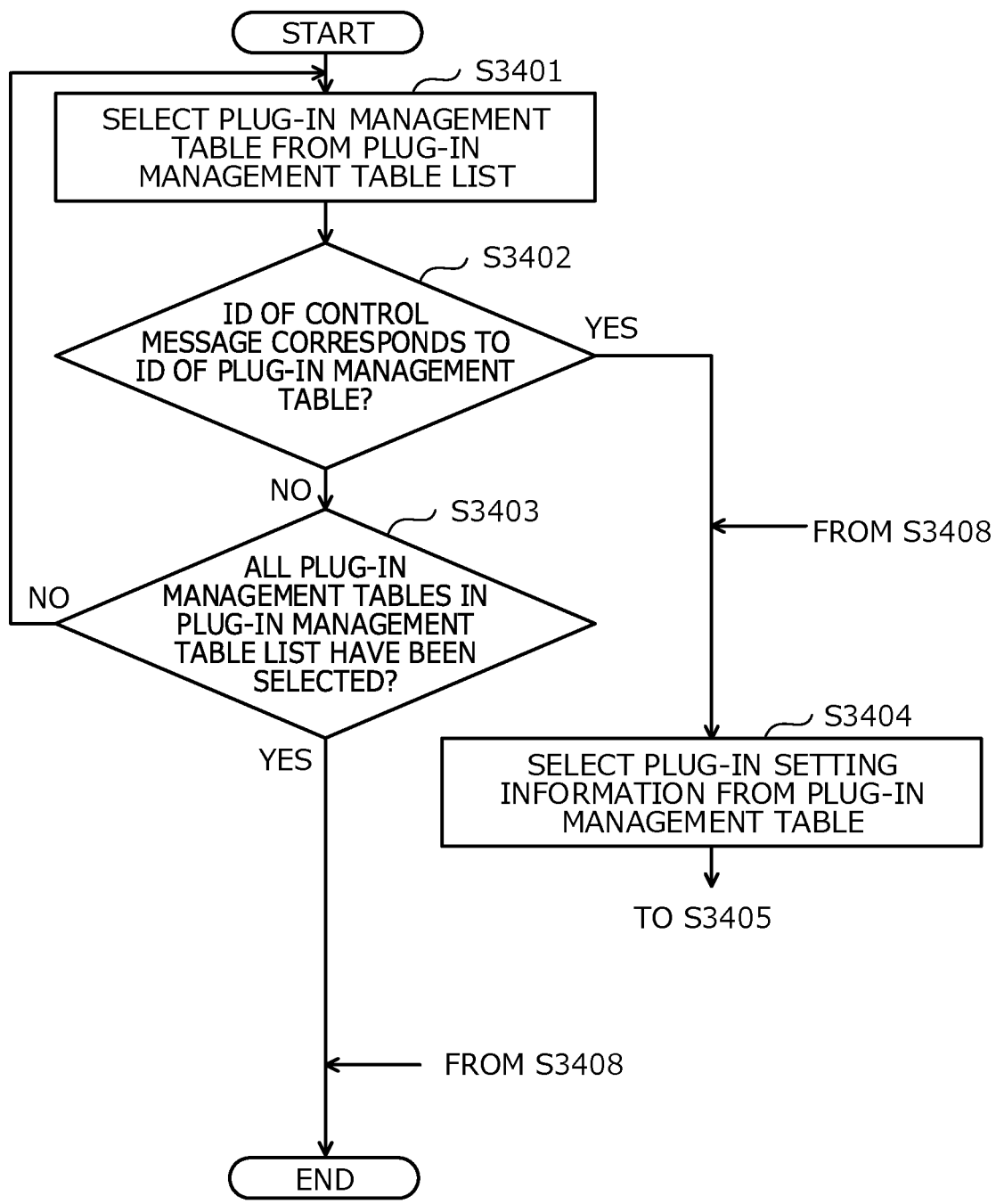
FIGS. 34A and 34B are a flowchart illustrating an example of a deletion operation processing procedure in operation example 4.
Figure 34B:
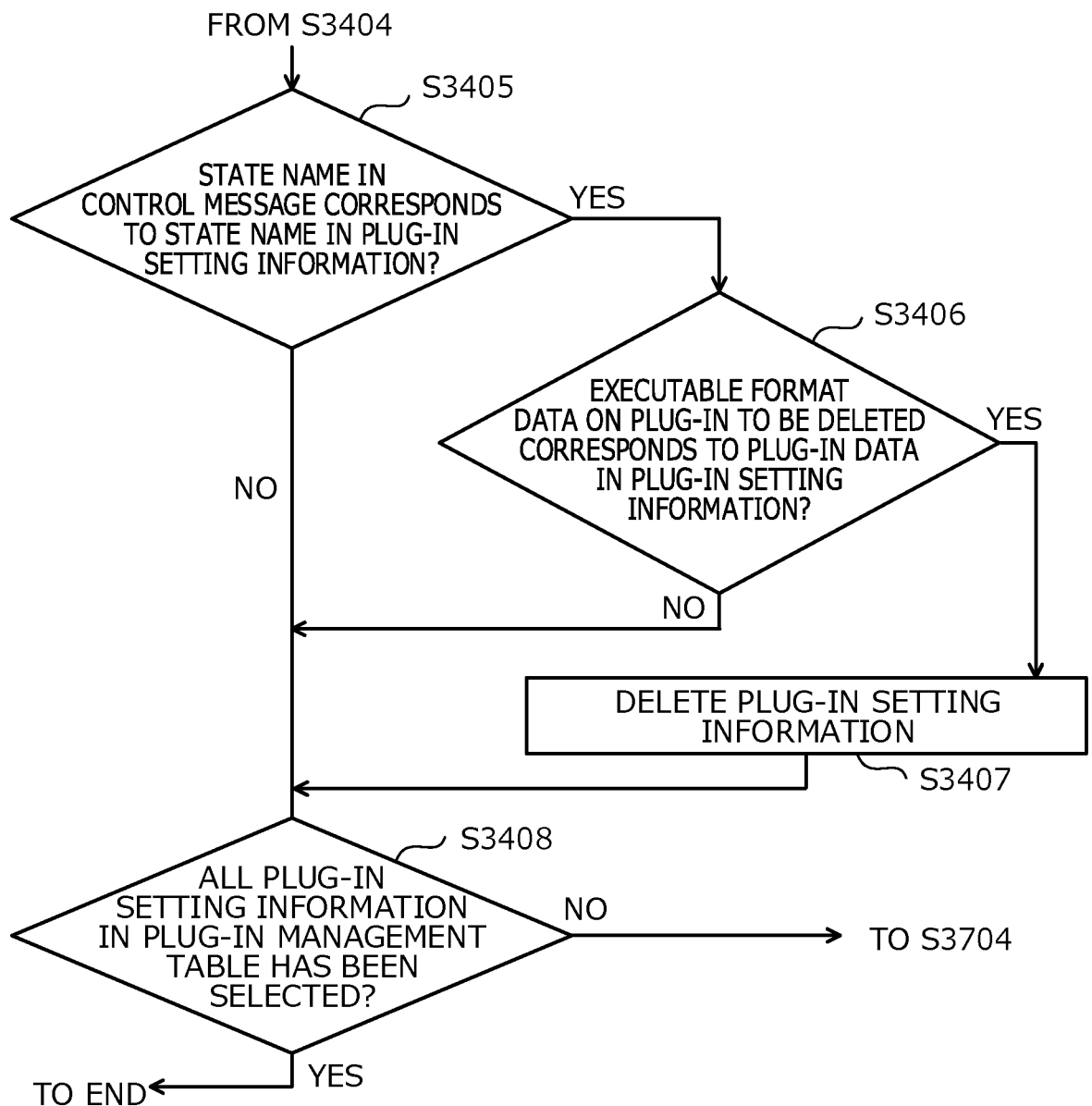

FIG. 34 (i.e. FIGS. 34A and 34B) is a flowchart illustrating an example of the deletion operation processing procedure in operation example 4. In FIG. 34, the distributed node 201 selects one plug-in management table 2711 from the list 2710 of plug-in management tables 2711 (Step S3401).

Next, the distributed node 201 determines whether or not the ID of the control message corresponds to the ID of the selected plug-in management table 2711 (Step S3402). When the both IDs do not correspond to each other (Step S3402: No), the distributed node 201 moves to Step S3403. On the other hand, when the both IDs correspond to each other (Step S3402: Yes), the distributed node 201 moves to Step S3404.

In Step S3403, the distributed node 201 determines whether or not all the plug-in management tables 2711 have been selected from the list 2710 of plug-in management tables 2711 (Step S3403). When there is any plug-in management table 2711 yet to be selected (Step S3403: No), the distributed node 201 returns to Step S3401. On the other hand, when all the plug-in management tables 2711 have been selected (Step S3403: Yes), the distributed node 201 terminates the deletion operation processing.

In Step S3404, the distributed node 201 selects plug-in setting information in the plug-in management table 2711 (Step S3404).

Next, the distributed node 201 determines whether or not the state name in the control message corresponds to the state name in the plug-in setting information (Step S3405). When the both state names do not correspond to each other (Step S3405: No), the distributed node 201 moves to Step S3408. On the other hand, when the both state names correspond to each other (Step S3405: Yes), the distributed node 201 moves to Step S3406.

In Step S3406, the distributed node 201 determines whether or not the executable format data on the plug-in to be deleted corresponds to the plug-in data in the plug-in setting information (Step S3406). When the both data do not correspond to each other (Step S3406: No), the distributed node 201 moves to Step S3408. On the other hand, when the both data correspond to each other (Step S3406: Yes), the distributed node 201 moves to Step S3407.

In Step S3407, the distributed node 201 deletes the plug-in setting information (Step S3407). Then, the distributed node 201 moves to Step S3408.

In Step S3408, the distributed node 201 determines whether or not all the plug-in setting information in the plug-in management table 2711 has been selected (Step S3408). When there is any plug-in setting information yet to be selected (Step S3408: No), the distributed node 201 returns to Step S3404. On the other hand, when all the plug-in setting information has been selected (Step S3408: Yes), the distributed node 201 terminates the deletion operation processing.

The distributed node 201 may execute the above processing by changing the order of some of the steps. The distributed node 201 may also omit some of the steps.

Operation Example 5 of Parallel Distributed Processing System 200

Next, description is given of operation example 5 of the parallel distributed processing system 200. In operation examples 1 to 4 described above, the distributed node 201 reads a plug-in from a specific storage area. The specific storage area is, for example, a download destination. The specific storage area is, for example, a storage area in a computer different from the distributed node 201.

On the other hand, in operation example 5, the distributed node 201 decodes a plug-in from information obtained by encoding the plug-in. Accordingly, in operation example 5, access concentration to the specific storage area may be avoided, which is caused by more than one distributed node 201 reading plug-ins from the specific storage area.

Figure 35:
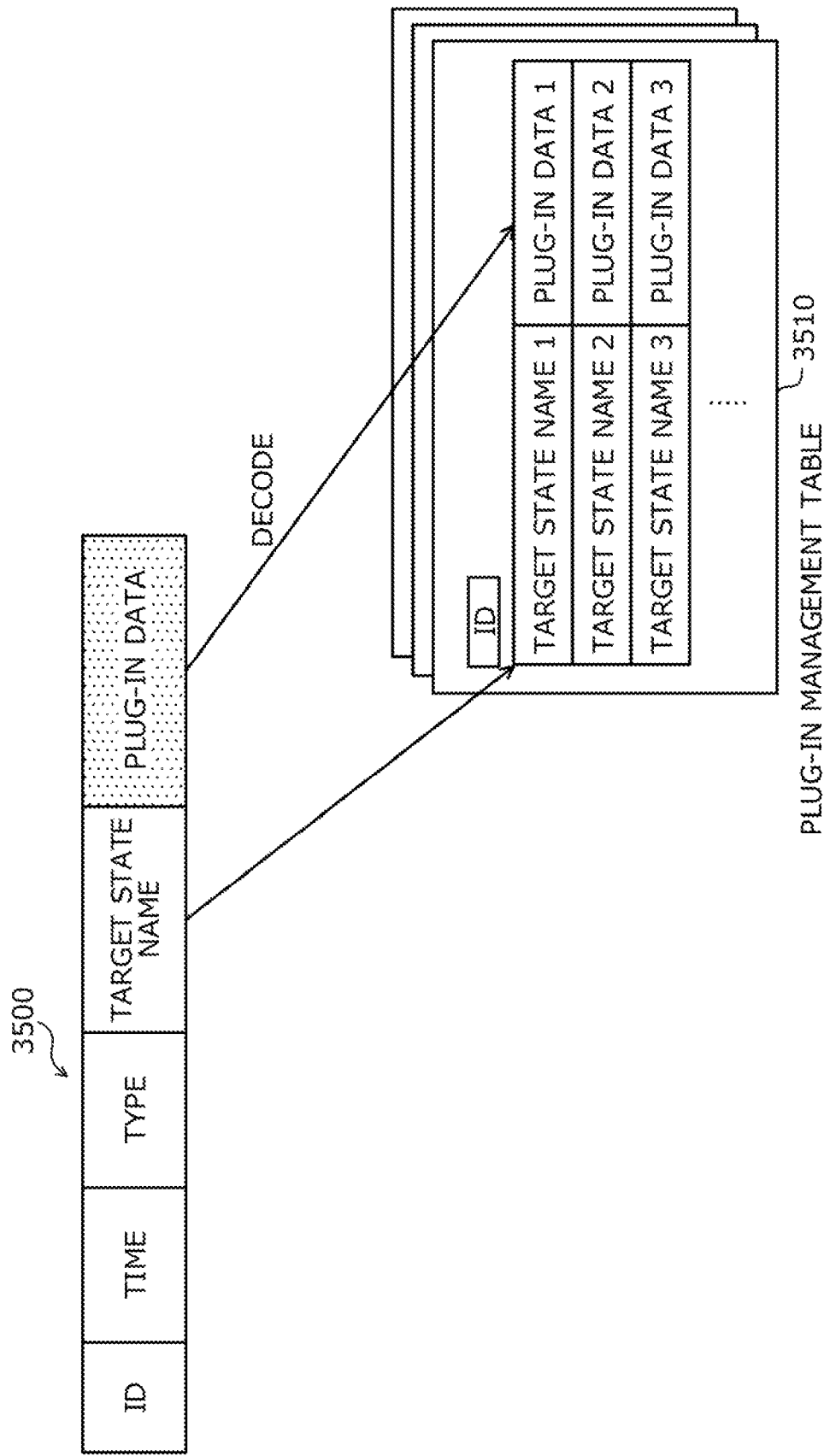
FIG. 35 is an explanatory diagram illustrating a flow of operations of a parallel distributed processing system 200 in operation example 5.

First, with reference to FIG. 35, description is given of a flow of operations of the parallel distributed processing system 200 in operation example 5.

FIG. 35 is an explanatory diagram illustrating the flow of operations of the parallel distributed processing system 200 in operation example 5. In operation example 5, the parallel distributed processing system 200 includes encoded plug-in data in various control messages 3500. A plug-in management table 3510 stores plug-in data decoded from data obtained by encoding the plug-in data. Thus, the parallel distributed processing system 200 may avoid access concentration caused by more than one distributed node 201 reading plug-ins from the specific storage area.

Figure 36:
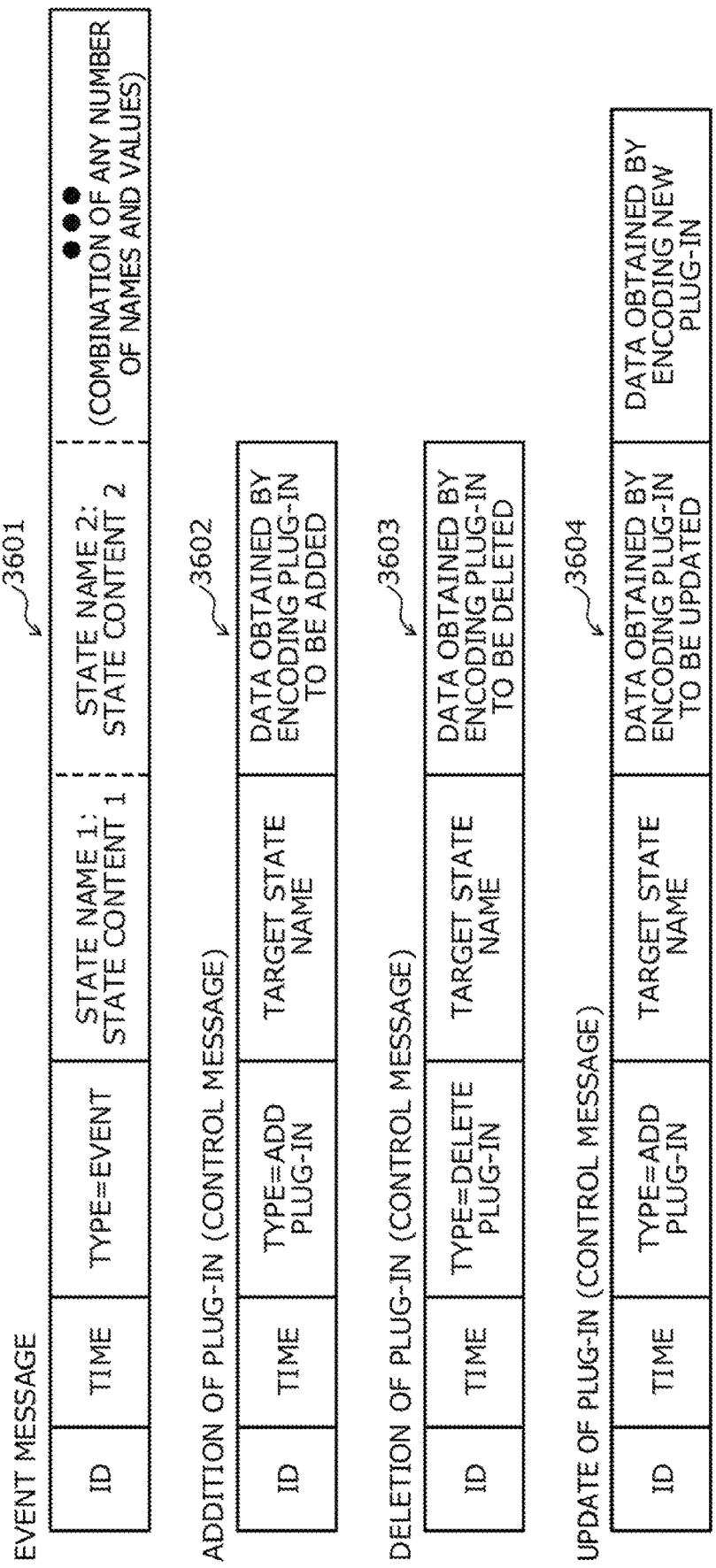
FIG. 36 is an explanatory diagram illustrating an example of various messages in operation example 5.
Figure 37:
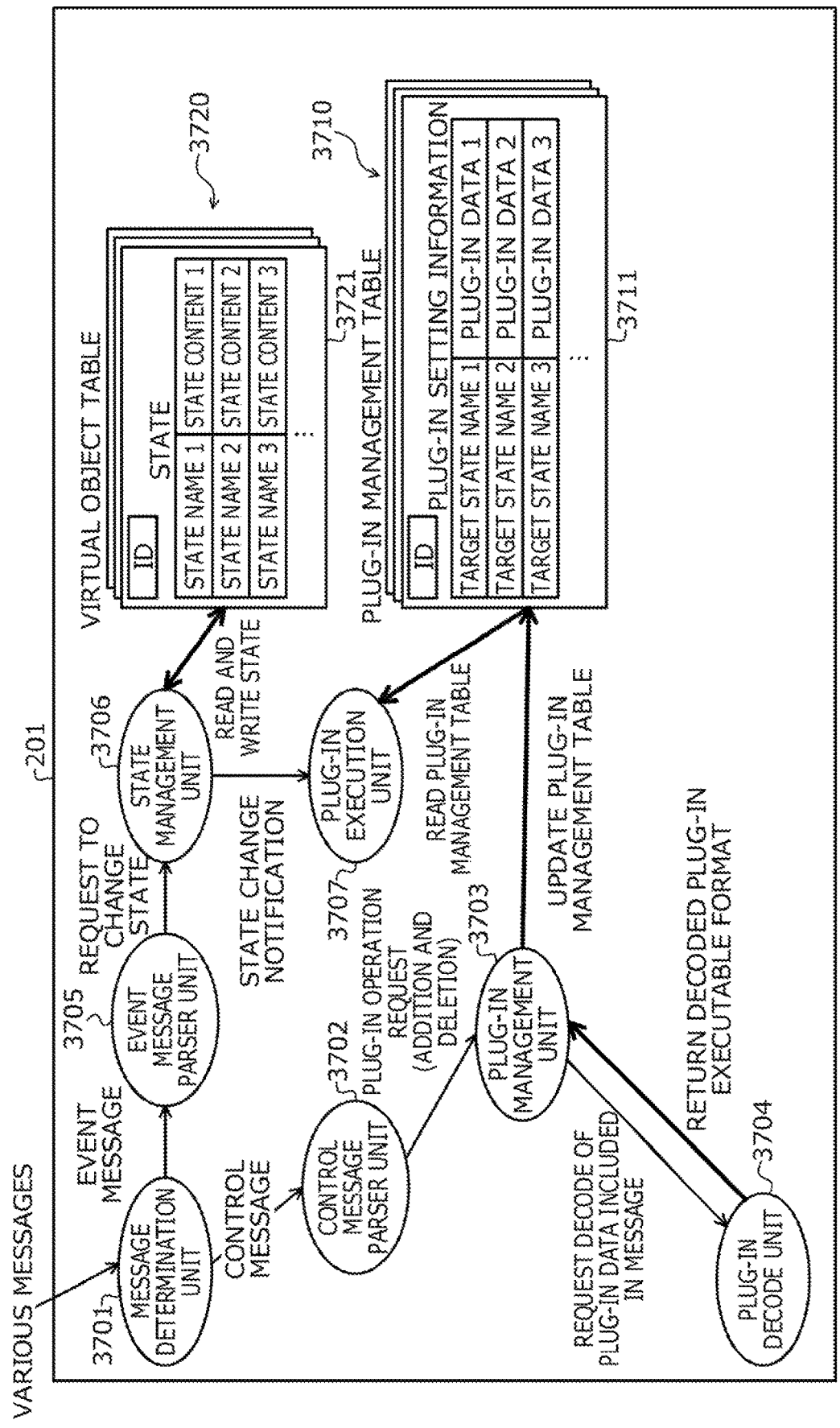
FIG. 37 is an explanatory diagram illustrating a specific functional configuration example of a distributed node 201 in operation example 5.

Next, description is given of an example of various messages in operation example 5 with reference to FIG. 36, followed by description of a specific functional configuration example of a distributed node 201 when receiving various messages in operation example 5 with reference to FIG. 37.

FIG. 36 is an explanatory diagram illustrating an example of various messages in operation example 5. In operation example 5, the parallel distributed processing system 200 uses, for example, an event message 3601, a control message 3602 to add a plug-in, a control message 3603 to change the expiration of the plug-in, and a control message 3604 to update the plug-in.

The event message 3601 is the same as the event message 601 illustrated in FIG. 6, except for including the data obtained by encoding the plug-in, instead of the information on the plug-in location. The control message 3602 to add the plug-in is the same as the control message 602 to add the plug-in illustrated in FIG. 6, except for including the data obtained by encoding the plug-in, instead of the information on the plug-in location.

The control message 3603 to delete the plug-in is the same as the control message 603 to delete the plug-in illustrated in FIG. 6, except for including the data obtained by encoding the plug-in, instead of the information on the plug-in location. The control message 3604 to update the plug-in is the same as the control message 604 to update the plug-in illustrated in FIG. 6, except for including the data obtained by encoding the plug-in, instead of the information on the plug-in location.

FIG. 37 is an explanatory diagram illustrating a specific functional configuration example of the distributed node 201 in operation example 5. As illustrated in FIG. 37, the distributed node 201 includes a list 3720 of virtual object tables 3721. The virtual object table 3721 is the same as the virtual object table 721 illustrated in FIG. 7, and thus description thereof is omitted.

As illustrated in FIG. 37, the distributed node 201 includes a list 3710 of plug-in management tables 3711. The plug-in management table 3711 is the same as the plug-in management table 711 illustrated in FIG. 7 and the plug-in management table 3510 illustrated in FIG. 35, and thus description thereof is omitted.

As illustrated in FIG. 37, the distributed node 201 includes a message determination unit 3701, a control message parser unit 3702, a plug-in management unit 3703, and a plug-in decode unit 3704. The distributed node 201 further includes an event message parser unit 3705, a state management unit 3706, and a plug-in execution unit 3707.

The message determination unit 3701 is the same as the message determination unit 701 illustrated in FIG. 7, and thus description thereof is omitted. The control message parser unit 3702 is the same as the control message parser unit 702 illustrated in FIG. 7, and thus description thereof is omitted.

The plug-in management unit 3703 is the same as the plug-in management unit 3703 illustrated in FIG. 7, except for an operation of acquiring plug-in data. The plug-in management unit 3703 acquires plug-in data based on the data obtained by encoding the plug-in, through the plug-in decode unit 3704, instead of acquiring the plug-in data based on the plug-in location. The plug-in decode unit 3704 decodes the plug-in data from the data obtained by encoding the plug-in.

The event message parser unit 3705 is the same as the event message parser unit 704 illustrated in FIG. 7, and thus description thereof is omitted. The state management unit 3706 is the same as the state management unit 705 illustrated in FIG. 7, and thus description thereof is omitted. The plug-in execution unit 3707 is the same as the plug-in execution unit 706 illustrated in FIG. 7, and thus description thereof is omitted.

Thus, the distributed node 201 may update the processing program by adding, deleting, or updating the plug-in for the processing program. The parallel distributed processing system 200 may avoid access concentration to the specific storage area, which is caused by more than one distributed node 201 reading plug-ins from the specific storage area.

(Overall Processing Procedure in Operation Example 5)

An overall processing procedure in operation example 5 is the same as the overall processing procedure in operation example 1 illustrated in FIG. 8, and thus description thereof is omitted.

(Event Message Processing Procedure in Operation Example 5)

An event message processing procedure in operation example 5 is the same as the event message processing procedure in operation example 1 illustrated in FIG. 9, and thus description thereof is omitted.

(Plug-in Processing Procedure in Operation Example 5)

A plug-in processing procedure in operation example 5 is the same as the plug-in processing procedure in operation example 1 illustrated in FIG. 10, and thus description thereof is omitted.

(Control System Event Processing Procedure in Operation Example 5)

A control system event processing procedure in operation example is the same as the control system event processing procedure in operation example 1 illustrated in FIG. 11, and thus description thereof is omitted. In the control system event processing in operation example 5, plug-in addition processing in operation example 5 to be described later with reference to FIG. 38 is called up instead of the plug-in addition processing in operation example 1 illustrated in FIG. 12.

In the control system event processing in operation example 5, plug-in deletion processing in operation example 5 to be described later with reference to FIG. 40 is called up instead of the plug-in deletion processing in operation example 1 Illustrated in FIG. 13. In the control system event processing in operation example 5, plug-in update processing in operation example 5 to be described later with reference to FIG. 41 is called up instead of the plug-in update processing in operation example 1 illustrated in FIG. 14.

(Plug-in Addition Processing Procedure in Operation Example 5)

Figure 38:
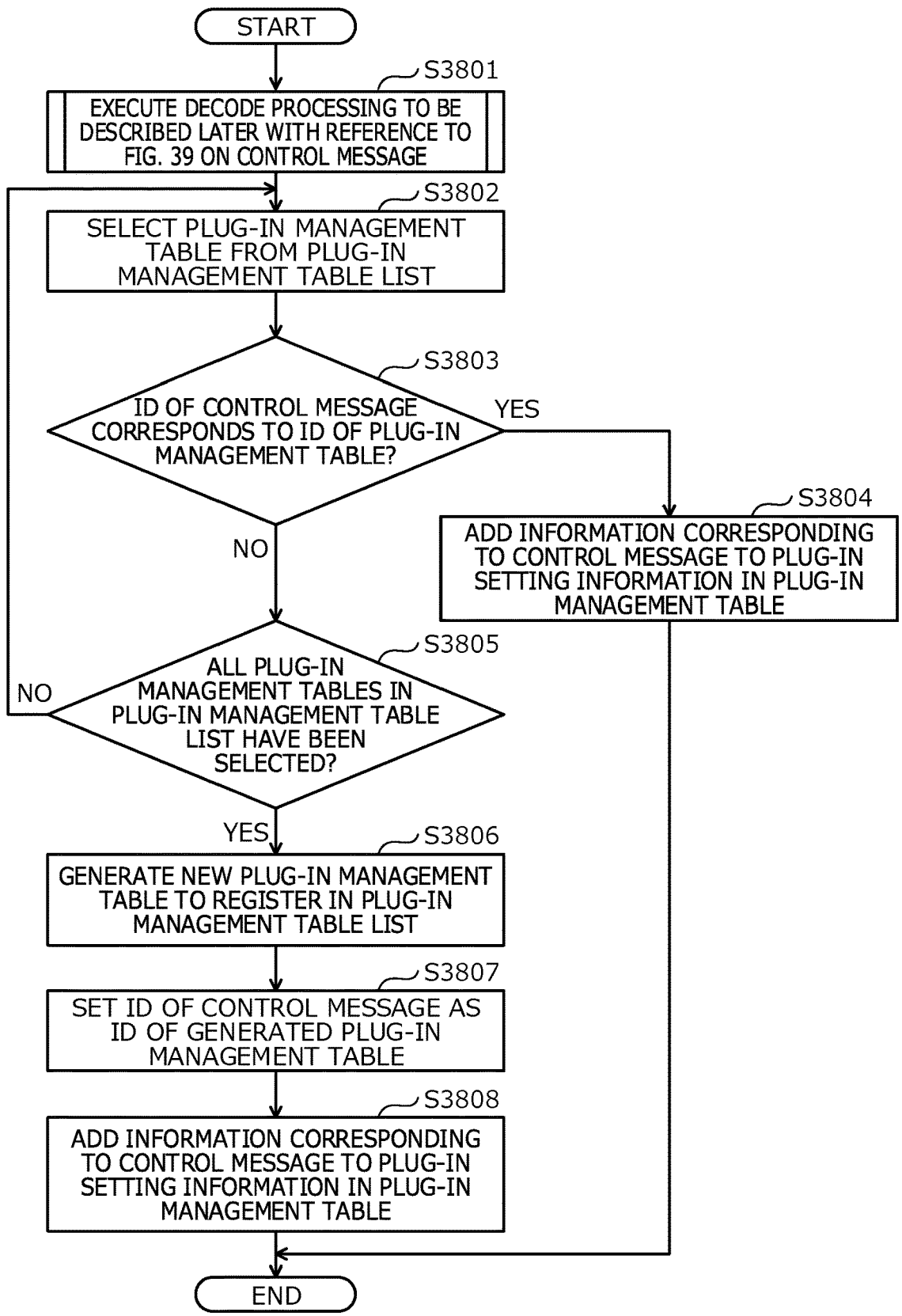
FIG. 38 is a flowchart illustrating an example of a plug-in addition processing procedure in operation example 5.

Next, with reference to FIG. 38, description is given of an example of the plug-in addition processing procedure in operation example 5, which is executed by the distributed node 201. The plug-in addition processing is realized, for example, by the CPU 301, the storage area such as the memory 302 and the recording medium 305, and the network I/F 303 illustrated in FIG. 3.

FIG. 38 is a flowchart illustrating an example of the plug-in addition processing procedure in operation example 5. In FIG. 38, the distributed node 201 executes decode processing to be described later with reference to FIG. 39 (Step S3801). Then, the distributed node 201 moves to Step S3802.

In Step S3802, the distributed node 201 selects one plug-in management table 3711 from the list 3710 of plug-in management tables 3711 (Step S3802).

Next, the distributed node 201 determines whether or not the ID of the control message corresponds to the ID of the selected plug-in management table 3711 (Step S3803).

When the both IDs correspond to each other (Step S3803: Yes), the distributed node 201 moves to Step S3804. On the other hand, when the both IDs do not correspond to each other (Step S3803: No), the distributed node 201 moves to Step S3805.

In Step S3804, the distributed node 201 adds information corresponding to the control message to the plug-in setting information in the plug-in management table 3711 (Step S3804). Then, the distributed node 201 moves to Step S3808.

In Step S3805, the distributed node 201 determines whether or not all the plug-in management tables 3711 have been selected from the list 3710 of plug-in management tables 3711 (Step S3805). When there is any plug-in management table 3711 yet to be selected (Step S3805: No), the distributed node 201 returns to Step S3802. On the other hand, when all the plug-in management tables 3711 have been selected (Step S3805: Yes), the distributed node 201 moves to Step S3806.

In Step S3806, the distributed node 201 generates a new plug-in management table 3711 to register in the list 3710 of plug-in management tables 3711 (Step S3806). Then, the distributed node 201 sets the ID of the control message as the ID of the generated plug-in management table 3711 (Step S3807). Then, the distributed node 201 moves to Step S3808.

In Step S3808, the distributed node 201 adds information corresponding to the control message to the plug-in setting information in the plug-in management table 3711 (Step S3808). Thereafter, the distributed node 201 terminates the plug-in addition processing.

(Decode Processing Procedure in Operation Example 5)

Figure 39:
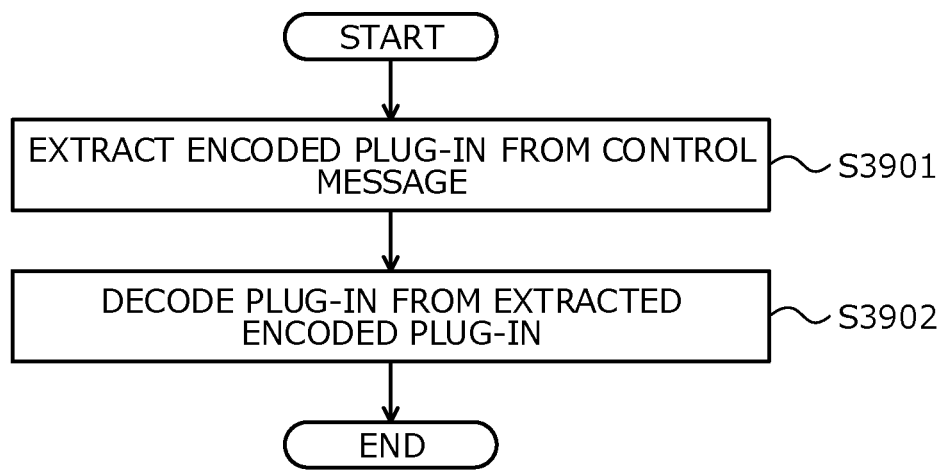
FIG. 39 is a flowchart illustrating an example of a decoding processing procedure in operation example 5.

Next, with reference to FIG. 39, description is given of an example of a decode processing procedure in operation example 5, which is executed by the distributed node 201. The decode processing is realized, for example, by the CPU 301, the storage area such as the memory 302 and the recording medium 305, and the network I/F 303 illustrated in FIG. 3.

FIG. 39 is a flowchart illustrating an example of the decode processing procedure in operation example 5. In FIG. 39, the distributed node 201 extracts an encoded plug-in from a control message (Step S3901). Then, the distributed node 201 decodes the plug-in from the extracted encoded plug-in (Step S3902). Thereafter, the distributed node 201 terminates the decode processing.

(Plug-in Deletion Processing Procedure in Operation Example 5)

Next, with reference to FIG. 40, description is given of an example of a plug-in deletion processing procedure in operation example 5, which is executed by the distributed node 201. The plug-in deletion processing is realized, for example, by the CPU 301, the storage area such as the memory 302 and the recording medium 305, and the network I/F 303 illustrated in FIG. 3.

Figure 40A:
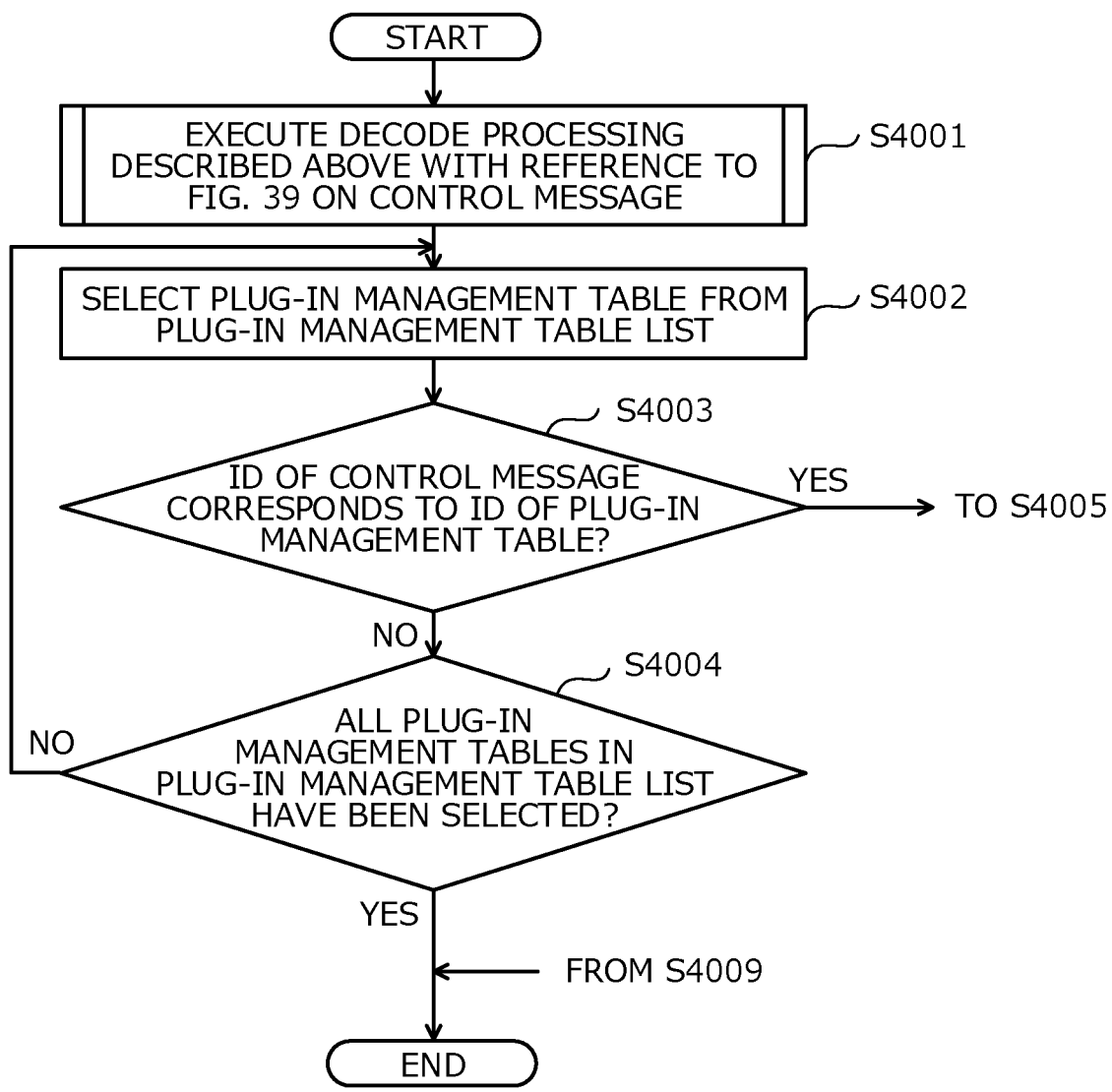
FIGS. 40A and 40B are a flowchart illustrating an example of a plug-in deletion processing procedure in operation example 5.
Figure 40B:
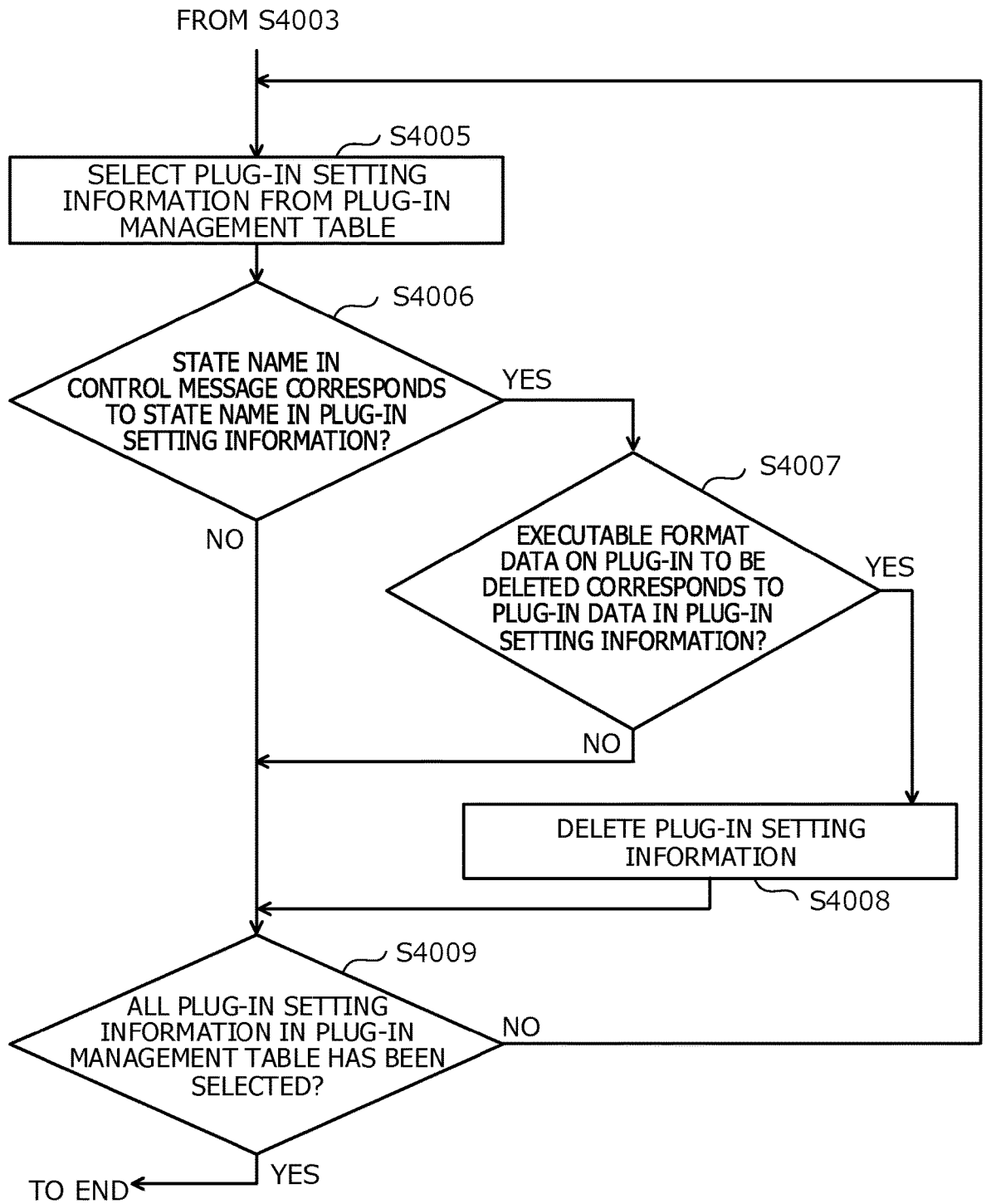

FIG. 40 (i.e. FIGS. 40A and 40B) is a flowchart illustrating an example of the plug-in deletion processing procedure in operation example 5. In FIG. 40, the distributed node 201 executes the decode processing described above with reference to FIG. 39 (Step S4001). Then, the distributed node 201 moves to Step S4002.

In Step S4002, the distributed node 201 selects one plug-in management table 3711 from the list 3710 of plug-in management tables 3711 (Step S4002).

Next, the distributed node 201 determines whether or not the ID of the control message corresponds to the ID of the selected plug-in management table 3711 (Step S4003).

When the both IDs do not correspond to each other (Step S4003: No), the distributed node 201 moves to Step S4004. On the other hand, when the both IDs correspond to each other (Step S4003: Yes), the distributed node 201 moves to Step S4005.

In Step S4004, the distributed node 201 determines whether or not all the plug-in management tables 3711 have been selected from the list 3710 of plug-in management tables 3711 (Step S4004). When there is any plug-in management table 3711 yet to be selected (Step S4004: No), the distributed node 201 returns to Step S4002. On the other hand, when all the plug-in management tables 3711 have been selected (Step S4004: Yes), the distributed node 201 terminates the plug-in deletion processing.

In Step S4005, the distributed node 201 selects plug-in setting information in the plug-in management table 3711 (Step S4005).

Next, the distributed node 201 determines whether or not the state name in the control message corresponds to the state name in the plug-in setting information (Step S4006). When the both state names do not correspond to each other (Step S4006: No), the distributed node 201 moves to Step S4009. On the other hand, when the both state names correspond to each other (Step S4006: Yes), the distributed node 201 moves to Step S4007.

In Step S4007, the distributed node 201 determines whether or not the executable format data on the plug-in to be deleted corresponds to the plug-in data in the plug-in setting information (Step S4007). When the both data do not correspond to each other (Step S4007: No), the distributed node 201 moves to Step S4009. On the other hand, when the both data correspond to each other (Step S4007: Yes), the distributed node 201 moves to Step S4008.

In Step S4008, the distributed node 201 deletes the plug-in setting information (Step S4008). Then, the distributed node 201 moves to Step S4009.

In Step S4009, the distributed node 201 determines whether or not all the plug-in setting information in the plug-in management table 3711 has been selected (Step S4009). When there is any plug-in setting information yet to be selected (Step S4009: No), the distributed node 201 returns to Step S4005. On the other hand, when all the plug-in setting information has been selected (Step S4009: Yes), the distributed node 201 terminates the plug-in deletion processing.

(Plug-in Update Processing Procedure in Operation Example 5)

Next, with reference to FIG. 41, description is given of an example of the plug-in update processing procedure in operation example 5, which is executed by the distributed node 201. The plug-in update processing is realized, for example, by the CPU 301, the storage area such as the memory 302 and the recording medium 305, and the network I/F 303 illustrated in FIG. 3.

Figure 41A:
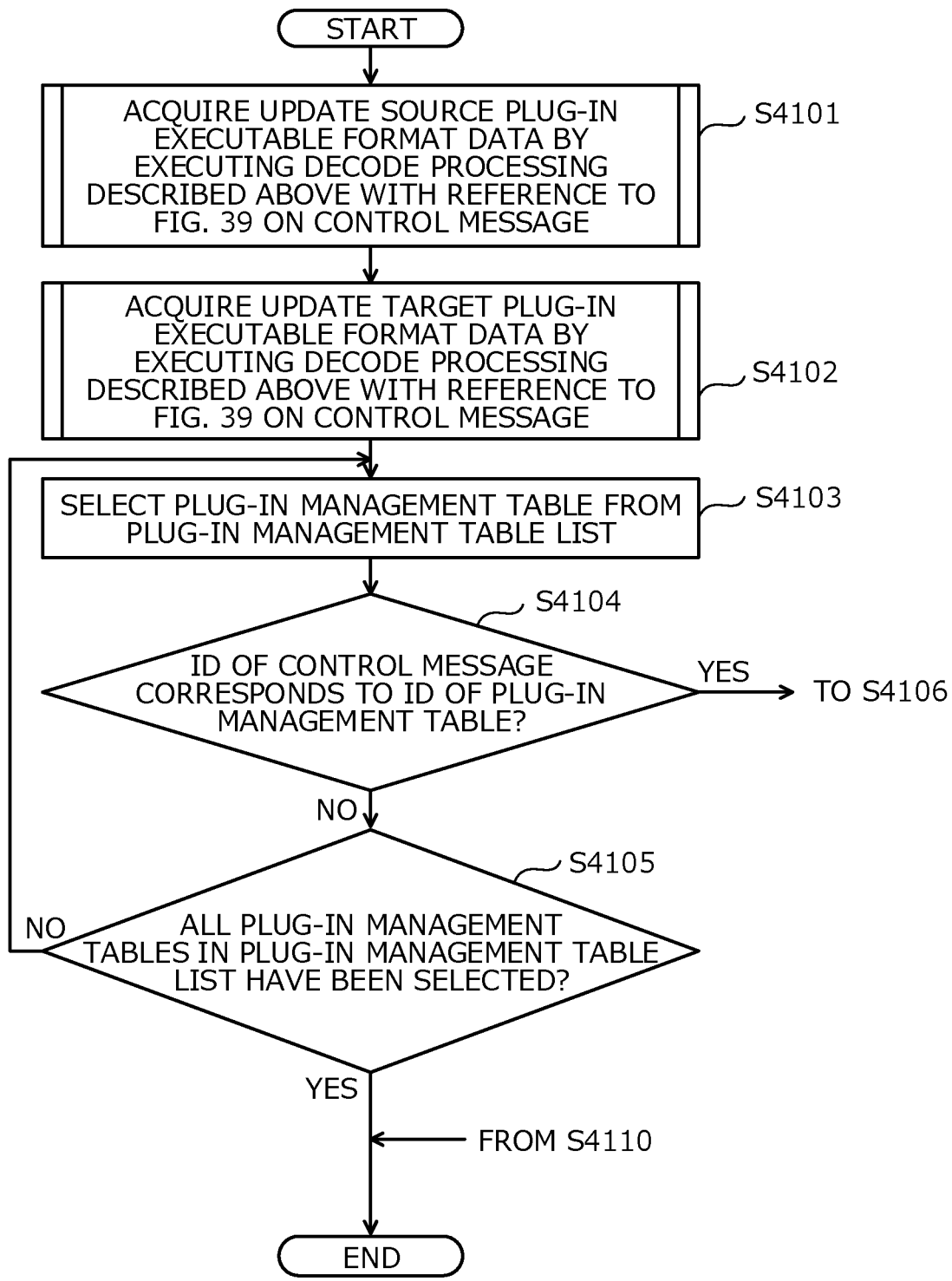
FIGS. 41A and 41B are a flowchart illustrating an example of a plug-in update processing procedure in operation example 5.
Figure 41B:
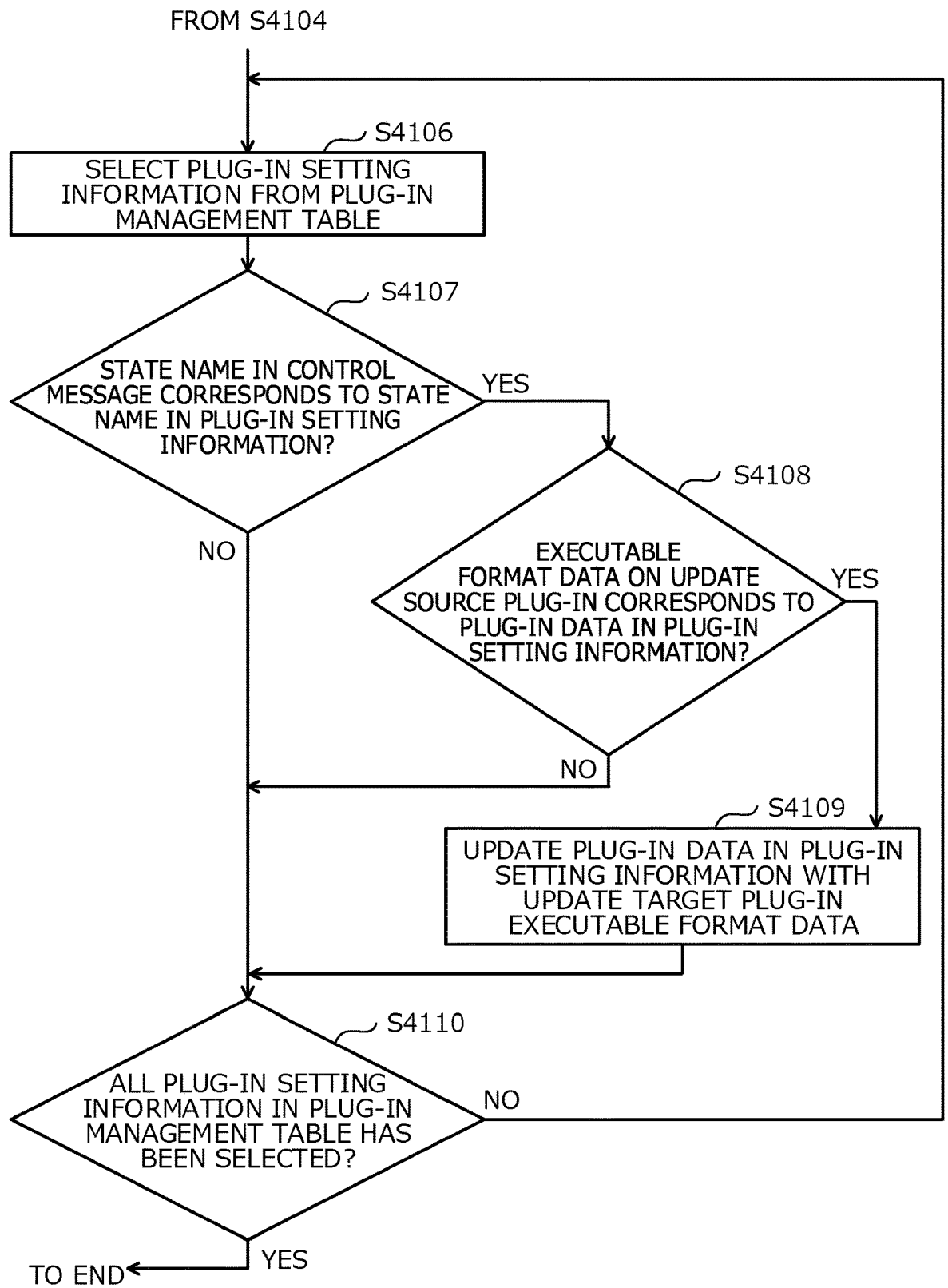

FIG. 41 (i.e. FIGS. 41A and 41B) is a flowchart illustrating an example of the plug-in update processing procedure in operation example 5. In FIG. 41, the distributed node 201 executes the decode processing described above with reference to FIG. 39 on a control message to acquire update source plug-in executable format data (Step S4101).

Next, the distributed node 201 executes the decode processing described above with reference to FIG. 39 on the control message to acquire update target plug-in executable format data (Step S4102). Then, the distributed node 201 moves to Step S4103.

In Step S4103, the distributed node 201 selects one plug-in management table 3711 from the list 3710 of plug-in management tables 3711 (Step S4103).

Next, the distributed node 201 determines whether or not the ID of the control message corresponds to the ID of the selected plug-in management table 3711 (Step S4104). When the both IDs do not correspond to each other (Step S4104: No), the distributed node 201 moves to Step S4105. On the other hand, when the both IDs correspond to each other (Step S4104: Yes), the distributed node 201 moves to Step S4106.

In Step S4105, the distributed node 201 determines whether or not all the plug-in management tables 3711 have been selected from the list 3710 of plug-in management tables 3711 (Step S4105). When there is any plug-in management table 3711 yet to be selected (Step S4105: No), the distributed node 201 returns to Step S4103. On the other hand, when all the plug-in management tables 3711 have been selected (Step S4105: Yes), the distributed node 201 terminates the plug-in update processing.

In Step S4106, the distributed node 201 selects plug-in setting information in the plug-in management table 3711 (Step S4106).

Next, the distributed node 201 determines whether or not the state name in the control message corresponds to the state name in the plug-in setting information (Step S4107). When the both state names do not correspond to each other (Step S4107: No), the distributed node 201 moves to Step S4110. On the other hand, when the both state names correspond to each other (Step S4107: Yes), the distributed node 201 moves to Step S4108.

In Step S4108, the distributed node 201 determines whether or not the update source plug-in executable format data corresponds to the plug-in data in the plug-in setting information (Step S4108). When the both data do not correspond to each other (Step S4108: No), the distributed node 201 moves to Step S4110. On the other hand, when the both data correspond to each other (Step S4108: Yes), the distributed node 201 moves to Step S4109.

In Step S4109, the distributed node 201 updates the plug-in data in the plug-in setting information with the update target plug-in executable format data (Step S4109). Then, the distributed node 201 moves to Step S4110.

In Step S4110, the distributed node 201 determines whether or not all the plug-in setting information in the plug-in management table 3711 has been selected (Step S4110). When there is any plug-in setting information yet to be selected (Step S4110: No), the distributed node 201 returns to Step S4106. On the other hand, when all the plug-in setting information has been selected (Step S4110: Yes), the distributed node 201 terminates the plug-in update processing.

The distributed node 201 may execute the above processing by changing the order of some of the steps. The distributed node 201 may also omit some of the steps.

Operation Example 6 of Parallel Distributed Processing System 200

Next, description is given of operation example 6 of the parallel distributed processing system 200. In operation example 5 described above, the distributed node 201 decodes a plug-in each time from information obtained by encoding the plug-in.

On the other hand, in operation example 6, the distributed node 201 makes a plug-in reusable by caching the plug-in when the plug-in is decoded. Accordingly, in operation example 6, an increase in throughput caused by decoding of the plug-in may be suppressed when information obtained by encoding the same plug-in is received multiple times.

Figure 42:
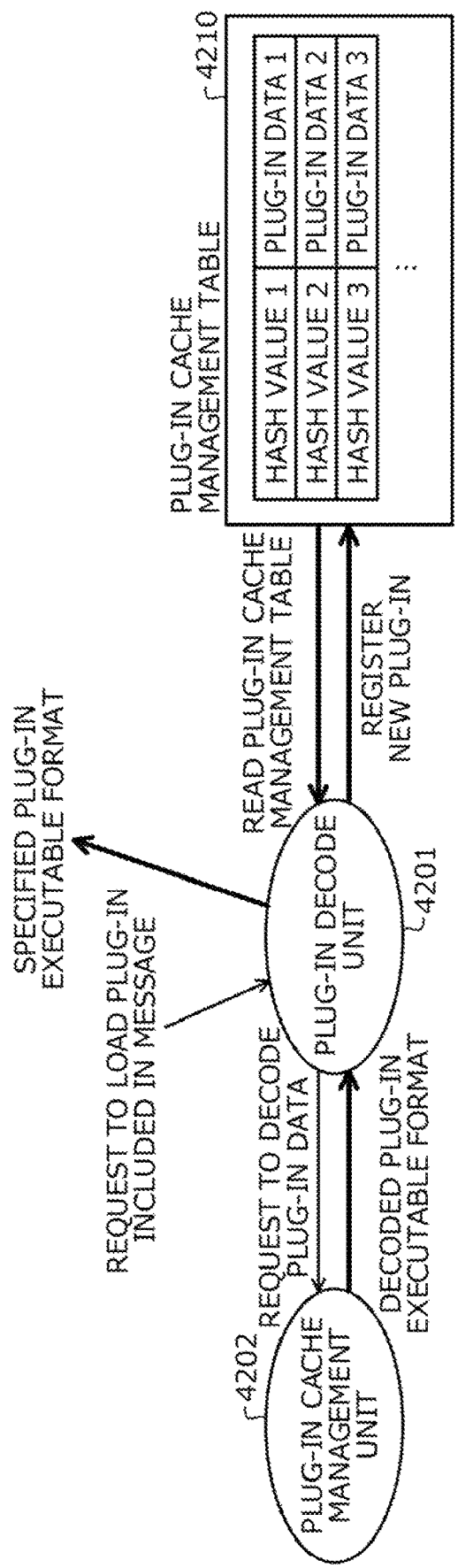
FIG. 42 is an explanatory diagram illustrating a flow of operations of a parallel distributed processing system 200 in operation example 6.

First, with reference to FIG. 42, description is given of a flow of operations of the parallel distributed processing system 200 in operation example 6.

FIG. 42 is an explanatory diagram illustrating the flow of operations of the parallel distributed processing system 200 in operation example 6. In operation example 6, the distributed node 201 includes a plug-in cache management unit 4201, a plug-in decode unit 4202, and a plug-in cache management table 4210. The plug-in decode unit 4202 executes requested decode processing.

The plug-in cache management unit 4201 stores plug-in data decoded by the plug-in decode unit 4202 upon request, in association with a hash value of data obtained by encoding the plug-in, in the plug-in cache management table 4210. Then, when plug-in data is stored in the plug-in cache management table 4210 in association with a hash value of data obtained by encoding a new plug-in to be decoded, the plug-in cache management unit 4201 acquires the plug-in data. Thus, the distributed node 201 may omit decoding and thus suppress an increase in throughput caused by decoding of the plug-in.

Figure 43:
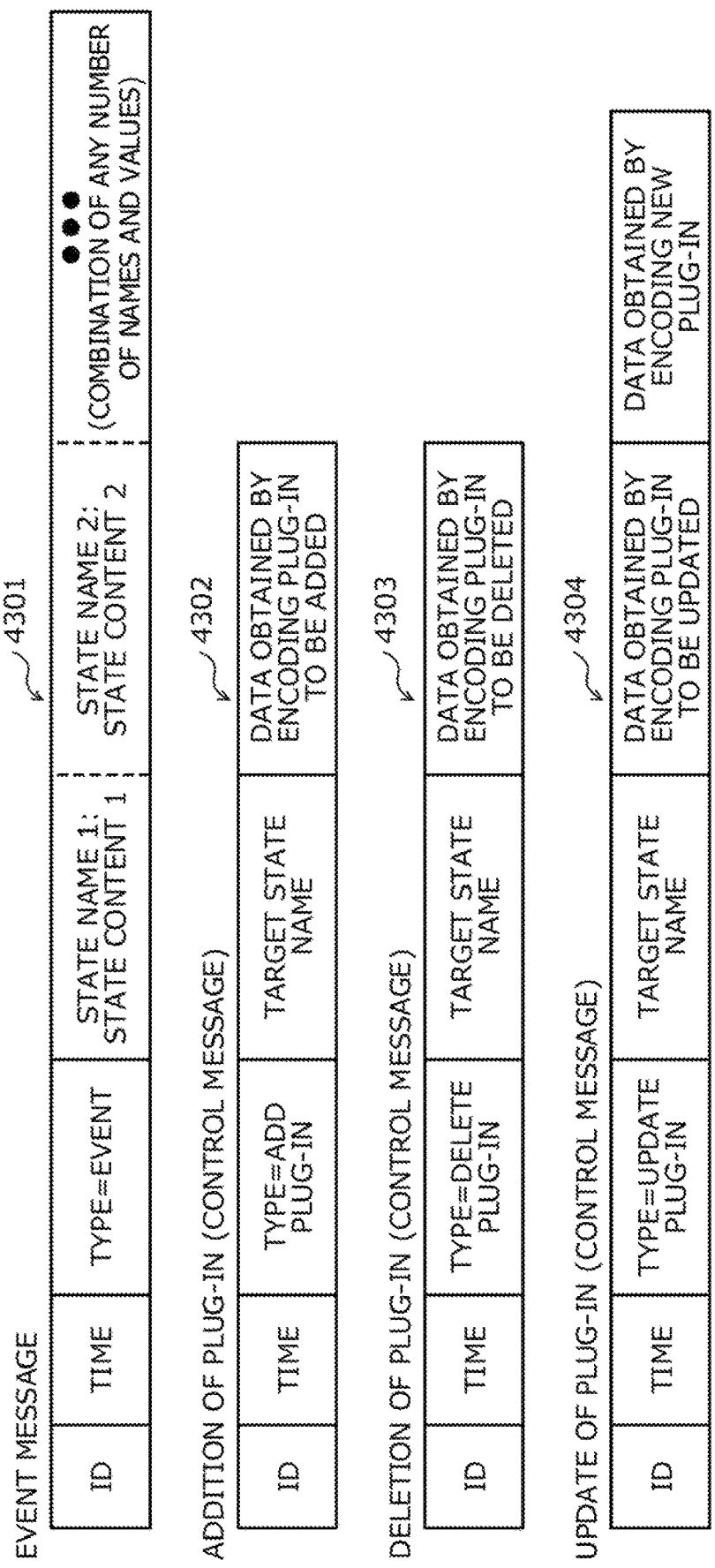
FIG. 43 is an explanatory diagram illustrating an example of various messages in operation example 6.
Figure 44:
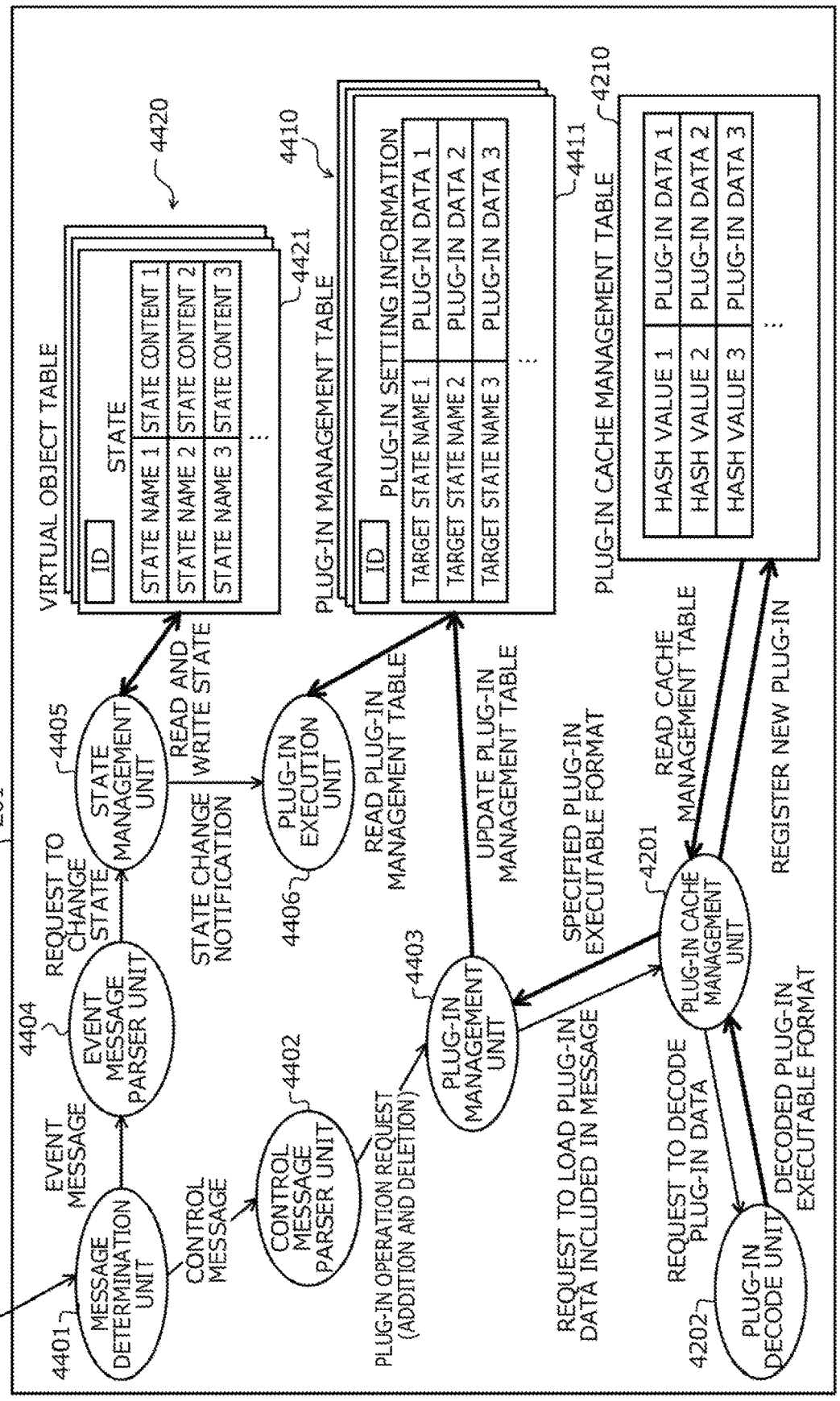
FIG. 44 is an explanatory diagram illustrating a specific functional configuration example of a distributed node 201 in operation example 6.

Next, description is given of an example of various messages in operation example 6 with reference to FIG. 43, followed by description of a specific functional configuration example of a distributed node 201 when receiving various messages in operation example 6 with reference to FIG. 44.

FIG. 43 is an explanatory diagram illustrating an example of various messages in operation example 6. In operation example 6, the parallel distributed processing system 200 uses, for example, an event message 4301, a control message 4302 to add a plug-in, a control message 4303 to change the expiration of the plug-in, and a control message 4304 to update the plug-in.

The event message 4301 is the same as the event message 3601 illustrated in FIG. 36, and thus description thereof is omitted. The control message 4302 to add a plug-in is the same as the control message 3602 to add a plug-in illustrated in FIG. 36, and thus description thereof is omitted.

The control message 4303 to delete the plug-in is the same as the control message 3603 to delete the plug-in illustrated in FIG. 36, and thus description thereof is omitted. The control message 4304 to update the plug-in is the same as the control message 3604 to update the plug-in illustrated in FIG. 36, and thus description thereof is omitted.

FIG. 44 is an explanatory diagram illustrating a specific functional configuration example of the distributed node 201 in operation example 6. As illustrated in FIG. 44, the distributed node 201 includes a list 4420 of virtual object tables 4421. The virtual object table 4421 is the same as the virtual object table 721 illustrated in FIG. 7, and thus description thereof is omitted.

As illustrated in FIG. 44, the distributed node 201 includes a list 4410 of plug-in management tables 4411. The plug-in management table 4411 is the same as the plug-in management table 711 illustrated in FIG. 7, and thus description thereof is omitted.

As illustrated in FIG. 44, the distributed node 201 includes a message determination unit 4401, a control message parser unit 4402, a plug-in management unit 4403, an event message parser unit 4404, a state management unit 4405, and a plug-in execution unit 4406. The distributed node 201 further includes the plug-in decode unit 4202 and the plug-in cache management unit 4201.

The message determination unit 4401 is the same as the message determination unit 701 illustrated in FIG. 7, and thus description thereof is omitted. The control message parser unit 4402 is the same as the control message parser unit 702 illustrated in FIG. 7, and thus description thereof is omitted.

The plug-in management unit 4403 is the same as the plug-in management unit 703 illustrated in FIG. 7. The plug-in management unit 4403 acquires plug-in data based on the data obtained by encoding the plug-in, through the plug-in decode unit 4202 and the plug-in cache management unit 4201, instead of acquiring the plug-in data based on the plug-in location.

The plug-in cache management unit 4201 stores plug-in data decoded by the plug-in decode unit 4202 upon request, in association with a hash value of data obtained by encoding the plug-in, in the plug-in cache management table 4210. Then, when plug-in data is stored in the plug-in cache management table 4210 in association with a hash value of data obtained by encoding a new plug-in to be decoded, the plug-in cache management unit 4201 acquires the plug-in data. When the plug-in cache management unit 4201 acquires the plug-in data, the plug-in decode unit 4202 omits decoding. The plug-in decode unit 4202 decodes the plug-in data from the data obtained by encoding the plug-in.

The event message parser unit 4404 is the same as the event message parser unit 704 illustrated in FIG. 7, and thus description thereof is omitted. The state management unit 4405 is the same as the state management unit 705 illustrated in FIG. 7, and thus description thereof is omitted. The plug-in execution unit 4406 is the same as the plug-in execution unit 706 illustrated in FIG. 7, and thus description thereof is omitted.

Thus, the distributed node 201 may update the processing program by adding, deleting, or updating the plug-in for the processing program. The distributed node 201 may also suppress an increase in throughput caused by decoding of the plug-in. For example, the distributed node 201 may suppress an increase in throughput caused by decoding of the plug-in when receiving, multiple times, information obtained by encoding the same plug-in, as in the case where different IDs are associated with the same plug-in.

(Overall Processing Procedure in Operation Example 6)

An overall processing procedure in operation example 6 is the same as the overall processing procedure in operation example 1 illustrated in FIG. 8, and thus description thereof is omitted.

(Event Message Processing Procedure in Operation Example 6)

An event message processing procedure in operation example 6 is the same as the event message processing procedure in operation example 1 illustrated in FIG. 9, and thus description thereof is omitted.

(Plug-in Processing Procedure in Operation Example 6)

A plug-in processing procedure in operation example 6 is the same as the plug-in processing procedure in operation example 1 illustrated in FIG. 10, and thus description thereof is omitted.

(Control System Event Processing Procedure in Operation Example 6)

A control system event processing procedure in operation example 6 is the same as the control system event processing procedure in operation example 1 illustrated in FIG. 11, and thus description thereof is omitted. In the control system event processing in operation example 6, plug-in addition processing in operation example 6 to be described later with reference to FIG. 45 is called up instead of the plug-in addition processing in operation example 1 Illustrated in FIG. 12.

In the control system event processing in operation example 6, plug-in deletion processing in operation example 6 to be described later with reference to FIG. 47 is called up instead of the plug-in deletion processing in operation example 1 Illustrated in FIG. 13. In the control system event processing in operation example 6, plug-in update processing in operation example 6 to be described later with reference to FIG. 48 is called up instead of the plug-in update processing in operation example 1 illustrated in FIG. 14.

(Plug-in Addition Processing Procedure in Operation Example 6)

Figure 45:
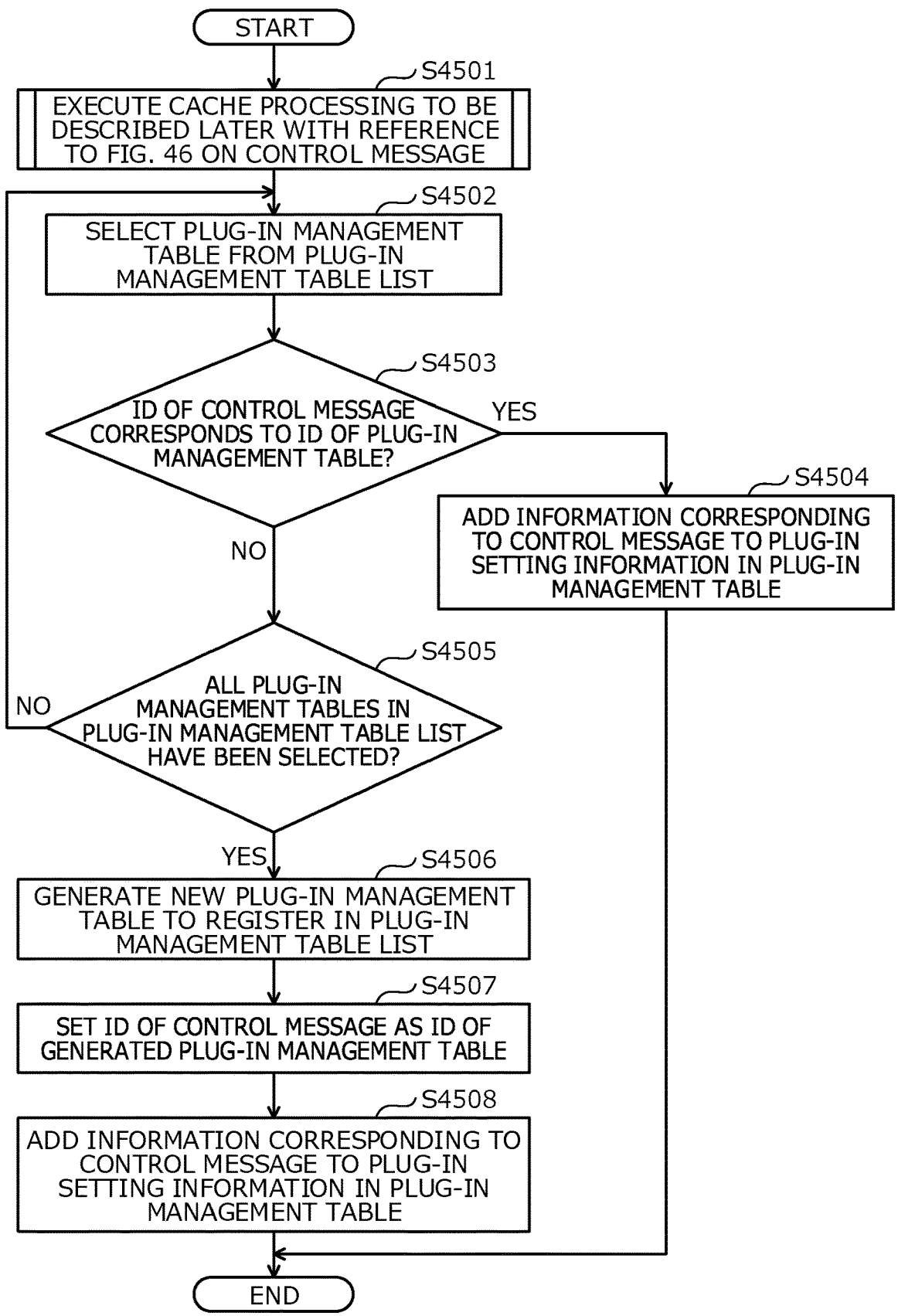
FIG. 45 is a flowchart illustrating an example of a plug-in addition processing procedure in operation example 6.

Next, with reference to FIG. 45, description is given of an example of the plug-in addition processing procedure in operation example 6, which is executed by the distributed node 201. The plug-in addition processing is realized, for example, by the CPU 301, the storage area such as the memory 302 and the recording medium 305, and the network I/F 303 illustrated in FIG. 3.

FIG. 45 is a flowchart illustrating an example of the plug-in addition processing procedure in operation example 6. In FIG. 45, the distributed node 201 executes cache processing to be described later with reference to FIG. 46 (Step S4501). Then, the distributed node 201 moves to Step S4502.

In Step S4502, the distributed node 201 selects one plug-in management table 4411 from the list 4410 of plug-in management tables 4411 (Step S4502).

Next, the distributed node 201 determines whether or not the ID of the control message corresponds to the ID of the selected plug-in management table 4411 (Step S4503). When the both IDs correspond to each other (Step S4503: Yes), the distributed node 201 moves to Step S4504. On the other hand, when the both IDs do not correspond to each other (Step S4503: No), the distributed node 201 moves to Step S4505.

In Step S4504, the distributed node 201 adds information corresponding to the control message to the plug-in setting information in the plug-in management table 4411 (Step S4504). Then, the distributed node 201 moves to Step S4508.

In Step S4505, the distributed node 201 determines whether or not all the plug-in management tables 4411 have been selected from the list 4410 of plug-in management tables 4411 (Step S4505). When there is any plug-in management table 4411 yet to be selected (Step S4505: No), the distributed node 201 returns to Step S4502. On the other hand, when all the plug-in management tables 4411 have been selected (Step S4505: Yes), the distributed node 201 moves to Step S4506.

In Step S4506, the distributed node 201 generates a new plug-in management table 4411 to register in the list 4410 of plug-in management tables 4411 (Step S4506). Then, the distributed node 201 sets the ID of the control message as the ID of the generated plug-in management table 4411 (Step S4507). Then, the distributed node 201 moves to Step S4508.

In Step S4508, the distributed node 201 adds information corresponding to the control message to the plug-in setting information in the plug-in management table 4411 (Step S4508). Thereafter, the distributed node 201 terminates the plug-in addition processing.

(Cache Processing Procedure in Operation Example 6)

Figure 46:
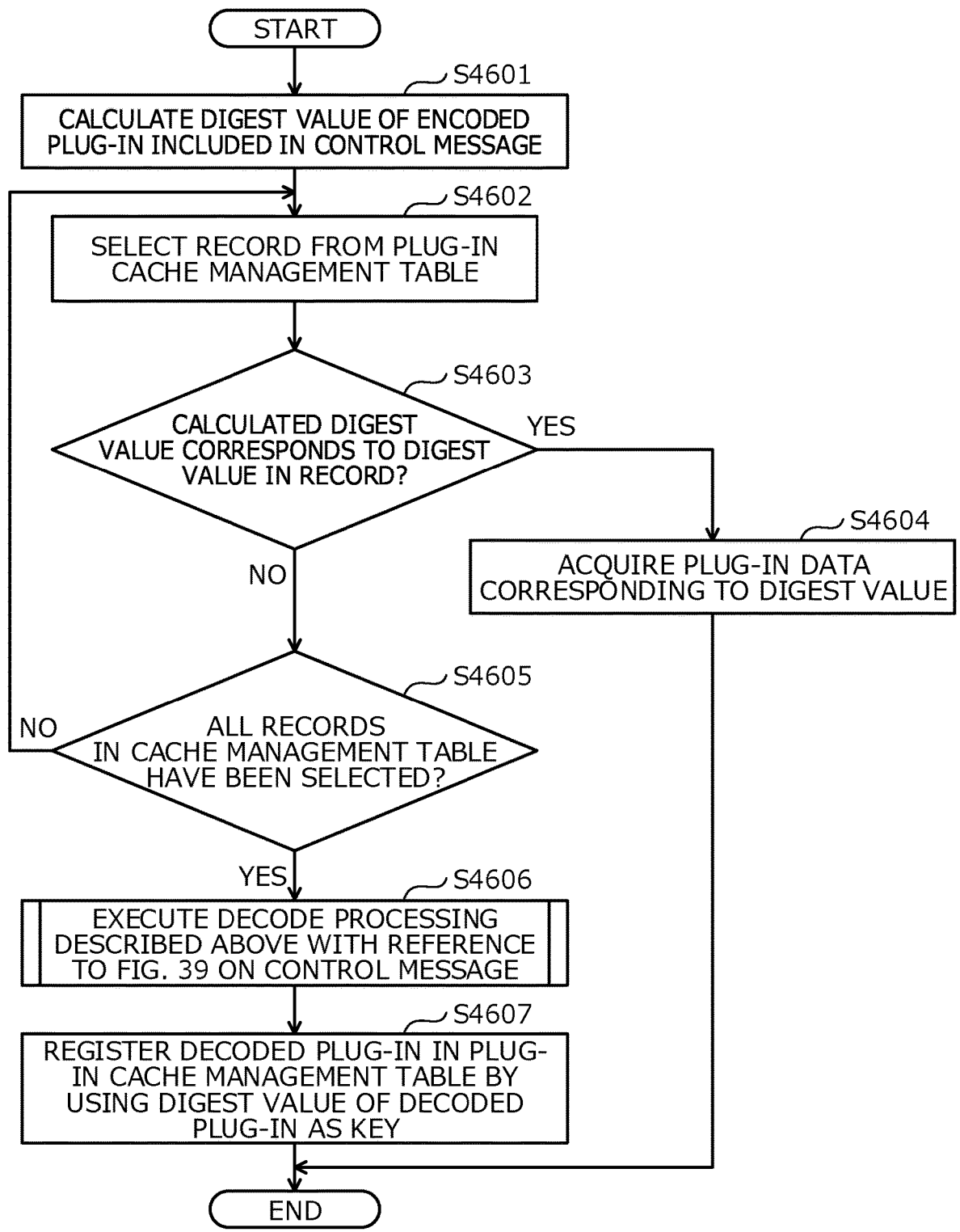
FIG. 46 is a flowchart illustrating an example of a cache processing procedure in operation example 6.

Next, with reference to FIG. 46, description is given of an example of a cache processing procedure in operation example 6, which is executed by the distributed node 201. The decode processing is realized, for example, by the CPU 301, the storage area such as the memory 302 and the recording medium 305, and the network I/F 303 illustrated in FIG. 3.

FIG. 46 is a flowchart illustrating an example of the cache processing procedure in operation example 6. In FIG. 46, the distributed node 201 calculates a digest value of an encoded plug-in included in a control message (Step S4601). Then, the distributed node 201 moves to Step S4602.

In Step S4602, the distributed node 201 selects one of the records in the plug-in cache management table 4210 (Step S4602).

Next, the distributed node 201 determines whether or not the calculated digest value corresponds to a digest value in the record (Step S4603). When the both digest values correspond to each other (Step S4603: Yes), the distributed node 201 moves to Step S4604. On the other hand, when the both digest values do not correspond to each other (Step S4603: No), the distributed node 201 moves to Step S4605.

In Step S4604, the distributed node 201 acquires plug-in data corresponding to the digest value (Step S4604). Then, the distributed node 201 terminates the cache processing.

In Step S4605, the distributed node 201 determines whether or not all the records in the plug-in cache management table 4210 have been selected (Step S4605). When there is any record yet to be selected (Step S4605: No), the distributed node 201 returns to Step S4602. On the other hand, when all the records have been selected (Step S4605: Yes), the distributed node 201 moves to Step S4606.

In Step S4606, the distributed node 201 executes the decode processing described above with reference to FIG. 39 on the control message (Step S4606).

Next, the distributed node 201 registers the decoded plug-in in the plug-in cache management table 4210 by using the digest value of the decoded plug-in as a key (Step S4607). Then, the distributed node 201 terminates the cache processing.

(Plug-in Deletion Processing Procedure in Operation Example 6)

Next, with reference to FIG. 47, description is given of an example of a plug-in deletion processing procedure in operation example 6, which is executed by the distributed node 201. The plug-in deletion processing is realized, for example, by the CPU 301, the storage area such as the memory 302 and the recording medium 305, and the network I/F 303 illustrated in FIG. 3.

Figure 47A:
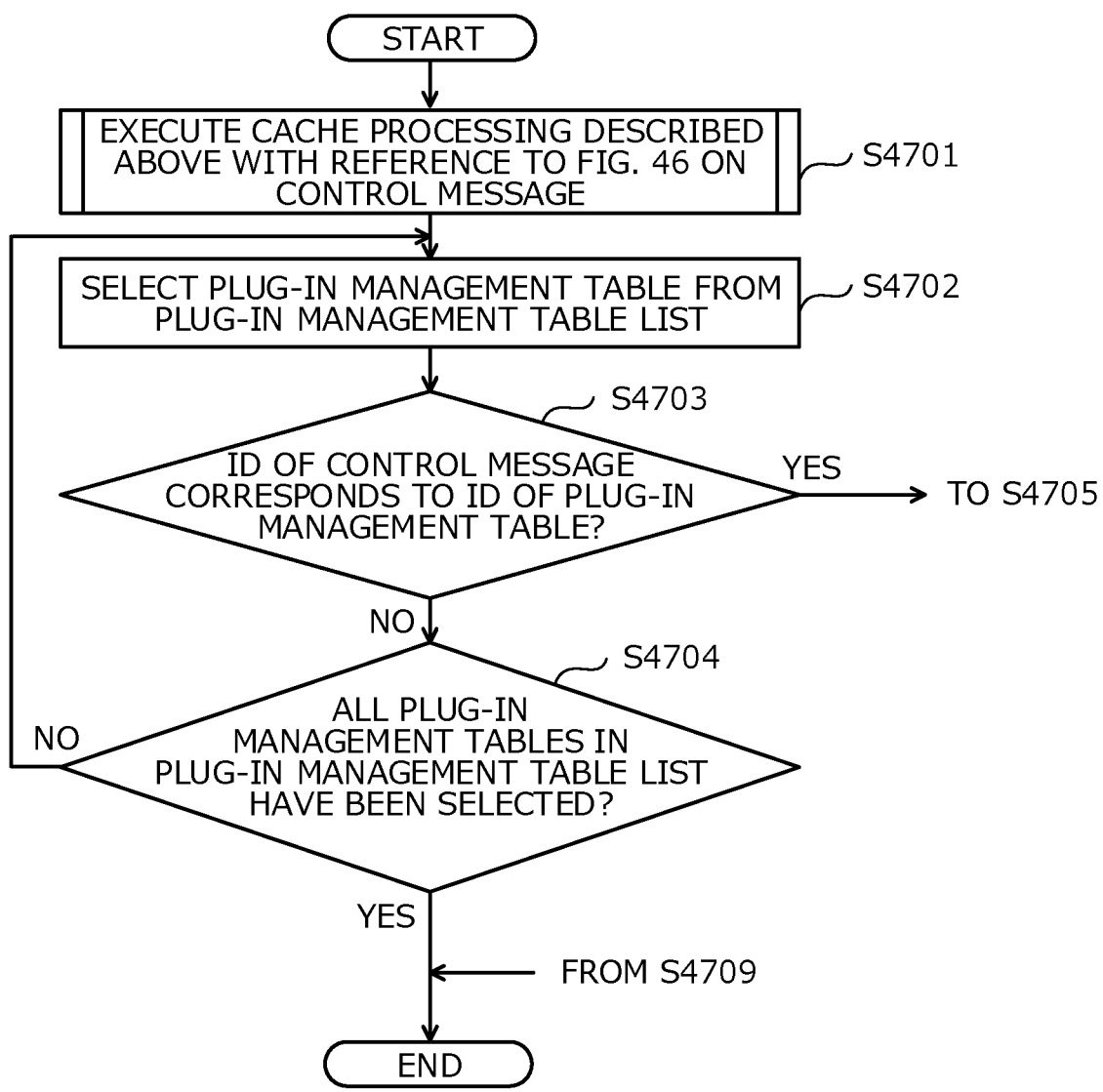
FIGS. 47A and 47B are a flowchart illustrating an example of a plug-in deletion processing procedure in operation example 6.
Figure 47B:
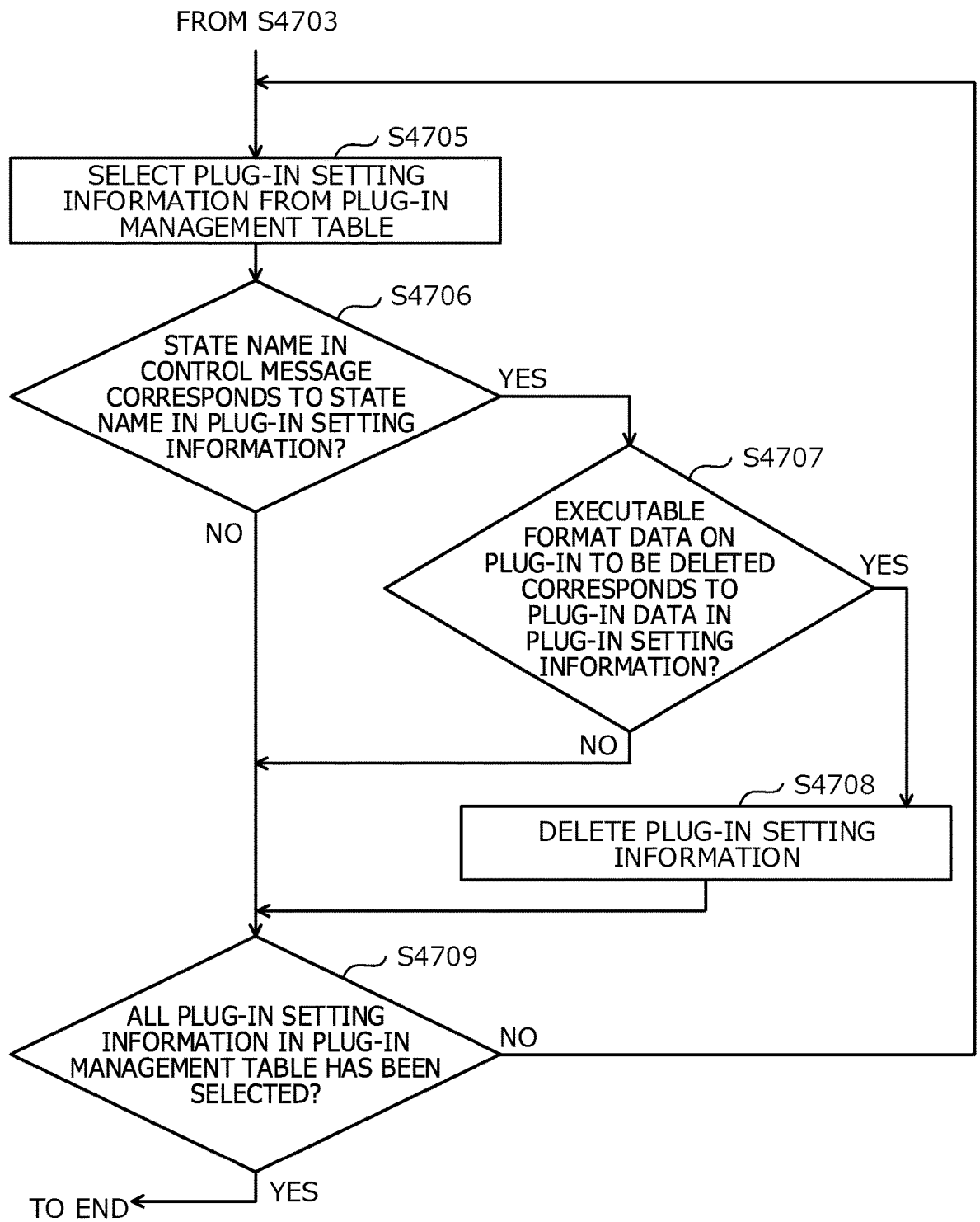

FIG. 47 (i.e. FIGS. 47A and 47B) is a flowchart illustrating an example of the plug-in deletion processing procedure in operation example 6. In FIG. 47, the distributed node 201 executes the cache processing described above with reference to FIG. 46 (Step S4701). Then, the distributed node 201 moves to Step S4702.

In Step S4702, the distributed node 201 selects one plug-in management table 4411 from the list 4410 of plug-in management tables 4411 (Step S4702).

Next, the distributed node 201 determines whether or not the ID of the control message corresponds to the ID of the selected plug-in management table 4411 (Step S4703). When the both IDs do not correspond to each other (Step S4703: No), the distributed node 201 moves to Step S4704. On the other hand, when the both IDs correspond to each other (Step S4703: Yes), the distributed node 201 moves to Step S4705.

In Step S4704, the distributed node 201 determines whether or not all the plug-in management tables 4411 have been selected from the list 4410 of plug-in management tables 4411 (Step S4704). When there is any plug-in management table 4411 yet to be selected (Step S4704: No), the distributed node 201 returns to Step S4702. On the other hand, when all the plug-in management tables 4411 have been selected (Step S4704: Yes), the distributed node 201 terminates the plug-in deletion processing.

In Step S4705, the distributed node 201 selects plug-in setting information in the plug-in management table 4411 (Step S4705).

Next, the distributed node 201 determines whether or not the state name in the control message corresponds to the state name in the plug-in setting information (Step S4706). When the both state names do not correspond to each other (Step S4706: No), the distributed node 201 moves to Step S4709. On the other hand, when the both state names correspond to each other (Step S4706: Yes), the distributed node 201 moves to Step S4707.

In Step S4707, the distributed node 201 determines whether or not the executable format data on the plug-in to be deleted corresponds to the plug-in data in the plug-in setting information (Step S4707). When the both data do not correspond to each other (Step S4707: No), the distributed node 201 moves to Step S4709. On the other hand, when the both data correspond to each other (Step S4707: Yes), the distributed node 201 moves to Step S4708.

In Step S4708, the distributed node 201 deletes the plug-in setting information (Step S4708). Then, the distributed node 201 moves to Step S4709.

In Step S4709, the distributed node 201 determines whether or not all the plug-in setting information in the plug-in management table 4411 has been selected (Step S4709). When there is any plug-in setting information yet to be selected (Step S4709: No), the distributed node 201 returns to Step S4705. On the other hand, when all the plug-in setting information has been selected (Step S4709: Yes), the distributed node 201 terminates the plug-in deletion processing.

(Plug-in Update Processing Procedure in Operation Example 6)

Next, with reference to FIG. 48, description is given of an example of the plug-in update processing procedure in operation example 6, which is executed by the distributed node 201. The plug-in update processing is realized, for example, by the CPU 301, the storage area such as the memory 302 and the recording medium 305, and the network I/F 303 illustrated in FIG. 3.

Figure 48A:
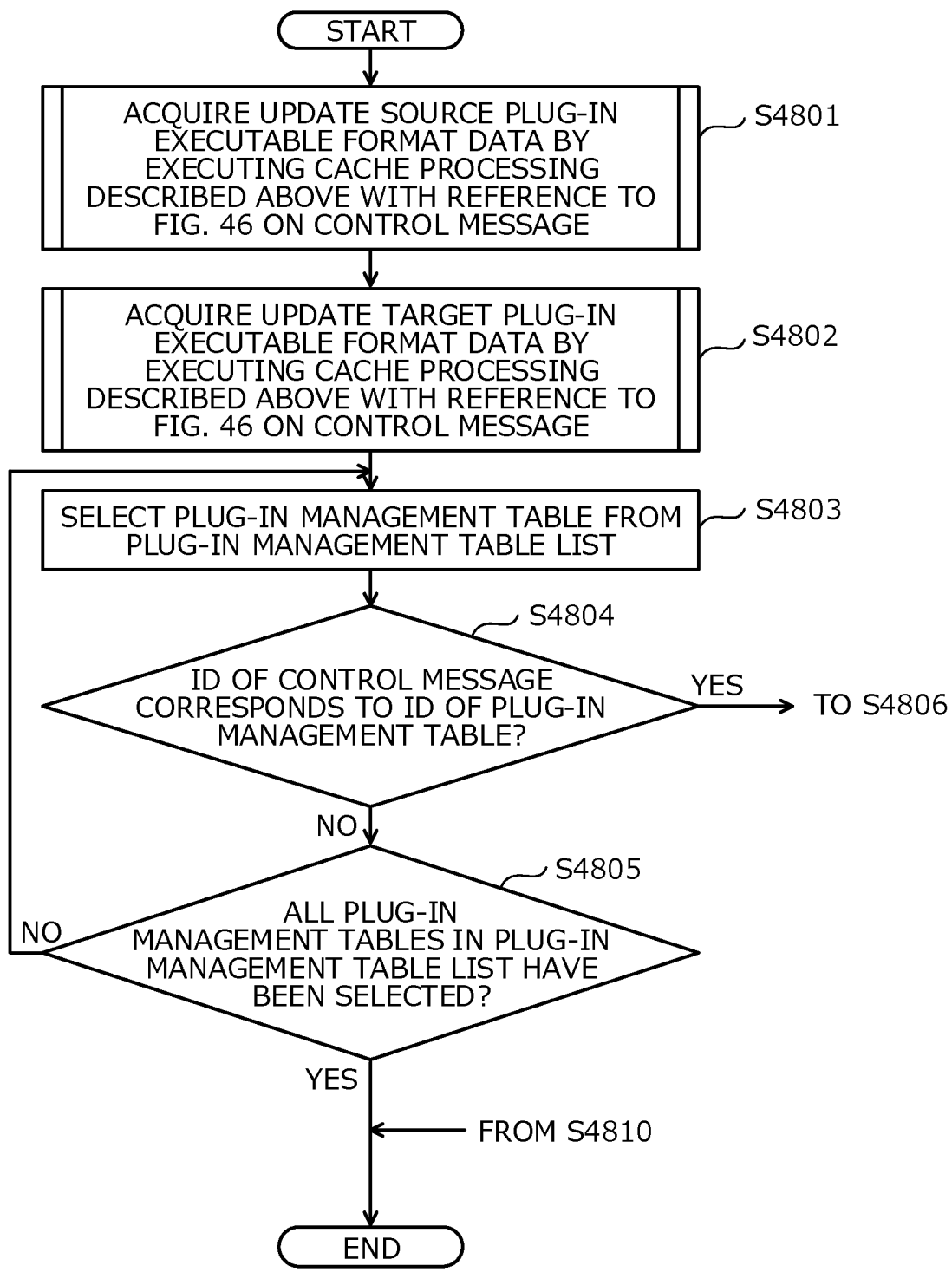
FIGS. 48A and 48B are a flowchart illustrating an example of a plug-in update processing procedure in operation example 6.
Figure 48B:
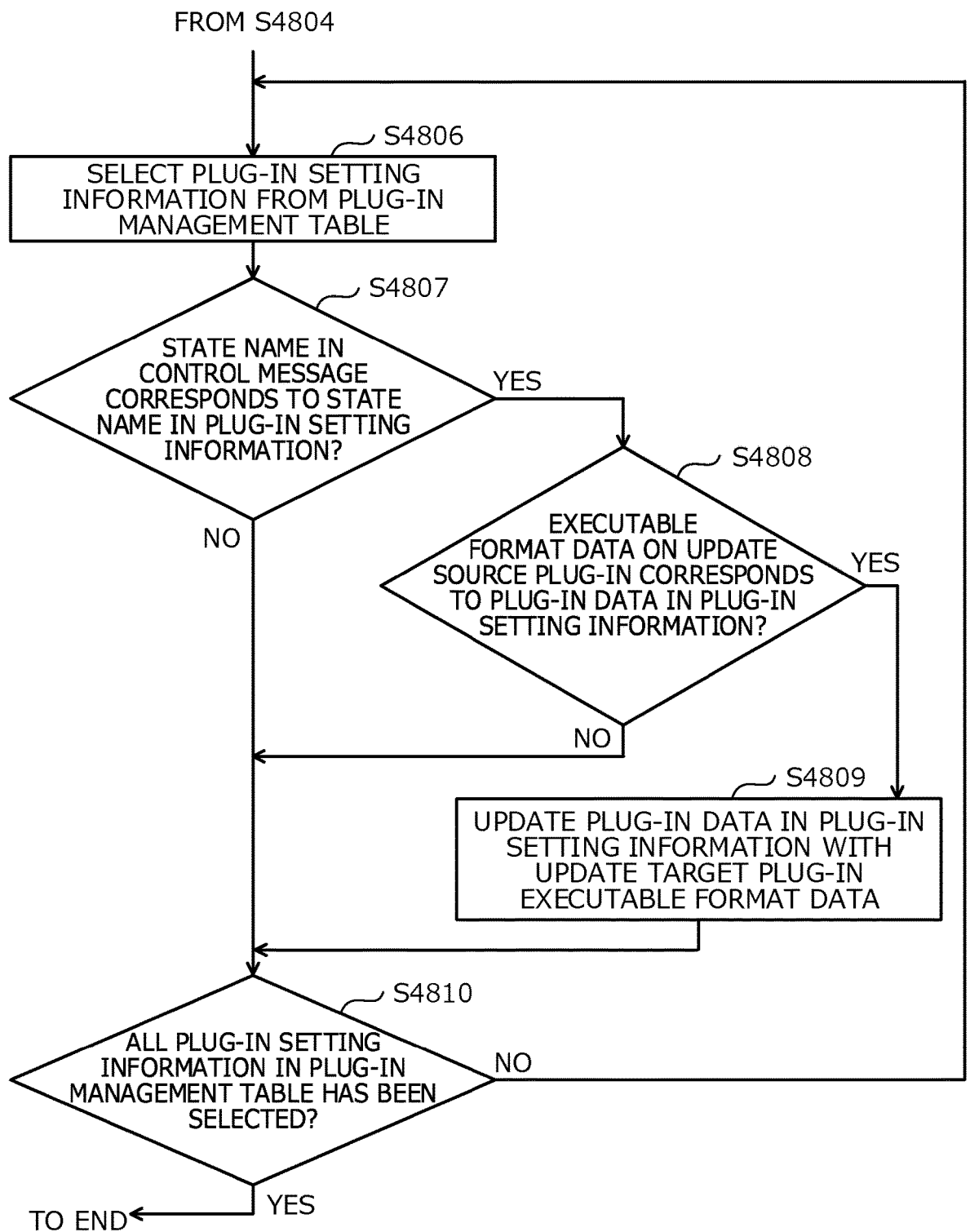

FIG. 48 (i.e. FIGS. 48A and 48B) is a flowchart illustrating an example of the plug-in update processing procedure in operation example 6. In FIG. 48, the distributed node 201 executes the cache processing described above with reference to FIG. 46 on a control message to acquire update source plug-in executable format data (Step S4801).

Next, the distributed node 201 executes the cache processing described above with reference to FIG. 46 on the control message to acquire update target plug-in executable format data (Step S4802). Then, the distributed node 201 moves to Step S4803.

In Step S4803, the distributed node 201 selects one plug-in management table 4411 from the list 4410 of plug-in management tables 4411 (Step S4803).

Next, the distributed node 201 determines whether or not the ID of the control message corresponds to the ID of the selected plug-in management table 4411 (Step S4804). When the both IDs do not correspond to each other (Step S4804: No), the distributed node 201 moves to Step S4805. On the other hand, when the both IDs correspond to each other (Step S4804: Yes), the distributed node 201 moves to Step S4806.

In Step S4805, the distributed node 201 determines whether or not all the plug-in management tables 4411 have been selected from the list 4410 of plug-in management tables 4411 (Step S4805). When there is any plug-in management table 4411 yet to be selected (Step S4805: No), the distributed node 201 returns to Step S4803. On the other hand, when all the plug-in management tables 4411 have been selected (Step S4805: Yes), the distributed node 201 terminates the plug-in update processing.

In Step S4806, the distributed node 201 selects plug-in setting information in the plug-in management table 4411 (Step S4806).

Next, the distributed node 201 determines whether or not the state name in the control message corresponds to the state name in the plug-in setting information (Step S4807). When the both state names do not correspond to each other (Step S4807: No), the distributed node 201 moves to Step S4810. On the other hand, when the both state names correspond to each other (Step S4807: Yes), the distributed node 201 moves to Step S4808.

In Step S4808, the distributed node 201 determines whether or not the update source plug-in executable format data corresponds to the plug-in data in the plug-in setting information (Step S4808). When the both data do not correspond to each other (Step S4808: No), the distributed node 201 moves to Step S4810. On the other hand, when the both data correspond to each other (Step S4808: Yes), the distributed node 201 moves to Step S4809.

In Step S4809, the distributed node 201 updates the plug-in data in the plug-in setting information with the update target plug-in executable format data (Step S4809). Then, the distributed node 201 moves to Step S4810.

In Step S4810, the distributed node 201 determines whether or not all the plug-in setting information in the plug-in management table 4411 has been selected (Step S4810). When there is any plug-in setting information yet to be selected (Step S4810: No), the distributed node 201 returns to Step S4806. On the other hand, when all the plug-in setting information has been selected (Step S4810: Yes), the distributed node 201 terminates the plug-in update processing.

The distributed node 201 may execute the above processing by changing the order of some of the steps. The distributed node 201 may also omit some of the steps.

(Application Example of Parallel Distributed Processing System 200)

Next, with reference to FIGS. 49 to 56, description is given of an application example of the parallel distributed processing system 200.

Figure 49:
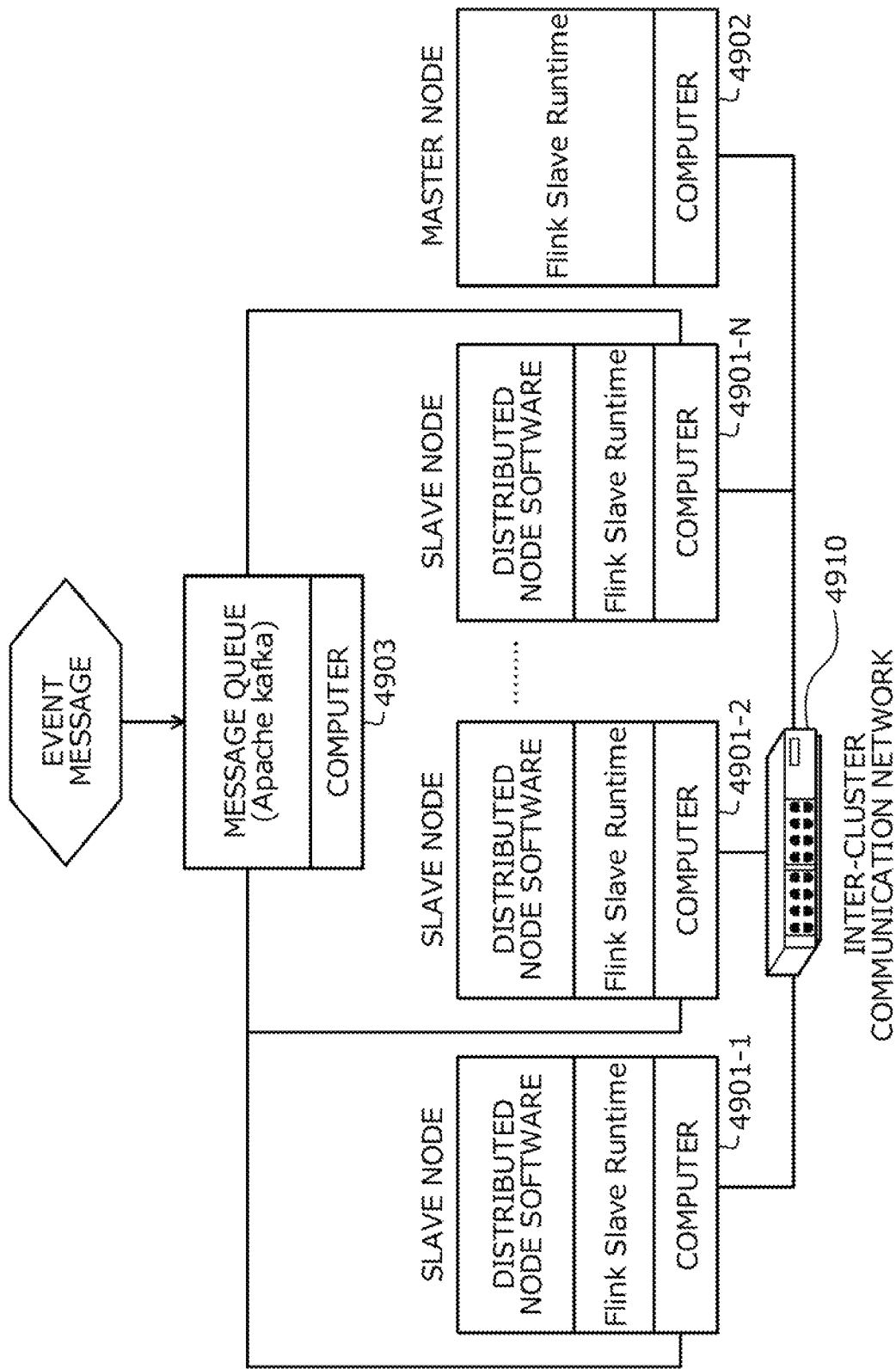
FIG. 49 is an explanatory diagram illustrating an application example of a parallel distributed processing system 200.

FIG. 49 is an explanatory diagram illustrating the application example of the parallel distributed processing system 200. As illustrated in FIG. 49, the parallel distributed processing system 200 uses, for example, Apache Flink as a framework. The parallel distributed processing system 200 includes computers 4901-1 to 4901-N corresponding to the distributed nodes 201 described above, a computer 4902 that is a master node, and a computer 4903 corresponding to the management node 202 described above. In the following description, the computers 4901-1 to 4901-N may be simply described as the "computers 4901" without being differentiated from each other.

The computer 4901 activates Flink Slave Runtime to run distributed node software. The computer 4901 realizes the operations in operation examples 1 to 6 described above as jobs in Apache Flink. The computer 4902 activates Flink Slave Runtime. The computer 4903 has a message queue and receives an event message to transmit to the computer 4901.

The computers 4902 are connected to each other through an inter-cluster communication network 4910, for example. The computers 4902 and the computer 4903 are connected to each other through the inter-cluster communication network 4910, for example. Next, description is given with reference to FIG. 50.

Figure 50:
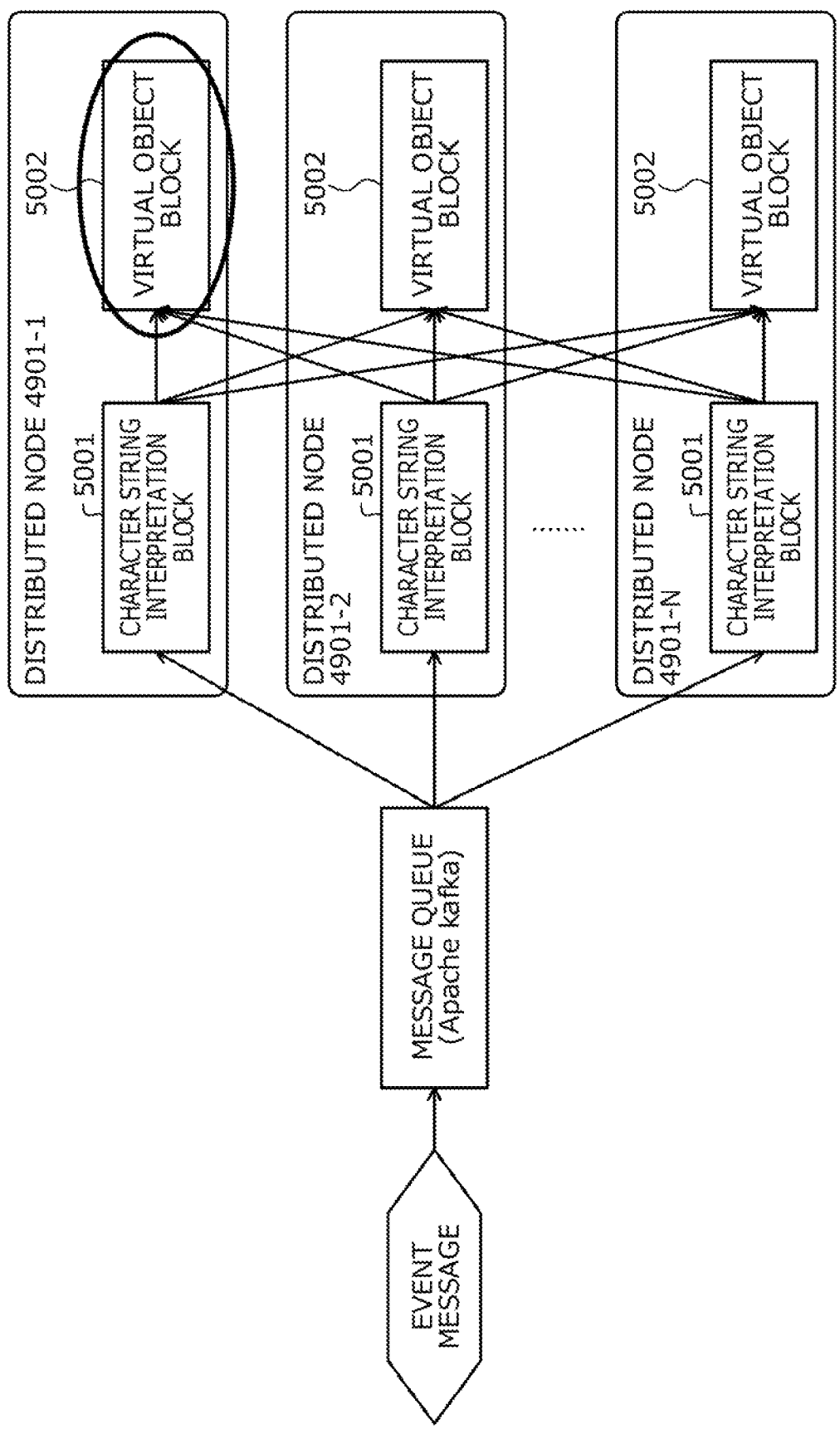
FIG. 50 is an explanatory diagram illustrating a message flow in the application example.

FIG. 50 is an explanatory diagram illustrating a message flow in the application example. As illustrated in FIG. 50, event messages and control messages are transmitted to the computers 4901 from the computer 4903. The computers 4901 each include a character string interpretation block 5001 and a virtual object block 5002.

The character string interpretation block 5001 interprets a character string in the received event message or control message to determine the destination of the received event message or control message. Then, the character string interpretation block 5001 transmits the received event message or control message to the virtual object block 5002 of its own or the virtual object block 5002 of the other computer.

The virtual object block 5002 processes the event message and the control message. For example, the virtual object block 5002 processes the event message and the control message so as to realize any of the operations in operation examples 1 to 6 described above or operations combining two or more of operation examples 1 to 6 described above. Next, with reference to FIGS. 51 and 52, description is given of a functional configuration example of realizing operations combining operation examples 3 and 6.

Figure 51:
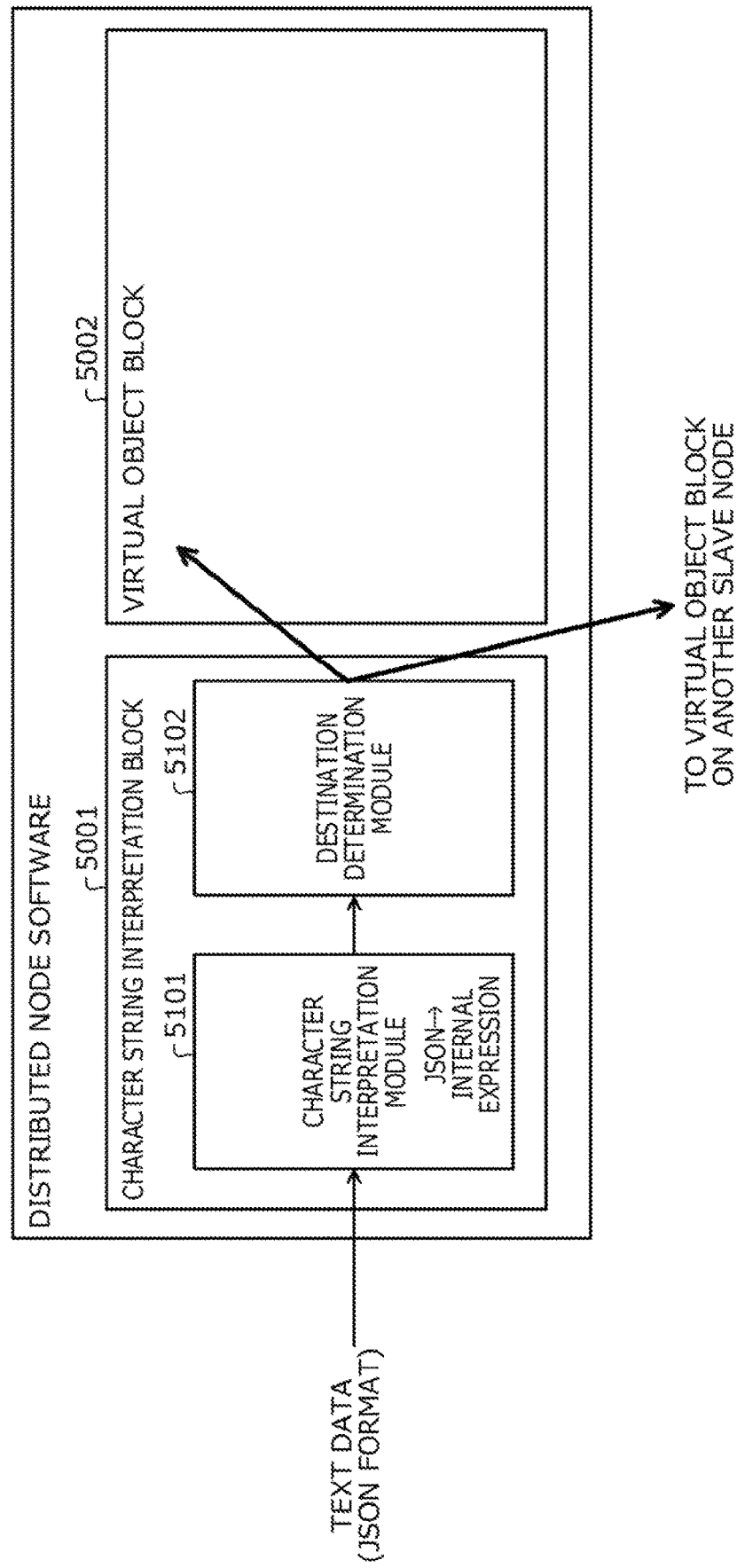
FIG. 51 is an explanatory diagram (Part 1) illustrating a specific functional configuration example of a computer 4901 in the application example.
Figure 52:
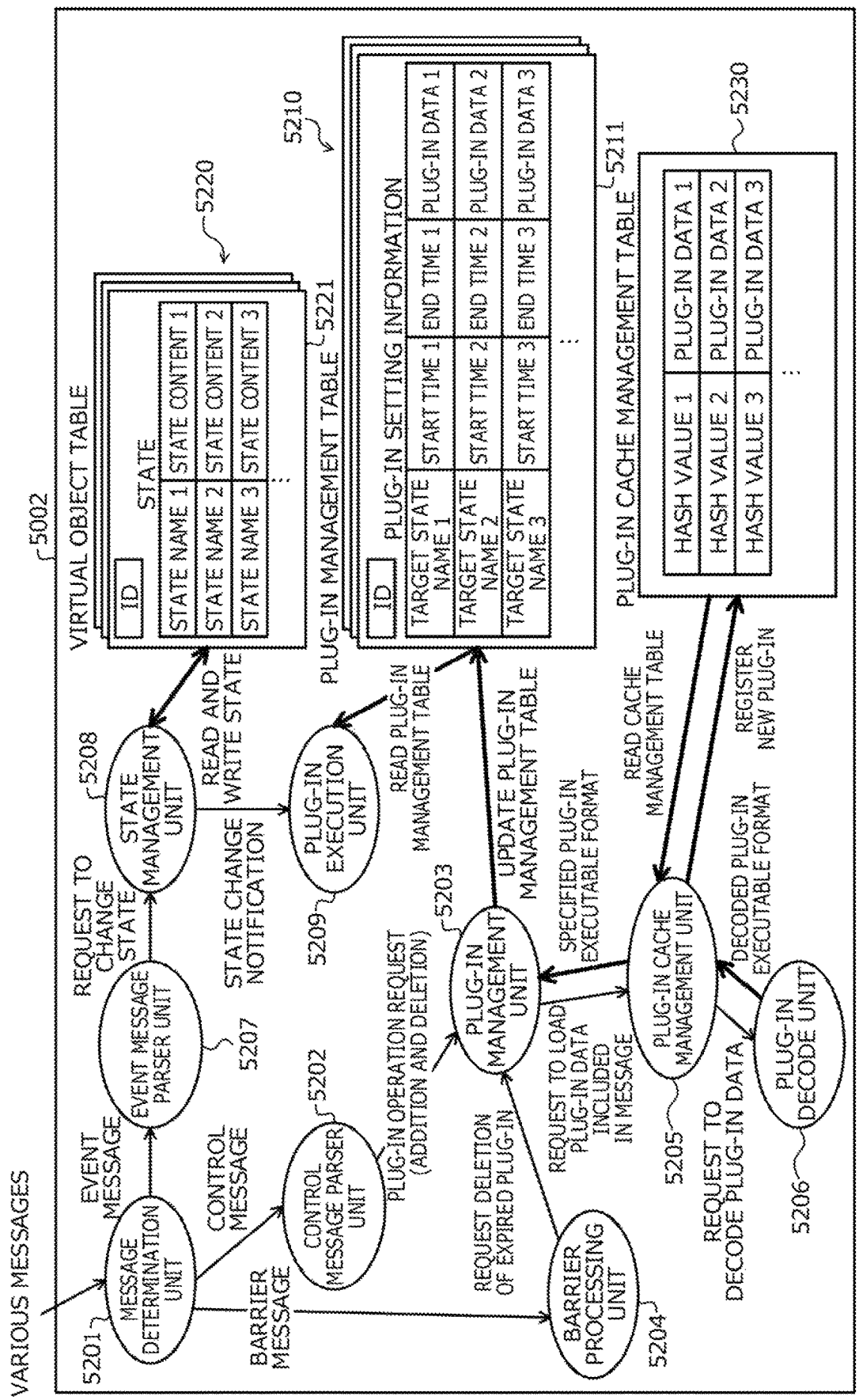
FIG. 52 is an explanatory diagram (Part 2) illustrating a specific functional configuration example of the computer 4901 in the application example.

FIGS. 51 and 52 are explanatory diagrams illustrating a specific functional configuration example of the computer 4901 in the application example. As illustrated in FIG. 51, the character string interpretation block 5001 includes a character string interpretation module 5101 and a destination determination module 5102.

The character string interpretation block 5001 converts a JSON-format character string in the received event message or control message into an internal expression to output to the destination determination module 5102. The destination determination module 5102 determines the destination of the received event message or control message based on the internal expression, and transmits the destination to the virtual object block 5002 of its own or the virtual object block 5002 of the other computer. Next, description is given with reference to FIG. 52.

As illustrated in FIG. 52, the virtual object block 5002 includes a list 5220 of virtual object tables 5221, a list 5210 of plug-in management tables 5211, and a plug-in cache management table 5230.

The virtual object table 5221 is the same as the virtual object table 2221 illustrated in FIG. 22 and the virtual object table 4421 illustrated in FIG. 44. The plug-in management table 5211 is the same as the plug-in management table 2211 illustrated in FIG. 22 and the plug-in management table 4411 illustrated in FIG. 44. The plug-in cache management table 5230 is the same as the plug-in cache management table 4210 illustrated in FIG. 42.

The virtual object block 5002 includes a message determination unit 5201, a control message parser unit 5202, a plug-in management unit 5203, and a barrier processing unit 5204. The virtual object block 5002 also includes a plug-in cache management unit 5205 and a plug-in decode unit

5206. The virtual object block 5002 further includes an event message parser unit 5207, a state management unit 5208, and a plug-in execution unit 5209.

The message determination unit 5201 operates in the same manner as the message determination unit 2201 illustrated in FIG. 22 and the message determination unit 4401 illustrated in FIG. 44. The control message parser unit 5202 operates in the same manner as the control message parser unit 2202 illustrated in FIG. 22 and the control message parser unit 4402 illustrated in FIG. 44. The plug-in management unit 5203 operates in the same manner as the plug-in management unit 2203 illustrated in FIG. 22 and the plug-in management unit 4403 illustrated in FIG. 44.

The barrier processing unit 5204 operates in the same manner as the barrier processing unit 2204 illustrated in FIG. 22. The plug-in cache management unit 5205 operates in the same manner as the plug-in cache management unit 4201 illustrated in FIG. 42. The plug-in decode unit 5206 operates in the same manner as the plug-in decode unit 4202 illustrated in FIG. 42.

The event message parser unit 5207 operates in the same manner as the event message parser unit 2205 illustrated in FIG. 22 and the event message parser unit 4404 illustrated in FIG. 44. The state management unit 5208 operates in the same manner as the state management unit 2206 illustrated in FIG. 22 and the state management unit 4405 illustrated in FIG. 44. The plug-in execution unit 5209 operates in the same manner as the plug-in execution unit 2207 illustrated in FIG. 22 and the plug-in execution unit 4406 illustrated in FIG. 44. Next, description is given of a specific example of various messages with reference to FIGS. 53 to 56.

FIG. 53 is an explanatory diagram illustrating a specific example of an event message 5300 in the application example. The event message 5300 includes fields of ID, time, type, and one or more states, as in the case of the event message 601.

"id" in FIG. 53 corresponds to the ID field. "lat", "lon", "speed" in FIG. 53 correspond to the state fields, representing state names. "time" in FIG. 53 corresponds to the time field. "type" in FIG. 53 corresponds to the type field. Next, description is given with reference to FIG. 54.

FIG. 54 is an explanatory diagram illustrating a specific example of a control message 5400 to add a plug-in in the application example. The control message 5400 corresponds to a message obtained by combining the control messages 2102 and 4302. The control message 5400 includes fields of ID, time, type, target state name, data obtained by encoding a plug-in to be added, start time, and end time.

"end" in FIG. 54 corresponds to the end time field. "−1" represents undetermined end time. "id" in FIG. 54 corresponds to the ID field. "plugin_data" in FIG. 54 corresponds to the field of the data obtained by encoding the plug-in to be added. "start" in FIG. 54 corresponds to the start time field. "target_state_name" in FIG. 54 corresponds to the target state name field. "time" in FIG. 54 corresponds to the time field. "type" in FIG. 54 corresponds to the type field. Next, description is given with reference to FIG. 55.

FIG. 55 is an explanatory diagram illustrating a specific example of a control message 5500 to change the expiration of a plug-in in the application example. The control message 5500 corresponds to a message obtained by combining the control messages 2103 and 4303. The control message 5500 includes fields of ID, time, type, target state name, data obtained by encoding a plug-in whose expiration is to be changed, and end time.

"end" in FIG. 55 corresponds to the end time field. "id" in FIG. 55 corresponds to the ID field. "plugin_data" in FIG. 55 corresponds to the field of the data obtained by encoding the plug-in whose expiration is to be changed. "target_state_name" in FIG. 55 corresponds to the target state name field. "time" in FIG. 55 corresponds to the time field. "type" in FIG. 55 corresponds to the type field. Next, description is given with reference to FIG. 56.

FIG. 56 is an explanatory diagram illustrating a specific example of a control message 5600 to update the plug-in in the application example. The control message 5600 corresponds to a message obtained by combining the control messages 2104 and 4304. The control message 5600 includes fields of ID, time, type, target state name, data obtained by encoding the plug-in to be updated, data obtained by encoding a new plug-in, start time, and end time.

"type" in FIG. 56 corresponds to the type field. "id" in FIG. 56 corresponds to the ID field. "time" In FIG. 56 corresponds to the time field. "start" in FIG. 56 corresponds to the start time field. "end" in FIG. 56 corresponds to the end time field. "target_state_name" in FIG. 56 corresponds to the target state name field. "old_plugin_data" in FIG. 56 corresponds to the field of the data obtained by encoding the plug-in to be updated. "new_plugin_data" in FIG. 56 corresponds to the field of the data obtained by encoding the new plug-in.

Figure 57:
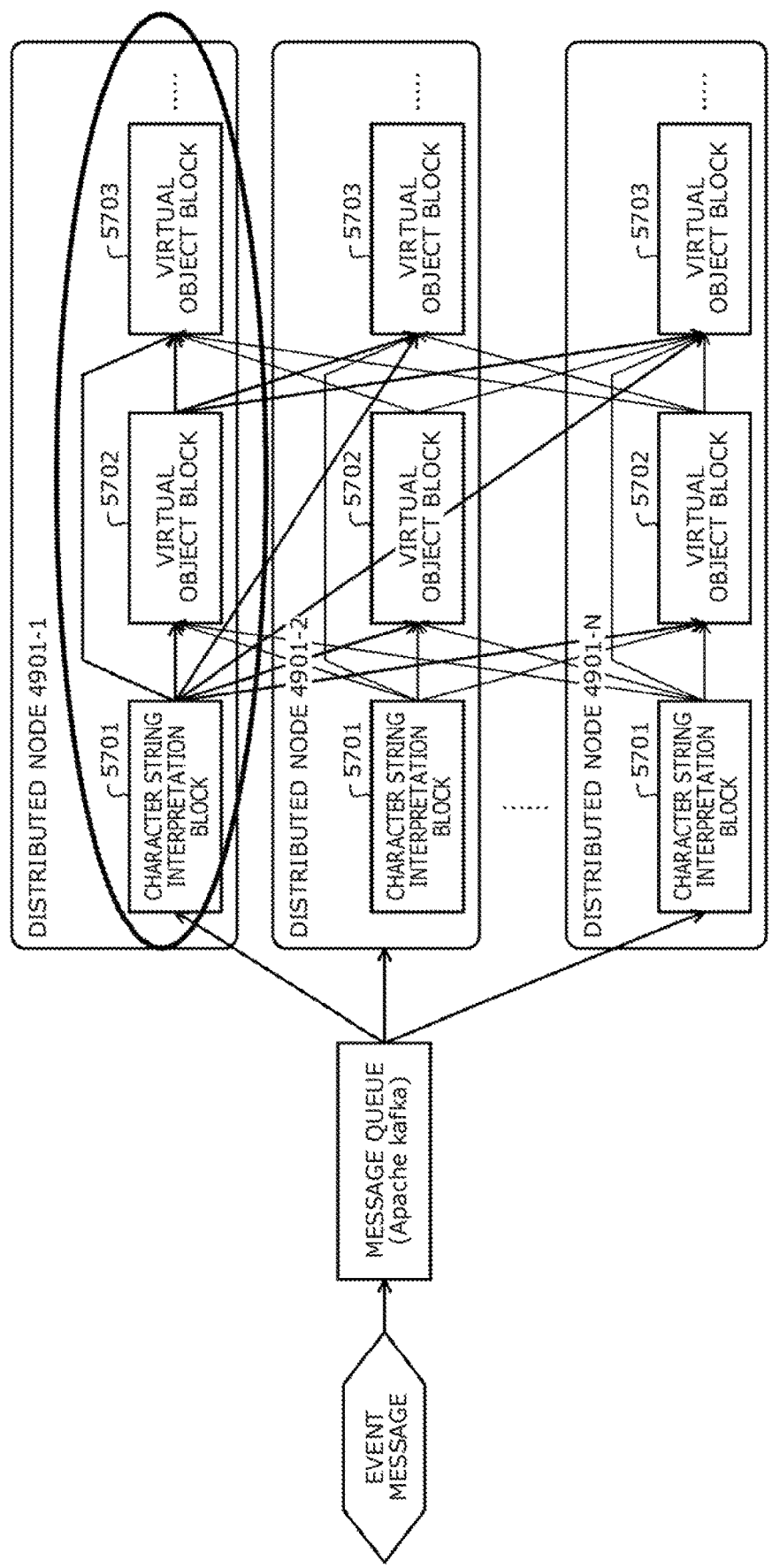
FIG. 57 is an explanatory diagram illustrating a practical application example of a parallel distributed processing system 200.

FIG. 57 is an explanatory diagram illustrating a practical application example of the parallel distributed processing system 200. As illustrated in FIG. 57, the computer 4901 may include more than one virtual object block. In the example of FIG. 57, the computer 4901 includes a character string interpretation block 5701 and virtual object blocks 5702 and 5703. The character string interpretation block 5701 is the same as the character string interpretation block 5001 illustrated in FIG. 50, except for being able to input various messages directly to the virtual object block 5703. The virtual object block 5702 may generate an event message to input to the virtual object block 5703.

It is conceivable, for example, that the parallel distributed processing system 200 realizes an IoT system that monitors a car. In this case, each preceding virtual object block 5702 processes event data generated by a terminal device in each car. The virtual object block 5702 in the front stage stores, for example, information such as the current position and speed of each car and a history of its positions and speeds.

The subsequent virtual object block 5703 supports a service to count cars that meet a specific condition, and processes event data generated in the preceding virtual object block 5702. For example, the subsequent virtual object block 5703 receives event data indicating a continuous drive time from the preceding virtual object block 5702 to detect a car whose continuous drive time exceeds four hours, and sends a warning to a driver.

As described above, the information processor 100 may receive the control message 120. Upon receipt of the control message 120, the information processor 100 may store the plug-in 130 and information indicating the type of an event specified from the received control message 120, in association with each other, in the storage unit 110. The information processor 100 may receive the event message 140. Upon receipt of the event message 140, the information processor 100 may execute the plug-in 130 stored in the storage unit 110 in association with the information indicating the type of the event specified from the received event message 140. Thus, the information processor 100 may update the processing program by adding a new plug-in 130 to the processing program upon receipt of the control message 120.

The information processor 100 may store information identifying the source of an event specified from the received control message 120, the information indicating the type of the event, and the plug-in 130, in association with each other, in the storage unit 110. The information processor 100 may execute the plug-in 130 stored in the storage unit 110 in association with the information identifying the source of the event specified from the received event message 140 and the information indicating the type of the event. Thus, the information processor 100 may execute different plug-ins fort eh same type of event for each source of the event.

The information processor 100 may receive a second control message for a plug-in 130 to be deleted. The information processor 100 may delete the plug-in 130 specified from the second control message. Thus, the information processor 100 may update the processing program by deleting the plug-in 130 from the processing program upon receipt of the control message 120.

The information processor 100 may store, in the storage unit 110, a valid period of the plug-in 130 specified from the received control message 120. When the point of occurrence of the event specified from the event message 140 is within the valid period of the plug-in 130 stored in the storage unit 110, the information processor 100 may execute the plug-in 130. Thus, the information processor 100 may reduce inconsistency in processing even when there is a change in the order of arrival of event messages and control messages due to a network delay or the like.

When the point of occurrence of the event specified from the event message 140 is after the valid period of the plug-in 130 stored in the storage unit 110, the information processor 100 may delete the plug-in 130. Thus, the information processor 100 may update the processing program by deleting the plug-in 130 from the processing program.

Upon receipt of a regularly issued synchronization message, the information processor 100 may back up the storage content in the storage unit 110. When the point of occurrence of the event specified from the last received event message 140 is after the valid period of the plug-in 130 stored in the storage unit 110 after the backup, the information processor 100 may delete the plug-in 130. Thus, the information processor 100 may return its state by normally executing the backup.

After the backup, the information processor 100 may store the information identifying the source of the event specified from the received control message 120, the information indicating the type of the event, and the plug-in 130, in association with each other, in the storage unit 110. Thus, the information processor 100 may reduce inconsistency in processing even when there is a change in the order of arrival of event messages and control messages due to a network delay or the like.

The information processor 100 may receive a second control message for a plug-in 130 to be deleted. Upon receipt of the second control message, the information processor 100 may delete the plug-in 130 after receiving a synchronization message and backing up the storage content in the storage unit 110. Thus, the information processor 100 may update the processing program by deleting the plug-in 130 from the processing program.

The information processor 100 may use an address of a storage area where the plug-in 130 is stored, as information regarding the plug-in 130. Thus, the information processor 100 may acquire the plug-in 130 and thus suppress an increase in data amount of the control message 120.

The information processor 100 may use information obtained by encoding the plug-in 130, as information regarding the plug-in 130. Thus, the information processor 100 may avoid access concentration upon acquisition of the plug-in 130.

The information processor 100 may cache the decoded plug-in 130 in association with a digest value. Thus, the information processor 100 may make the plug-in 130 reusable to reduce the throughput of decoding.

The information processor 100 may operate as a computer in any of the nodes included in a parallel distributed processing system. The information processor 100 may receive control messages 120 collectively transmitted to the nodes from a computer that collects event messages 140 to transmit to any of the nodes. Thus, the information processor 100 may suppress the occurrence of inconsistency in processing.

Note that the event processing method described in this embodiment may be realized by executing a prepared program with a computer such as a personal computer and a workstation. The processing program described in this embodiment is recorded on a computer-readable recording medium such as a CD-ROM, an MO, and a DVD, and is read from the recording medium to be executed by the computer. The processing program described in this embodiment may be distributed through a network such as the Internet.

All examples and conditional language recited herein of the RFID tag and the high frequency circuit are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An event processing method implemented by a computer, the computer being configured to operate as any one of a plurality of nodes included in a parallel distributed processing system, the event processing method comprising:

in response to receiving of a message from a management node of the parallel distributed processing system, storing the received message into a queue buffer in a first-in-first-out (FIFO) manner, the queue buffer being configured to store a plurality of messages, each message being a control message or an event message;

obtaining, in the FIFO manner, the message from among the plurality of messages stored in the queue buffer;

in response that the message obtained from the queue buffer is the control message broadcasted from the management node to the plurality of nodes in the parallel distributed processing system, updating a relationship between a plug-in and a type of an event to process subsequent messages in the queue buffer by using the updated relationship, the control message including first information indicating a type of an event to be used as an execution condition for a corresponding plug-in from among a plurality of plug-ins and second information indicating the corresponding plug-in, the updated relationship associating the type of the event indicated by the first information with the corresponding plug-in indicated by the second information included in the received control message; and in response that the message obtained from the queue buffer is the event message including third information indicating a type of an event and fourth information indicating data to be processed, selecting a plug-in from among the plurality of plug-ins by comparing the type of the event indicated by the third information of the event message with the type of the event indicated by the relationship to cause the selected plug-in to process the data indicated by the fourth information of the event message, the selected plug-in being one of the plurality of plug-in which has been associated with the first information having a content consistent with the third information.

2. The event processing method according to claim 1, wherein
the control message further includes fifth information identifying the source of an event,
the event message further includes sixth information identifying the source of an event,
the updating of the relationship is configured to associate a pair of the type of the event indicated by the first information and the source of the event identified by the fifth information of the control message with the corresponding plug-in indicated by the second information, and
the selecting of the plug-in is configured to select one of the plurality of plug-ins by using the third information and the sixth information of the event message, the selected plug-in being a plug-in which has been associated with the pair of the first information having a content consistent with the third information and the fifth information having a content consistent with the sixth information.

3. The event processing method according to claim 2, wherein
the queue buffer is further configured to store the plurality of messages including a second control message broadcasted from the management node, the second control message including the first information, the second information, and the fifth information identifying the source of an event,
the event processing method further comprises:
in response that the message obtained from the queue buffer is the second control message, determining whether there is a relationship associating the plug-in indicated by the second information with the pair of the type of the event indicated by the first information of the second control message and the source of the event identified by the fifth information of the second control message; and
in response to a determination result indicating that there is the relationship associating the plug-in indicated by the second information of the second control message with the pair of the type of the event indicated by the first information of the second control message and the source of the event identified by the fifth information of the second control message, deleting the plug-in indicated by the second information of the second control message.

4. The event processing method according to claim 2, wherein
the control message further includes information indicating a valid period of the corresponding plug-in,
the event message further includes information indicating the point of occurrence of an event,
the updating of the relationship is configured to associate a set of information with the corresponding plug-in indicated by the second information, the set of information including the type of the event indicated by the first information, the source of the event identified by the fifth information of the control message, and the valid period indicated by the information of the control message, and
the selecting of the plug-in is configured to select one of the plurality of plug-ins by using the event message, the selected plug-in being a plug-in which has been associated with the set of information, the set of information including the first information having a content consistent with the third information and the fifth information having a content consistent with the sixth information and the valid period to which the point of occurrence of the event indicated by the event message belongs.

5. The event processing method according to claim 4, wherein, when the point of occurrence of an event specified from the event message is after the valid period associated with the corresponding plug-in, the corresponding plug-in is deleted from among the plurality of plug-ins.

6. The event processing method according to claim 4, wherein, upon receipt of a regularly issued synchronization message, the corresponding is deleted from among the plurality of plug-ins when the point of occurrence of an event specified from the last received event message is after the valid period associated with the corresponding plug-in after a storage content in a storage unit is backed up.

7. The event processing method according to claim 2, wherein the updating of the relationship is configured to by performed after receiving a regularly issued synchronization message and backing up a storage content in a storage unit.

8. The event processing method according to claim 7, wherein,
the queue buffer is further configured to store the plurality of messages including a second control message broadcasted from the management node, the second control message including the first information, the second information, and the fifth information identifying the source of an event,
the event processing method further comprises:
in response that the message obtained from the queue buffer is the second control message, determining whether there is a relationship associating the plug-in indicated by the second information with the pair of the type of the event indicated by the first information of the second control message and the source of the event identified by the fifth information of the second control message; and
in response to a determination result indicating that there is the relationship associating the plug-in indicated by the second information of the second control message with the pair of the type of the event indicated by the first information of the second control message and the source of the event identified by the fifth information of the second control message, deleting the plug-in indicated by the second information of the second control message, after the synchronization message is received and the storage content in the storage unit is backed up.

9. The event processing method according to claim 2, wherein
the second information indicating the corresponding plug-in indicates information obtained by encoding the corresponding plug-in, the updating of the relationship is configured to
decode the corresponding plug-in by using the second information included in the received control message, and
associate the decoded plug-in with the pair of the type of the event indicated by the first information and the source of the event identified by the fifth information of the control message.

10. The event processing method according to claim 9, wherein the decoding is configured to,
when a digest value calculated from the information obtained by encoding the plug-in included in the received control message is not stored in a second storage unit, perform decoding processing on the encoded plug-in, and store the decoded plug-in in the second storage unit in association with the digest value, and
when the digest value is stored in the second storage unit, obtain the decoded plug-in from the second storage unit.

11. A non-transitory computer-readable storage medium for storing a program which causes a computer to perform event processing, the computer being configured to operate as any one of a plurality of nodes included in a parallel distributed processing system, the event processing comprising:
in response to receiving of a message from a management node of the parallel distributed processing system, storing the received message into a queue buffer in a first-in-first-out (FIFO) manner, the queue buffer being configured to store a plurality of messages, each message being a control message or an event message;
obtaining, in the FIFO manner, the message from among the plurality of messages stored in the queue buffer;
in response that the message obtained from the queue buffer is the control message broadcasted from the management node to the plurality of nodes in the parallel distributed processing system, updating a relationship between a plug-in and a type of an event to process subsequent messages in the queue buffer by using the updated relationship, the control message including first information indicating a type of an event to be used as an execution condition for a corresponding plug-in from among a plurality of plug-ins and second information indicating the corresponding plug-in, the updated relationship associating the type of the event indicated by the first information with the corresponding plug-in indicated by the second information included in the received control message; and
in response that the message obtained from the queue buffer is the event message including third information indicating a type of an event and fourth information indicating data to be processed, selecting a plug-in from among the plurality of plug-ins by comparing the type of the event indicated by the third information of the event message with the type of the event indicated by the relationship to cause the selected plug-in to process the data indicated by the fourth information of the event message, the selected plug-in being one of the plurality of plug-in which has been associated with the first information having a content consistent with the third information.

* * * * *